US012006015B2

(12) United States Patent
Christensen et al.

(10) Patent No.: US 12,006,015 B2
(45) Date of Patent: Jun. 11, 2024

(54) THRUST SYSTEM FOR STEERING MARINE VESSELS

(71) Applicant: LIQUID PROPULSION, LLC, Salt Lake City, UT (US)

(72) Inventors: Robert D. Christensen, Salt Lake City, UT (US); Martin Johnson, Draper, UT (US); Eric Nofsinger, North Salt Lake, UT (US); K. Ryan Christensen, North Salt Lake, UT (US)

(73) Assignee: LIQUID PROPULSION, LLC, Salt Lake City, UT (US)

( * ) Notice: Subject to any disclaimer, the term of this patent is extended or adjusted under 35 U.S.C. 154(b) by 474 days.

(21) Appl. No.: 17/320,219

(22) Filed: May 14, 2021

(65) Prior Publication Data
US 2021/0354803 A1 Nov. 18, 2021

Related U.S. Application Data

(63) Continuation of application No. PCT/US2021/032355, filed on May 13, 2021.
(Continued)

(51) Int. Cl.
*B63H 25/46* (2006.01)
*B60L 15/20* (2006.01)
(Continued)

(52) U.S. Cl.
CPC .............. *B63H 25/46* (2013.01); *B60L 15/20* (2013.01); *B60L 50/60* (2019.02); *B60L 53/20* (2019.02);
(Continued)

(58) Field of Classification Search
CPC .......... B63H 25/46; B63H 1/14; B63H 21/17; B63H 25/02; B63H 2025/465;
(Continued)

(56) References Cited

U.S. PATENT DOCUMENTS 7,644,675 B1 * 1/2010 Ha ......................... B63H 25/46
114/151
9,108,710 B1 * 8/2015 McChesney .......... B63B 35/613
(Continued)

FOREIGN PATENT DOCUMENTS

WO WO2019221162 11/2019

OTHER PUBLICATIONS

International Search Report issued in PCT/US21/32355 dated Aug. 23, 2021.

*Primary Examiner* — Mahmoud S Ismail
(74) *Attorney, Agent, or Firm* — Workman Nydegger

(57) ABSTRACT

A thruster system for improved steering and maneuverability of a marine vessel when operating at relatively low, or wakeless speeds, such as in the vicinity of docks, swimmers or other obstacles, or when trailering, beaching or mooring. The thruster system has a modularized design adapted to independently control separate motor/propeller units located at various positions on the vessel's hull. Each propeller of the modular thruster motor system has its own relatively small, electric motor and mounting bracket, permitting each motor to be separately mounted to a location on the hull of the marine vessel apart from other thruster motors. The thruster system is further enhanced by an electrical control system for controlling each modular thruster motor system of the thruster system. In some embodiments, a charging system is provided that permits each electrical control system to be separately charged from the marine vessel's main battery.

30 Claims, 40 Drawing Sheets

Related U.S. Application Data

(60) Provisional application No. 63/024,175, filed on May 13, 2020.

(51) Int. Cl.
  *B60L 50/60* (2019.01)
  *B60L 53/20* (2019.01)
  *B63H 1/14* (2006.01)
  *B63H 21/17* (2006.01)
  *B63H 25/02* (2006.01)

(52) U.S. Cl.
  CPC ............... *B63H 1/14* (2013.01); *B63H 21/17* (2013.01); *B63H 25/02* (2013.01); *B60L 2200/32* (2013.01); *B60L 2210/10* (2013.01); *B63H 2025/465* (2013.01)

(58) Field of Classification Search
  CPC .......... B60L 53/20; B60L 50/60; B60L 15/20; B60L 2200/32; B60L 2210/10
  USPC ............................................................ 701/21
  See application file for complete search history.

(56) References Cited

U.S. PATENT DOCUMENTS

| | | |
|---|---|---|
| 10,331,137 B2 | 6/2019 | Miller et al. |
| 2014/0229083 A1* | 8/2014 | Leehaug ............... F02D 31/002 701/60 |
| 2014/0273675 A1* | 9/2014 | Ritz ....................... B63H 25/02 440/62 |
| 2016/0090166 A1 | 3/2016 | Suzuki et al. |
| 2017/0029078 A1* | 2/2017 | Neidert .................. B63B 35/14 |
| 2019/0137993 A1 | 5/2019 | Bertrand et al. |
| 2019/0389552 A1* | 12/2019 | Rembach ................... B63J 3/02 |
| 2021/0129954 A1* | 5/2021 | Inoue ..................... B63B 79/10 |
| 2021/0139123 A1* | 5/2021 | Osara ..................... B63H 25/42 |
| 2021/0221485 A1* | 7/2021 | Grunewald Mayer .. G08G 3/02 |
| 2022/0214171 A1* | 7/2022 | Johnson .................. B63B 79/40 |

* cited by examiner

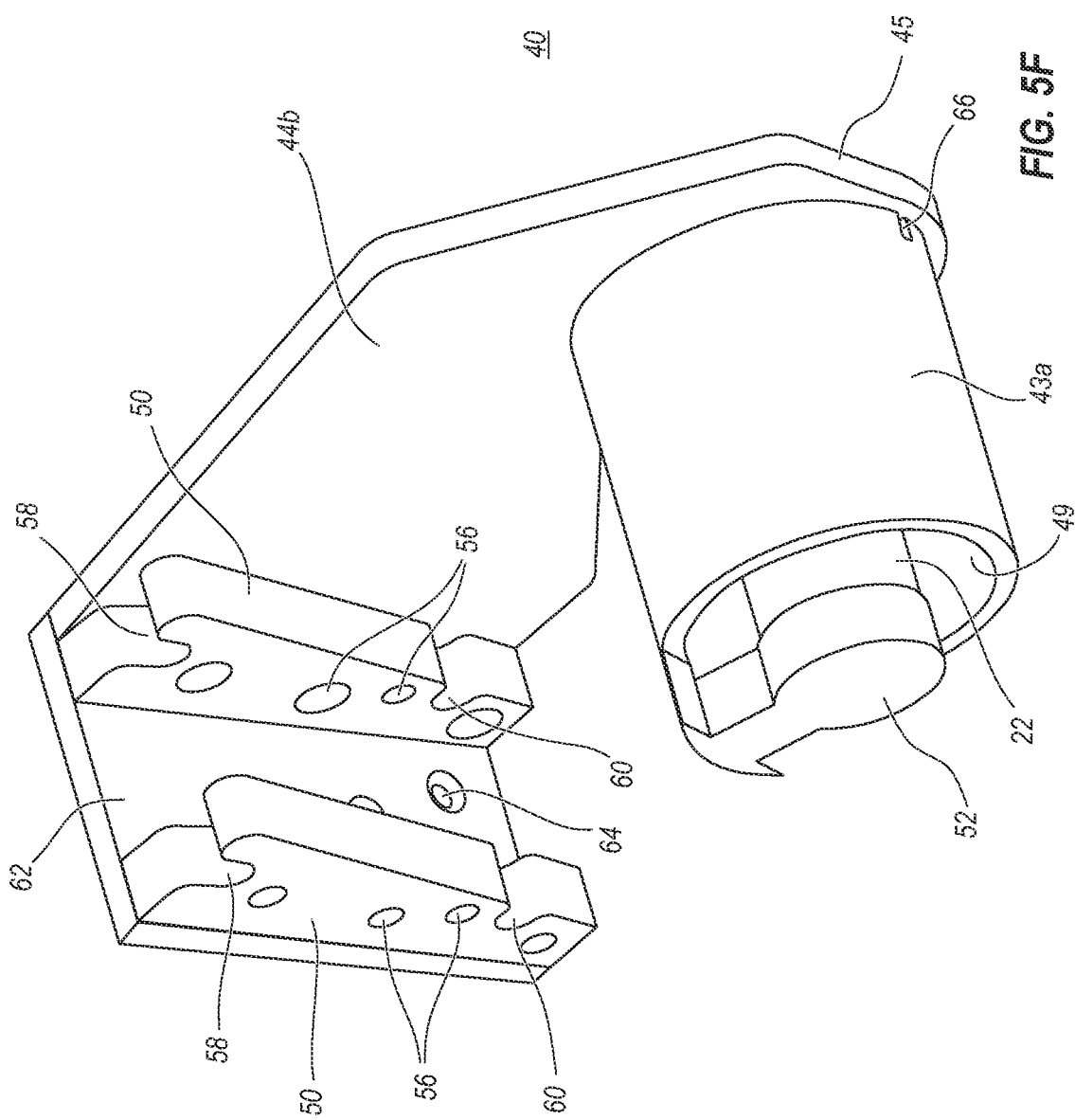

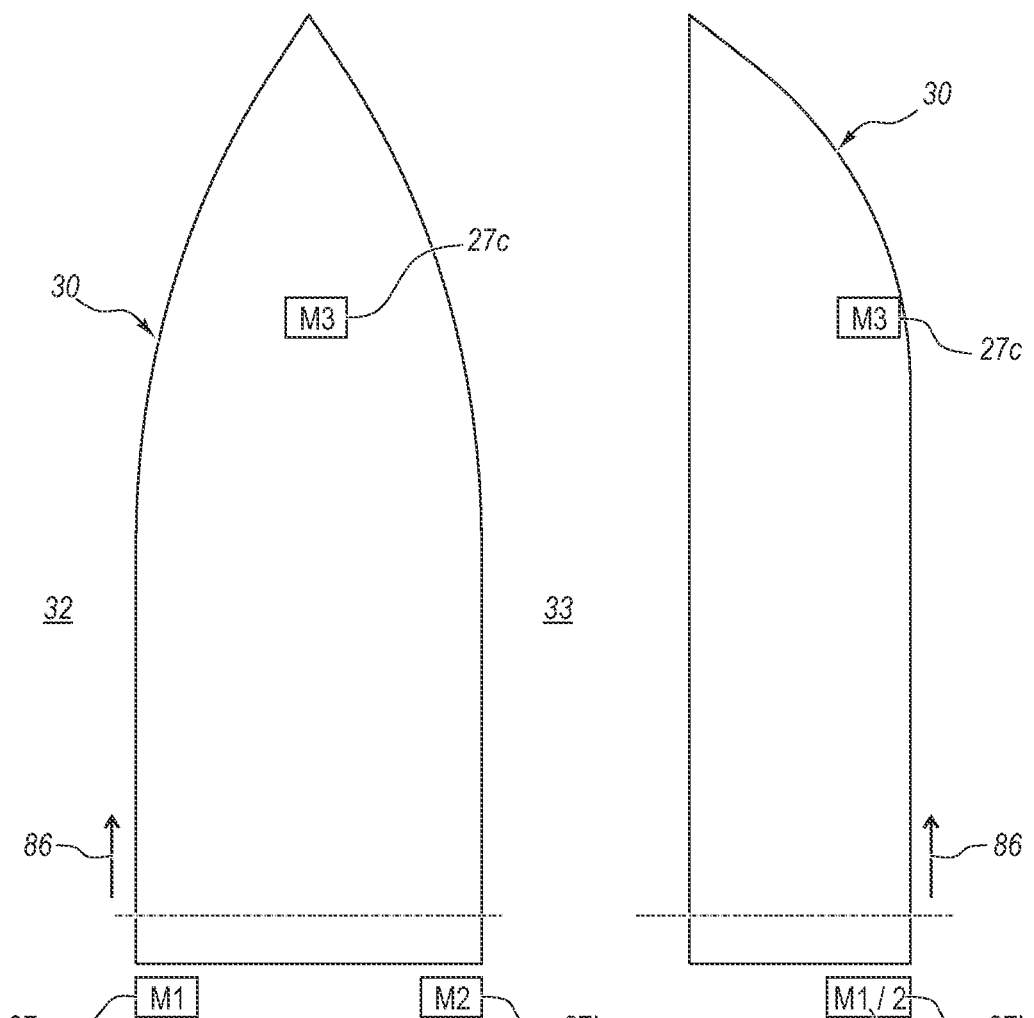
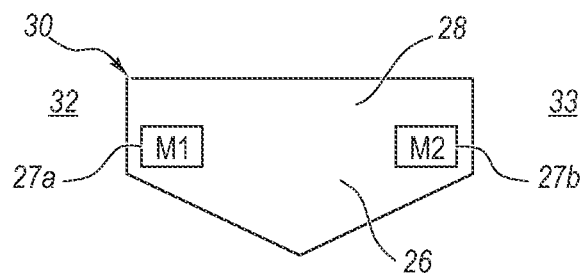
FIG. 7A  FIG. 7B
FIG. 7C

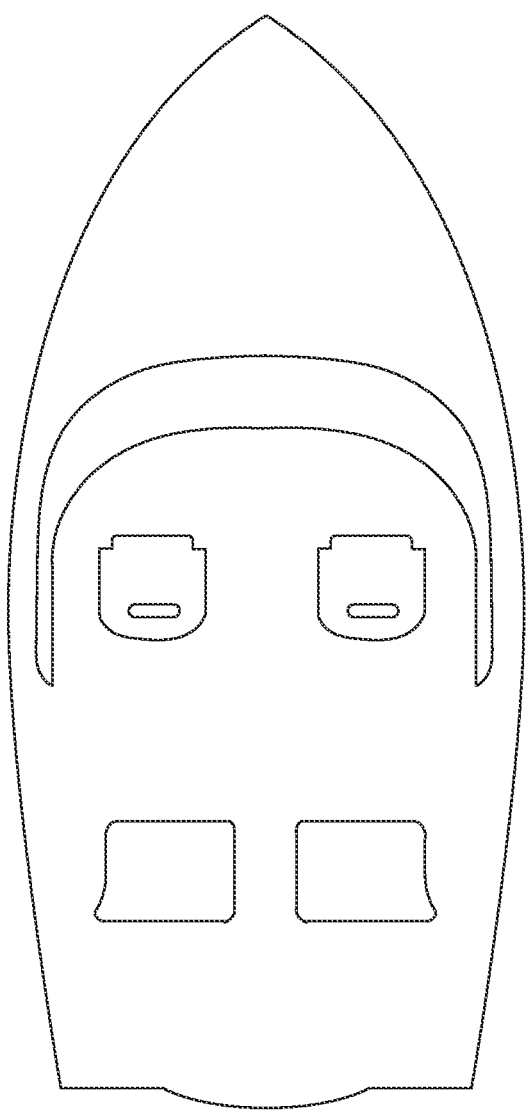
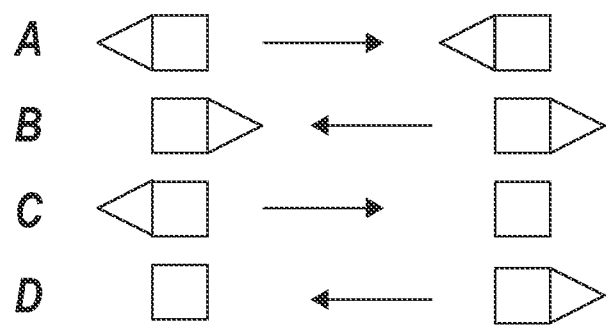
FIG. 17

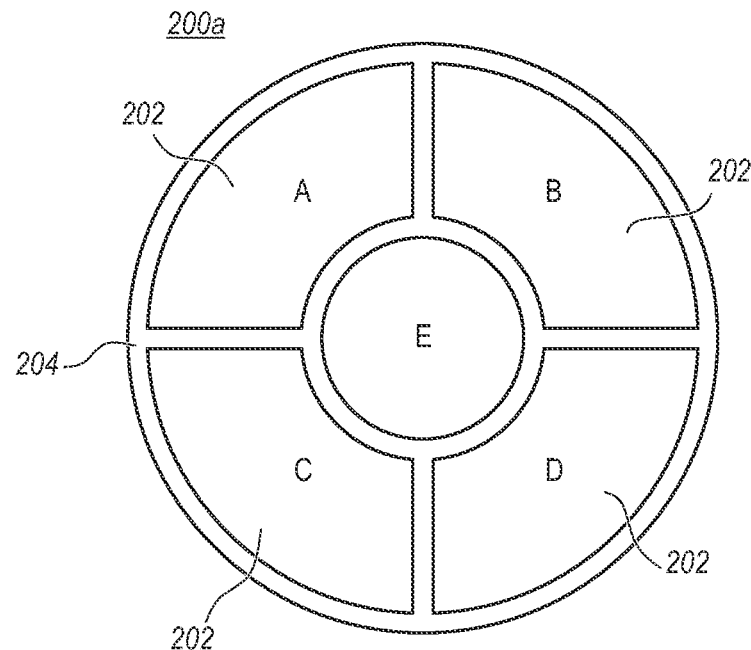
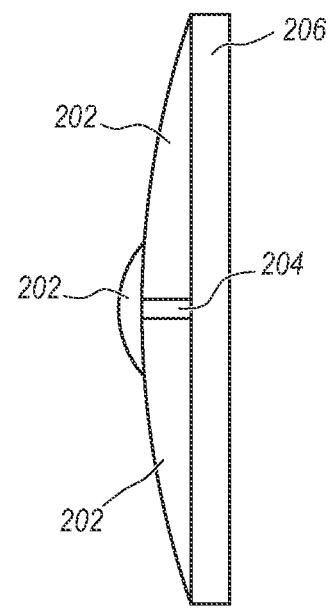
FIG. 20A
FIG. 20B
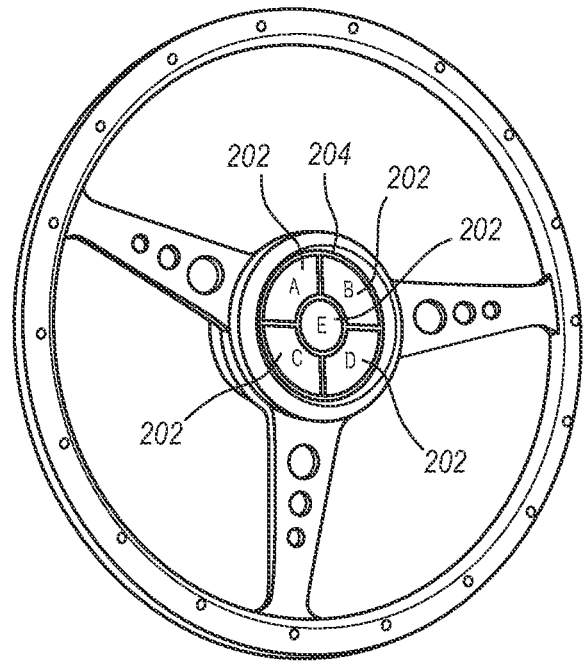
FIG. 20C

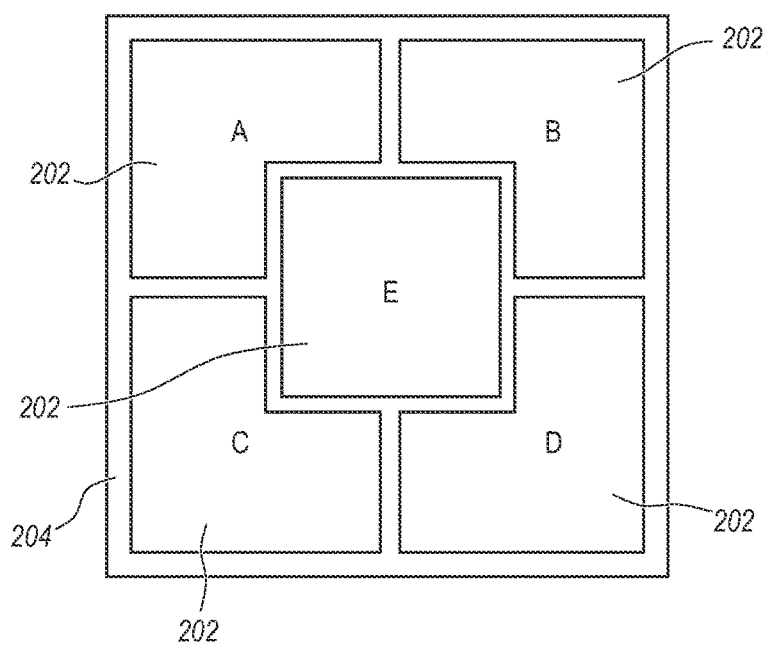
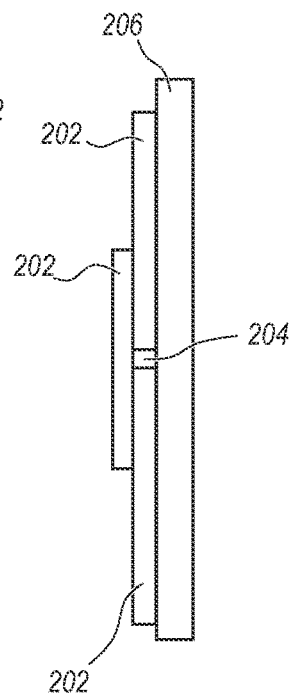
FIG. 21A          FIG. 21B
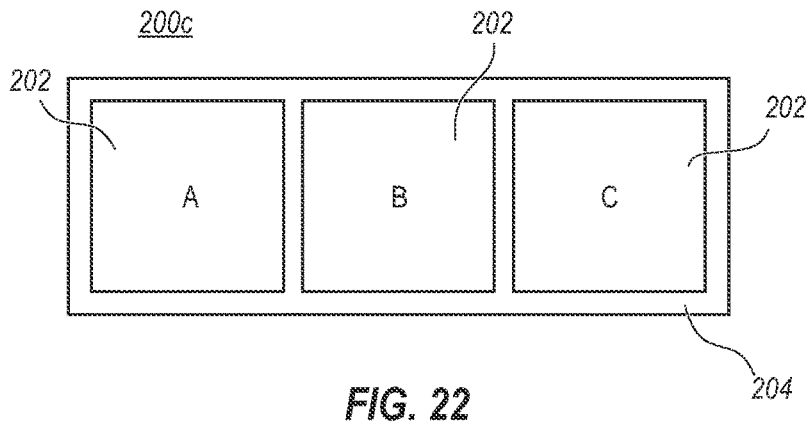
FIG. 22
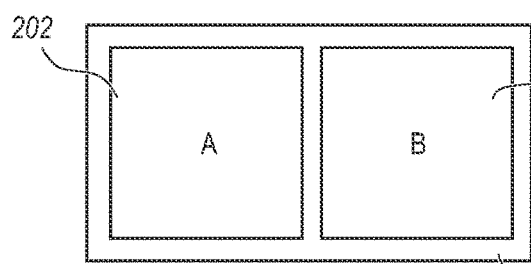
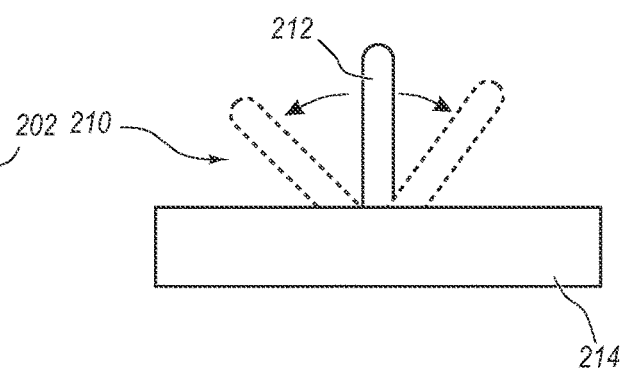
FIG. 23          FIG. 24

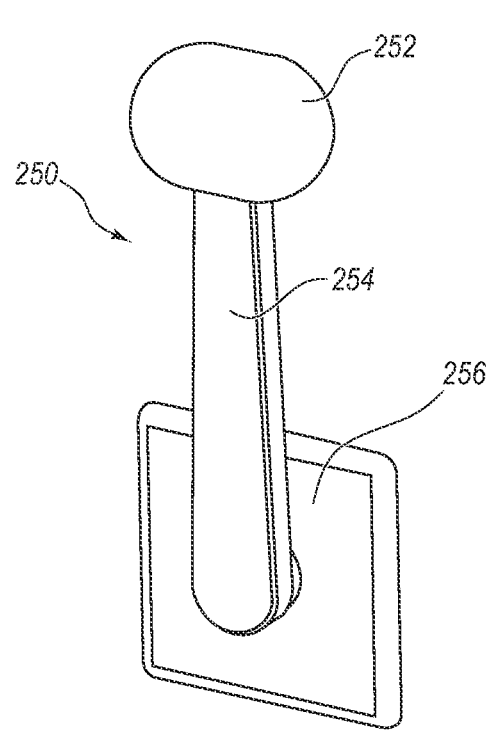
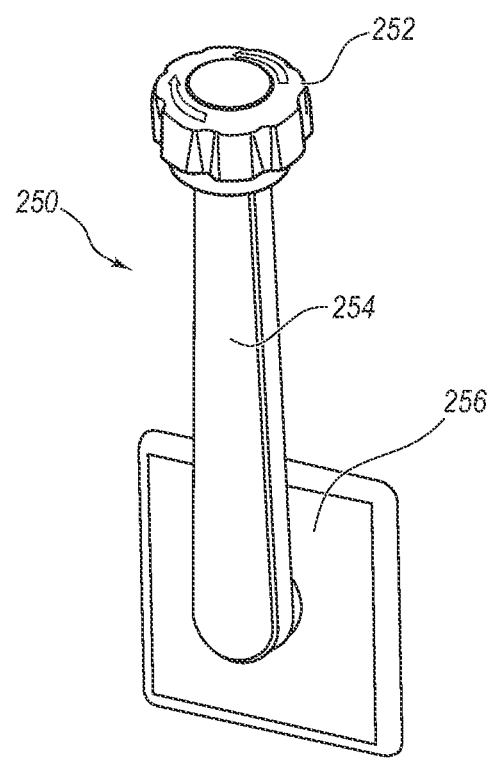
*FIG. 28A*  *FIG. 28E*
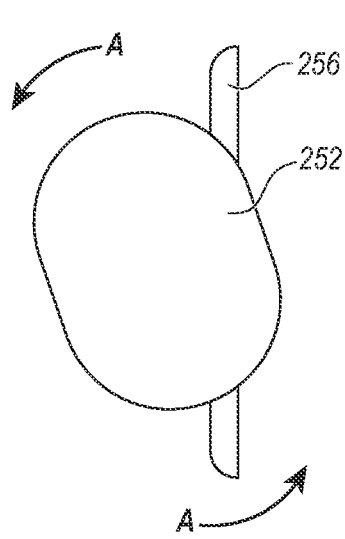
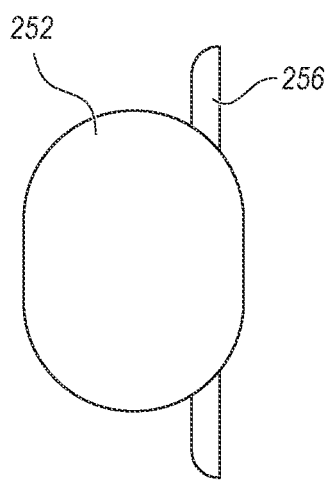
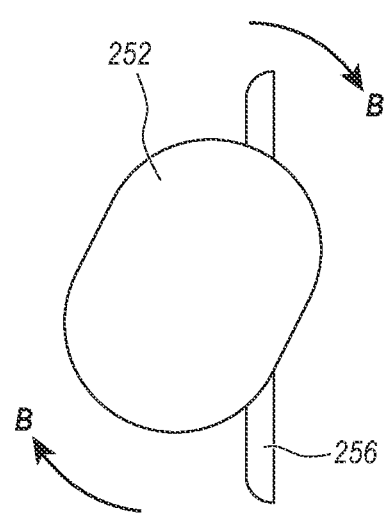
*FIG. 28B*  *FIG. 28C*  *FIG. 28D*

THRUST SYSTEM FOR STEERING MARINE VESSELS

CROSS REFERENCE TO RELATED APPLICATION

This application is a continuation of International Patent Application No. PCT/US21/32355, filed May 13, 2021, which claims the benefit of U.S. Provisional Application No. 63/024,175, filed May 13, 2020, which are incorporated by reference in their entirety.

FIELD OF THE INVENTION

Embodiments of the present invention relate to devices, systems and methods for thrust systems used for steering marine vessels. In particular, the present invention relates to a thrust system having a modularized design adapted to independently control separate motor/propeller units located at various positions on the vessel's hull in order to improve the way thrust may be applied to the hull of a marine vessel in order to maneuver the vessel at low speeds, for example, in wake-free zones or shallow areas, when maneuvering around swimmers or other obstacles, or when docking or trailering.

BACKGROUND

Marine vessels, such as ships, boats, barges, personal watercraft, and the like, are widely used for a variety of purposes, such as for travel, fishing, shipping, and recreational uses. In use, marine vessels often encounter situations and areas where travel at low speeds is necessary and/or required. For example, in wake-free zones or shallow areas, low, wakeless speeds are required when maneuvering around swimmers or other obstacles and when docking or trailering.

Typically, marine vessels maneuver at low speeds by operating the main propulsion and steering system, i.e., engine(s), propeller(s) and rudder(s), at low speeds. In these situations, the thrust produced by the main engine and propeller, in combination with the steering feature of the rudder and/or propeller, are relied on to steer or maneuver the marine vessel. At slow speeds, the propeller is not always spinning, and turning the rudder of the marine vessel may produce little or no turning effect. This lack of control increases the possibility that the watercraft may collide with obstacles, resulting in property damage and/or increased risk of personal injury to swimmers or other watercraft users. This is particularly true in the case of watercrafts with primary propulsion systems comprising one or more fixed propulsion shaft(s) turning one or more propellers and having one or more moveable rudders in proximity to the one or more propellers to steer the boat. In short, steering of marine vessels (such as pleasure craft, e.g., boats or yachts used for water skiing, wake boarding or the like, and personal watercraft) at low speeds suffers from diminished directional control when relying on the craft's main engine, propeller, and rudder system.

Thruster systems have been developed to increase maneuverability of marine vessels when they must travel at lower speeds and/or in areas with limited space (see Miller et al. U.S. Pat. No. 10,331,137). Such thruster systems typically consist of a smaller motor-driven propeller system that operate independently of the vessel's main propulsion system (e.g., engine and propeller). Such thruster systems eliminate the need to manipulate a powerful main engine to cause the marine vessel to maneuver the vessel at low speeds. This provides for more precise control and positioning of the marine vessel at low or wakeless speeds.

One such example of this type of known thruster system is illustrated in FIG. 1. In FIG. 1 a thruster motor is mounted in a housing 12 at the stern or transom 13 of the boat 18 in a central location, adjacent to the exhaust 15, and above the main propeller 14 driven by the boat's main motor. The boat's rudder 16 is located slightly behind and below the thruster motor's housing 12. A thruster propeller 17 is mounted inside of the motor housing 12 on a boom (not shown). The thruster motor in housing 12 is used to drive the thruster propeller 17 to produce the desired side thrust to be applied to the boat 18, to move stern 13 either toward the port side (arrow 19a), or towards its starboard side (arrow 19b) of the boat 18. In this manner, the thruster propeller 17 operates independent of the boat's main engine and propeller 14 so as to provide increased maneuverability when steering the boat 18 at slow, wakeless speeds or in shallow waters or around objects. This improves user control of the boat 18 in such conditions.

Nonetheless, the size and mounting location of the thruster motor housing 12 and thruster propeller 17 hinders overall operation and maintenance of the marine vessel. Because they constitute a single assembly, the motor housing 12 with thruster propeller 17 is typically mounted in a central location at the stern 13. This in turn means that greater power must be supplied to the propeller 17 to exert the necessary thrust to control moving the boat's stern 13 in one direction or the other. Thus, the size of the thruster motor must still be relatively large and, as such, may take up a considerable amount of space. This may prohibit mounting of other marine vessel accessories on the stern 13 otherwise desired for the boat.

Moreover, because the thruster motor and propeller are designed as a single, self-contained unit, the entire unit must often be replaced in the event of damage or worn-out parts. This makes repair and replacement expensive and cumbersome.

BRIEF SUMMARY

The exemplary embodiments as illustrated and described herein relate to a thruster system for improved steering and maneuverability of a marine vessel when operating at relatively low, e.g. wakeless, speeds, such as in the vicinity of docks, swimmers or other obstacles, or when trailering, beaching, or mooring. In general, example embodiments of the thruster system are designed in such a way as to allow for directing thrust applied to the vessel's hull at multiple locations and in differing thrust directions depending on each location at which the thrust is applied. The thrust directions can be determined in such a way as to allow for the craft to be precisely maneuvered and positioned. The described embodiments of the thruster system allow the operator of the marine vessel to effectively move the craft in directions that are not easily achieved using the main propulsion/steering system (i.e., motor, propeller and rudder) or using the prior art type of stern thruster system.

Thruster systems described herein can have a modularized design adapted to independently control separate thruster motor/propeller units located at various positions on the vessel's hull in order to improve the way thrust may be applied to the hull of a marine vessel in order to more precisely maneuver the vessel in different ways at low speeds.

In particular, each propeller of the modular thruster system can have its own relatively small electric motor and mounting bracket. This permits each thruster motor/propeller unit to be separately mounted to a location on the hull of the marine vessel apart from other thruster units. This allows separate thruster motor/propeller units to be mounted, for example, at opposite ends of the rear end of a boat, as well as at other strategic locations designed to provide thrust at those locations. Strategically locating the thruster motor/propeller units in this way helps to increase the thrust provided by each separate unit and thus permits each motor to be much smaller in size. It also permits each separate motor and propeller to be easily and less expensively replaced in comparison to centrally mounted self-contained units. It also reduces or minimizes interference and clutter with the main propulsion/steering system.

This modular approach to thruster motor/propeller design is further enhanced by an electrical control system for controlling each thruster motor/propeller unit. The electrical control system can be provided in a single module that permits easy and cost-effective replacement when necessary, or which can be provided in separate modules that correspond to each thruster motor/propeller unit. A control mechanism electrically coupled to the single or separate modules of the electrical system is used to provide operational commands used by the electrical control system to independently control the speed of each motor, and thus the thrust applied by each separate thruster motor/propeller unit.

The control mechanism includes a user interface for controlling the thruster system, which can be provided in various locations depending on design and circumstances. For example, the user interface can be integrated with the throttle, which is typically operated with one hand, and/or the steering wheel, which is typically operated with the other hand while operating the throttle with the one hand (or both hands when not operating the throttle). Alternatively, the user interface can be separate from the throttle and steering wheel, such as a joystick, touchpad, or control buttons. For example, integration with the throttle and/or steering wheel may be advantageous when manufacturing a boat. A separate user interface may be advantageous for after-market upgrading of an existing boat to add a thruster system.

In some embodiments, a charging system is provided that permits the electrical control system for each thruster motor to be separately charged from the marine vessel's main battery. This helps to reduce the drain on the vessel's main battery when the vessel is being used.

In some embodiments, one or more (e.g., two) thruster motor/propeller units can be mounted near and/or integrated with the mounting bracket of a swim deck or other feature mounted at the stern of the vessel. This permits inclusion of thruster units without adding new features that jut out from or further clutter the stern of the boat. In other words, mounting the thruster motor/propeller unit(s) near and/or integrating them with the mounting bracket of a swim deck or other existing feature reduces or eliminates clutter. The thruster motor/propeller units can be advantageously mounted so that inhibition of water movement by other features such as the rudder, swim deck bracket, or wake adjustment trim tabs.

The control mechanism may include software with preprogrammed instructions for causing the thruster system to perform specified tasks, such as automatically turning, maneuvering the boat in specific ways, such as moving the boat toward and/or holding it against a dock. This greatly simplifies docking, particularly by a single person who must do so without assistance.

These and other objects and features of the present invention will become more fully apparent from the following description and appended claims or may be learned by the practice of the invention as set forth hereinafter.

BRIEF DESCRIPTION OF THE DRAWINGS

A more particular description of embodiments of the invention will be rendered by reference to the appended drawings. These drawings depict only typical embodiments or features of the invention and are not therefore to be considered to be limiting of its scope. Following is a brief description of the drawings:

FIGS. 5C-5G illustrate close up perspective views of the mounting bracket of FIGS. 5A and 5B, which is shown integrated with the mounting bracket of a swim deck;

FIGS. 7A-7C illustrate a schematic view of another example of locations for mounting the modular thruster motor/propeller units on a marine vessel;

FIG. 17 illustrates a diagrammatic example of the operational commands that an operator of the marine vessel can employ for maneuvering the marine vessel using one or more of the thruster motor/propeller units;

FIGS. 20A-20B illustrate an example embodiment of a touchpad control mechanism for inputting operational commands to the electrical control system of the thruster system;

FIG. 20C illustrates the touchpad control mechanism of FIGS. 20A-20B positioned in a steering wheel of a marine vessel;

FIGS. 21A-23 illustrate other examples of various embodiments of touchpad control mechanisms for inputting operational commands to the electrical control system of the thruster system;

FIG. 24 illustrates an example of a switch control mechanism for inputting the operational commands to the electrical control system.

FIGS. 28A-28D illustrate an yet another example of a user operable control mechanism incorporated into a handle of a main engine throttle, wherein movement of the handle is used to control at least some aspects of the thruster system;

FIGS. 32A-33B illustrate another example of a user operable control mechanism which can be added to a thruster system; and FIGS. 33A-33C illustrate yet another example of a user operable control mechanism which can be added to a thruster system.

DETAILED DESCRIPTION OF EXEMPLARY EMBODIMENTS

Figure 1:
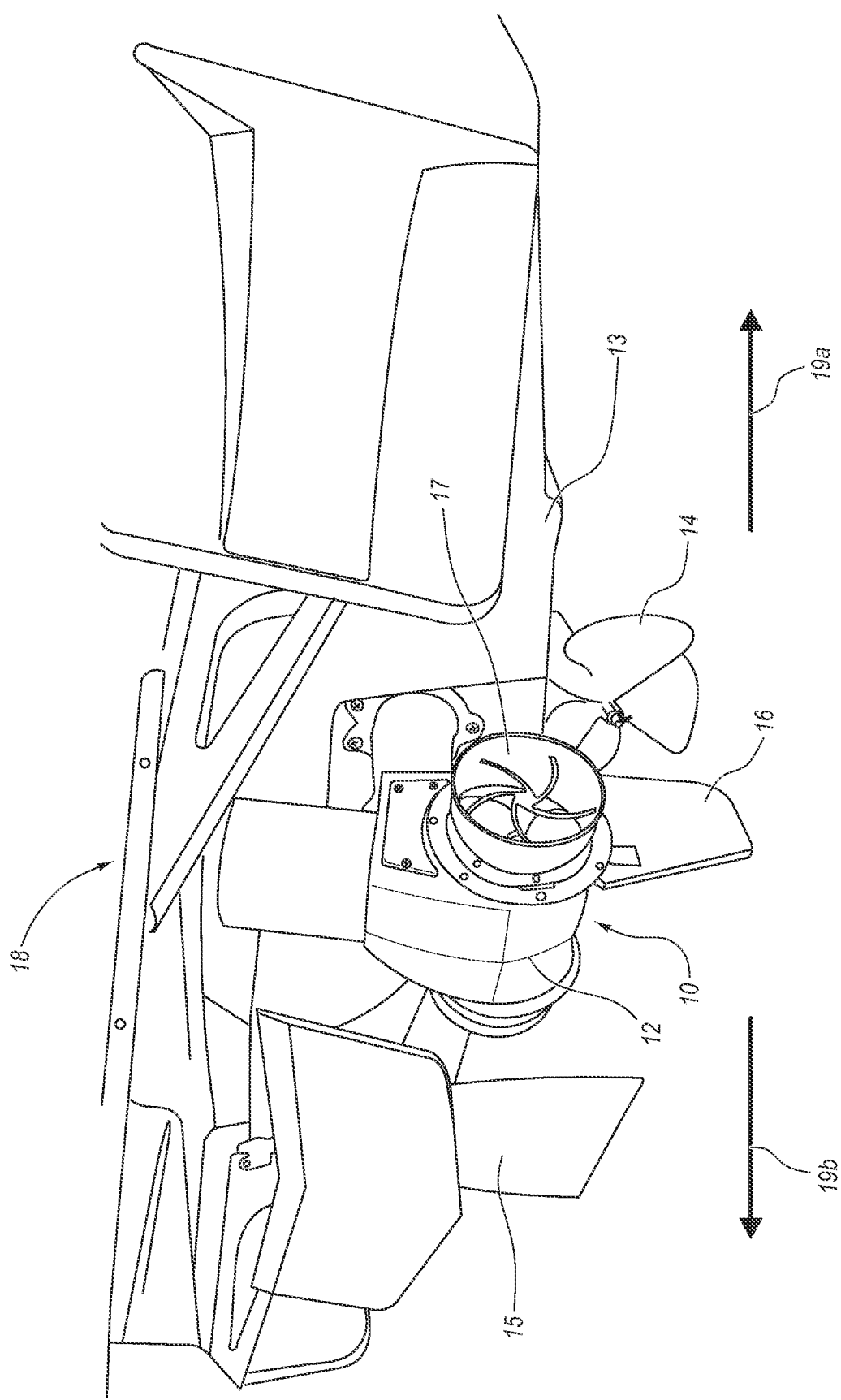
FIG. 1 (previously described in the background of the specification) illustrates a perspective view of a stern thruster motor of the prior art.

The exemplary embodiments of the thruster system and its various components and features as described herein are intended to set forth examples of ways in which the thruster system may be implemented. These examples are not exhaustive. For example, the thruster system of the present disclosure is not limited to vessels or crafts having fixed propeller shaft(s) and rudder(s). The thruster system of the present disclosure can also be applied to a personal watercraft, which may use a pump or a jet propulsion system. The thruster system of the present disclosure can be applied to other vessels having outboard propulsion systems, inboard/outboard propulsion systems, and vessels relying on wind and sails or flowing water as primary means of propulsion.

The thruster system disclosed herein can be used on marine vessels, which can include recreational boats, such as boats used for sporting and leisure activities. These activities can include watersports such as water skiing, wakeboarding, wake surfing, sport fishing, and the like. Marine vessels can also include jet skis and other personal watercrafts. These boats may also be used for travel and other leisure activities. These boats can also include pontoon boats, and the like. These boats can range from a length of about 18 feet to about 50 feet, or about 18 feet to about 45 feet, or about 18 feet to about 36 feet. These boats may be high performance boats with limited surface space, or limited available space on the hull for mounting boat accessories.

Marine vessels, and particularly recreational boats, are expensive, so maneuvers required during docking and trailering must be precise and controlled to prevent damage to the marine vessel and also prevent injury to swimmers and/or adjacent structures. When marine vessels operate at low speeds, low speed zones or no-wake zones may require speeds of no more than 10 mph, or no more than 5 mph, or no more than 3 mph. Similar speeds may be used when maneuvering around obstacles or swimmers. For docking and trailering, it may be necessary to hold the marine vessel in a specific position, such as against a dock for a period of time. For example, when docking in a narrow area such as a slip, the driver of a conventional boat lacking an independent thruster system may have to use small bursts from the primary engine/propeller to propel the boat in a reverse direction, which may then be countered by a quick burst of forward propulsion to slow or halt reverse momentum, leaving the driver of the boat with reduced control over steering. In such cases, the ability of the rudder to steer the boat can be compromised or nullified.

The thruster system of the present disclosure can alleviate such difficulties by allowing a marine vessel operator to rely on smaller electric motors for precise maneuvering, rather than rely on the primary propulsion/steering system.

Other embodiments not expressly disclosed may be implemented without departing from the spirit, scope, breadth or essential characteristics of the invention as set forth in the appended claims. Accordingly, all changes or variations of the modular thruster motor system which come within the meaning and range of equivalency of the appended claims are to be embraced within their scope.

Figure 2:
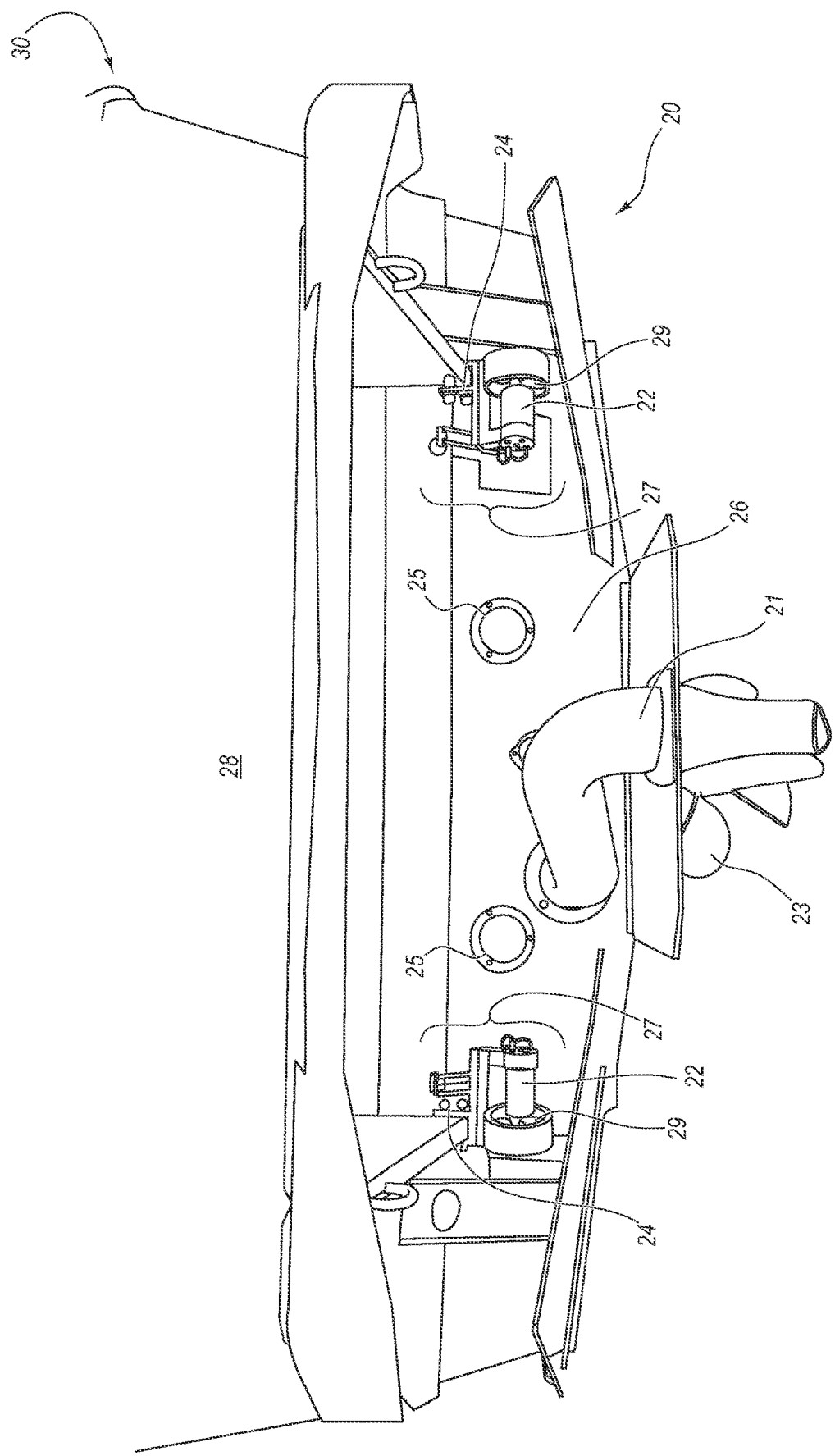
FIG. 2 illustrates a perspective view of the rear of a marine vessel having a pair of modular thruster motor/propeller units mounted to the left and right sides at the stern of the vessel, showing one way of implementing modular stern thruster units.

Turning now to a detailed description of the various embodiments and features illustrated in the drawings. FIG. 2 illustrates an exemplary embodiment of a thruster system 20 applied to the stern or transom 28 of a marine vessel 30. The thruster system 20, as shown, is modular and comprises two motor/propeller units 27, which can be configured to interface with an electrical control system on board the marine vessel 30. The thruster system 20 can also include a control mechanism (user interface) inside of the marine vessel 30, which is used by the marine vessel 30 user to actuate the electrical control system and control the modular thruster units 27.

Figure 3:
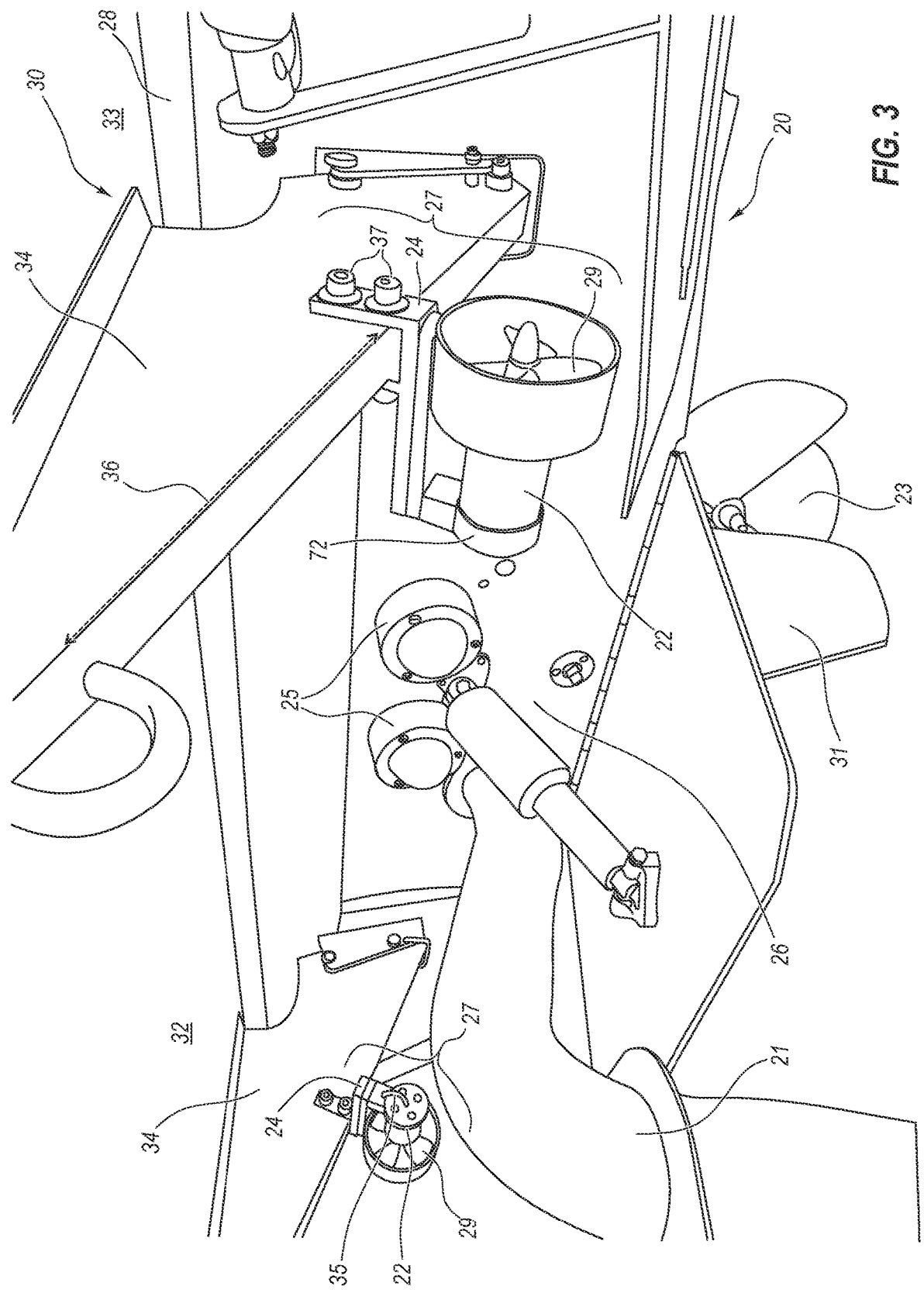
FIG. 3 illustrates a close-up perspective view based on FIG. 2, showing in greater detail a modular thruster motor/propeller unit mounted on the right side of the hull of the marine vessel.

Each thruster motor/propeller unit 27, as shown in FIG. 2, comprises a mounting bracket 24 adapted for attachment to the hull 26, and an electric motor 22 mounted to the bracket 24. The electric motor 22 can drive a thruster propeller 29 attached to the electric motor 22. In some embodiments, the electric motor 22 can be a brushless electric motor. FIG. 3 provides a close-up perspective view of the exemplary view of FIG. 2.

The thruster motor/propeller units 27, as shown, are mounted on the port side 32 and starboard side 33 of the hull, respectively. As illustrated in FIGS. 2-3, the mounting bracket 24 to which the electric motor 22 is mounted is mounted to a support 34 extending from the hull 26. In some embodiments, the thruster units 27 can be directly mounted to the hull 26.

Because the thruster motor/propeller units 27 are mountable at multiple locations on the hull 26 of a marine vessel 30, this can provide a user with additional room for placement of marine parts or accessories 25. An example of marine accessories 25 are shown in FIGS. 2 and 3 as marine lights, though other accessories typically mounted on the hull 26 may be used. Furthermore, the ability to mount the thruster motor/propeller units 27 in multiple locations of the hull 26 provides for the thruster units 27 to be mounted away from the exhaust 21, main propeller 23, rudder 31, and other mechanical features of the marine vessel.

The thruster motor/propeller units 27 can be modular. This modularity can allow a plurality of modular thruster units 27 to be mounted on a marine vessel 30 independent of one Each modular thruster motor/propeller unit 27 can be independently controllable apart from the other modular thruster motor/propeller unit(s) 27 mounted to the hull 26. Furthermore, each modular thruster motor/propeller unit 27 can be independently controlled by the electrical control system 100 (see FIGS. 11-15) of the thruster system 20 by connecting the electric motor to wiring 35 (see FIGS. 2-3) of the electrical control system 100.

Because the modular thruster motor/propeller units 27 can be independently mountable and independently controllable, they can also be independently removed from the thruster system and replaced without requiring the removal and replacement of other modular thruster units 27 of the thruster system 20. This modularity can be advantageous in the event that a thruster motor/propeller unit 27, or a component thereof, breaks or wears out and requires replacement. The user can remove only the broken component from the thruster system 20 (for example, thruster motor/propeller unit 27, or electrical control system 100, or separate modules of the electrical control system 100), rather than having to replace the entire system.

The mounting brackets 24 of the present disclosure enable a user to mount the modular thruster motor/propeller units 27 to a number of different locations on the hull of a marine vessel 30. The mounting brackets 24 can be attached to the hull 26 via use of attachment mechanisms such as pins, nuts and bolts, threaded screws, and the like. The mounting bracket 24 can be mounted along a length 36 of a support 34. The support 34 can be a support for a swim deck, as shown in FIGS. 2-3, though other supports 34 or projections from the hull 26 of a marine vessel 30 may adequately support the placement of a mounting bracket 24 for mounting a modular thruster motor/propeller unit 27.

Figure 4A:
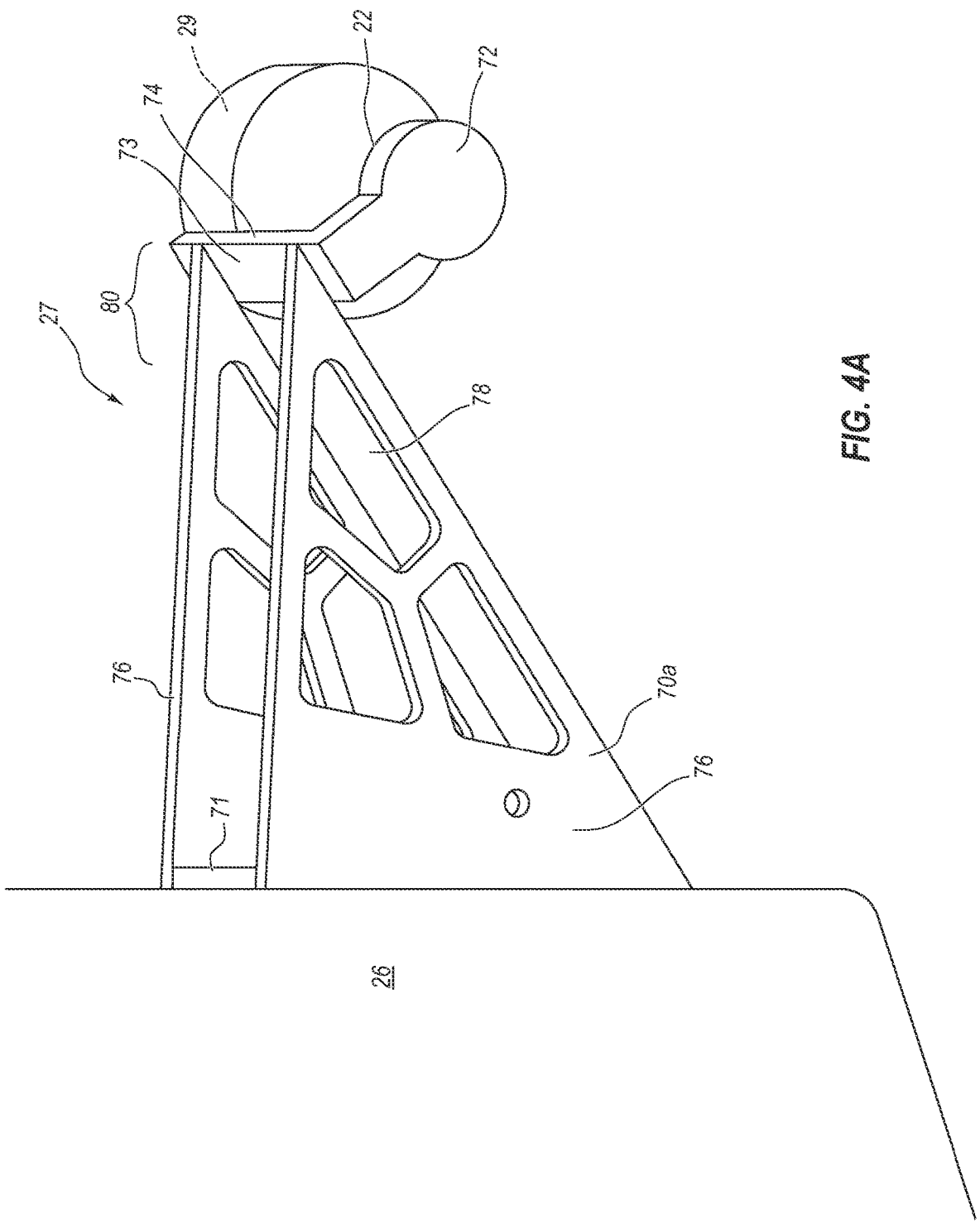
FIG. 4A illustrates a perspective view of an embodiment of a mounting bracket used for the modular thruster motor.

FIG. 4A illustrates an embodiment of a mounting bracket 70a configured to be mounted directly to the hull 26 of a marine vessel 30. This configuration can be advantageous in cases where a hull does not have a support 34, or similar structure, to which mounting bracket 24 (FIGS. 2-3) can be mounted. Mounting bracket 70a can comprise side brackets 76 mounted to a backing plate 71. The side brackets 76 can include a plurality of gaps 78 which can reduce the impact of the mounting bracket 70a on the flow of water in and around the motors 22 and decrease the additional weight of a mounting bracket 70a.

The backing plate 71 can include one or more electrical bores in order to feed wiring 35 (see FIGS. 2-3) from the electric motor 22 to the electrical control system 100 located inside of the marine vessel 30. The backing plate 71 can also include a plurality of screw holes or fastener openings (similar to those shown at 64 in FIG. 5F) for the insertion of fasteners, such as screws, bolts, pins, knobs, and the like, to secure the mounting bracket 70a to the hull 26.

The mounting bracket 70a, when mounted to the hull 26, can extend away from the marine vessel 30 towards a terminal end 80. The terminal end 80 can comprise a motor attachment 74, which can consist of a circuit cap 72 and a stabilizing bar 73. The circuit cap 72 can secure the electric motor 22, as well as any wiring 35 and/or circuit or control system attachments, and provide a protective cover over the wiring 35. The stabilizing bar 73 can help support the length of the electrical motor 22 and propeller 29 (not shown), and provide additional structural integrity to the mounting bracket 70 by connecting the terminal ends 80 of the side brackets. The motor 22 can also be adjustably mounted along the length of the substantially straight side of the mounting bracket 70a to which the motor 22 is mounted.

Figure 4B:
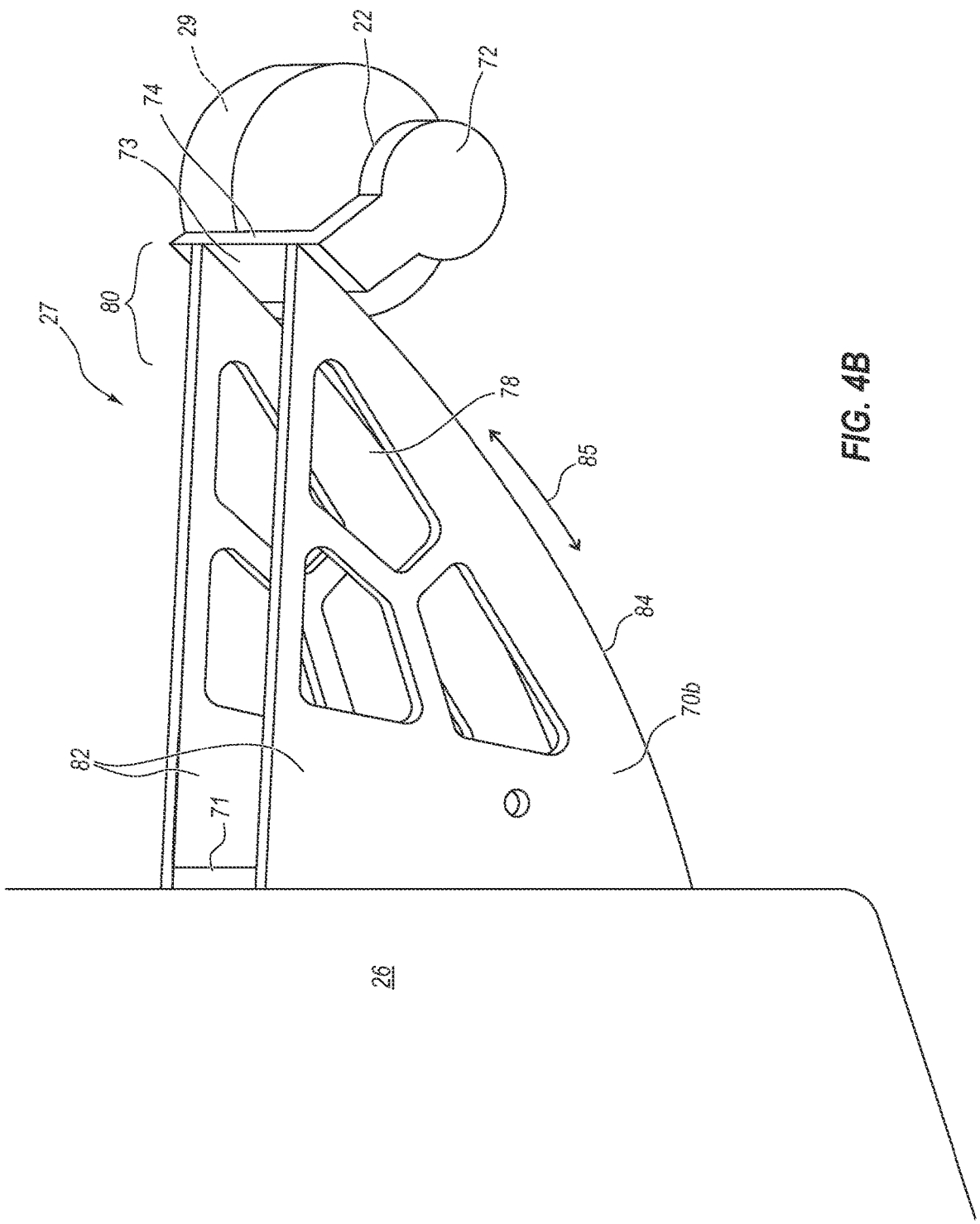
FIG. 4B illustrates a perspective view of an embodiment of a mounting bracket that is shaped with a logarithmic curve on its edge to enhance placement of a modular thruster motor to permit varying degrees of force to be applied by the thrust exerted by the motor's propeller.

In another embodiment shown in FIG. 4B, mounting bracket 70b comprises backing plate 71 connected to side brackets 82. Side brackets 82 have a plurality of gaps 78, which can allow water to flow through the side brackets 82, resulting in less drag and less overall weight of the mounting bracket 70b. Side brackets 82 can include a side 84 having an optimized curve 85, wherein the mounting location of an electric motor 22 can be adjusted along the length of the curved side 84. In some embodiments, the electric motor 22 may be manually adjusted to a desired position on side 84, while in some embodiments, the electric motor 22 may be automatically adjusted to a desired location. In some embodiments, the optimized curve 85 may be a logarithmic curve.

The curved side 84 may comprise a track, along which the motor attachment 74 can be repositioned and selectively secured at a desired point or location. The location of the electric motor 22 along the curved side 84 may be determined by a number of factors, including the size of the marine vessel to be maneuvered, the depth of the body of water, the power and/or size of the electric motor, etc. The ability to adjust the motor 22 along the curved side 84 permits a more optimal placement of the motor 22 in terms of distance from the hull 26 and depth relative to the water's surface so as to prevent cavitation or the sucking of air from the exhaust 21 (see FIGS. 2 and 3) or the surface of the water into the propeller 29 of the thruster motor/propeller unit 27, as well as increasing applied thrust.

In another embodiment illustrated in FIGS. 5A-5J, a mounting bracket 40 can be mounted to the hull 26 of a marine vessel 30, and the mounting bracket 40 can include structures providing for mounting of an electric motor 22 to the mounting bracket 40. The mounting bracket 40, as shown in FIGS. 5A-5J, can also be configured to support the attachment of a swim deck support bracket 42, which can be selectively attachable to and selectively removable from the mounting bracket 40.

Figure 5A:
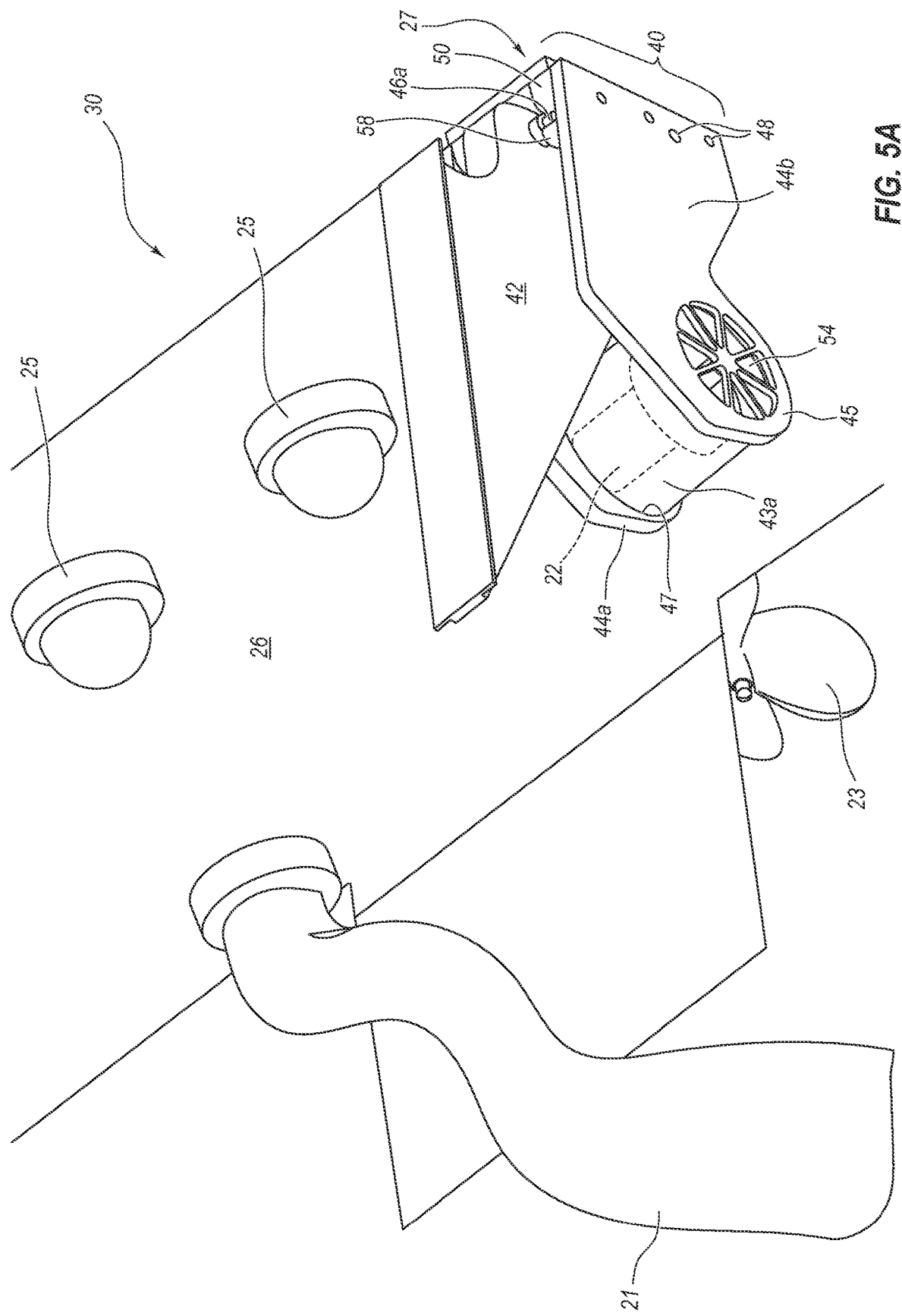
FIG. 5A illustrates an alternative embodiment of a mounting bracket of a modular thruster motor designed to increase the speed and efficiency of the motor's propeller by using a venturi effect produced by the bracket.
Figure 5B:
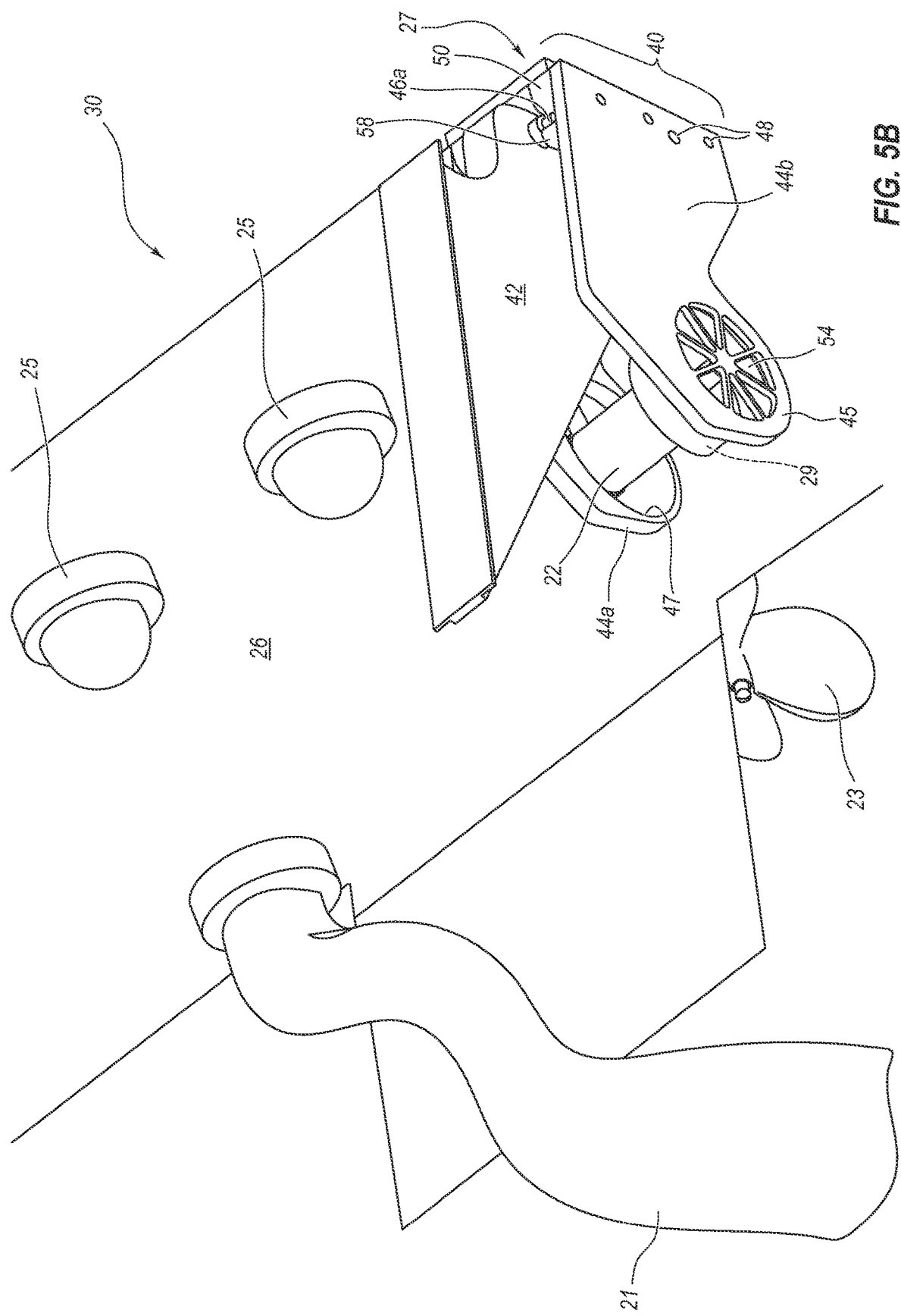
FIG. 5B illustrates further details of the embodiment of the mounting bracket of FIG. 5A.
Figure 5C:
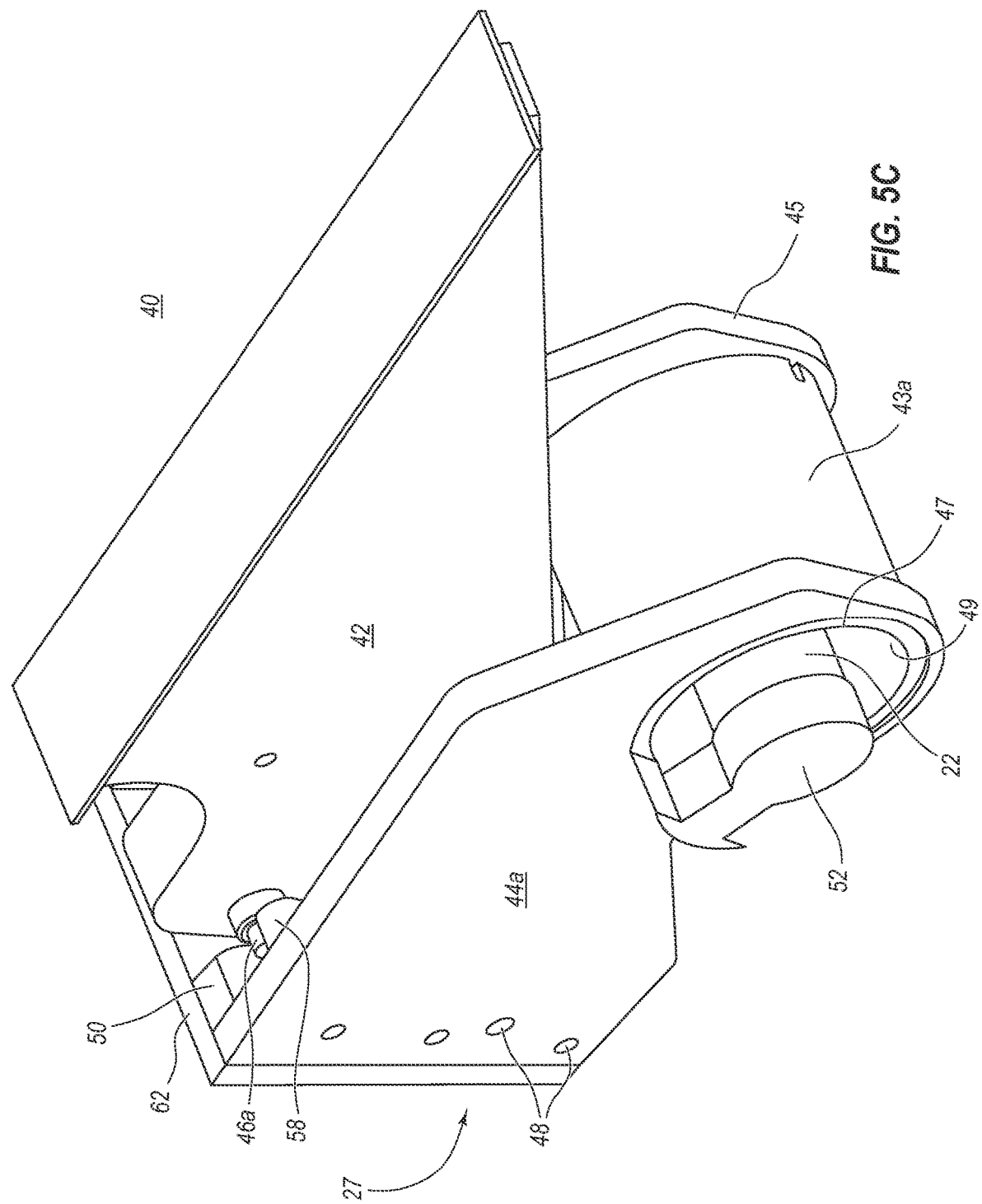
Figure 5D:
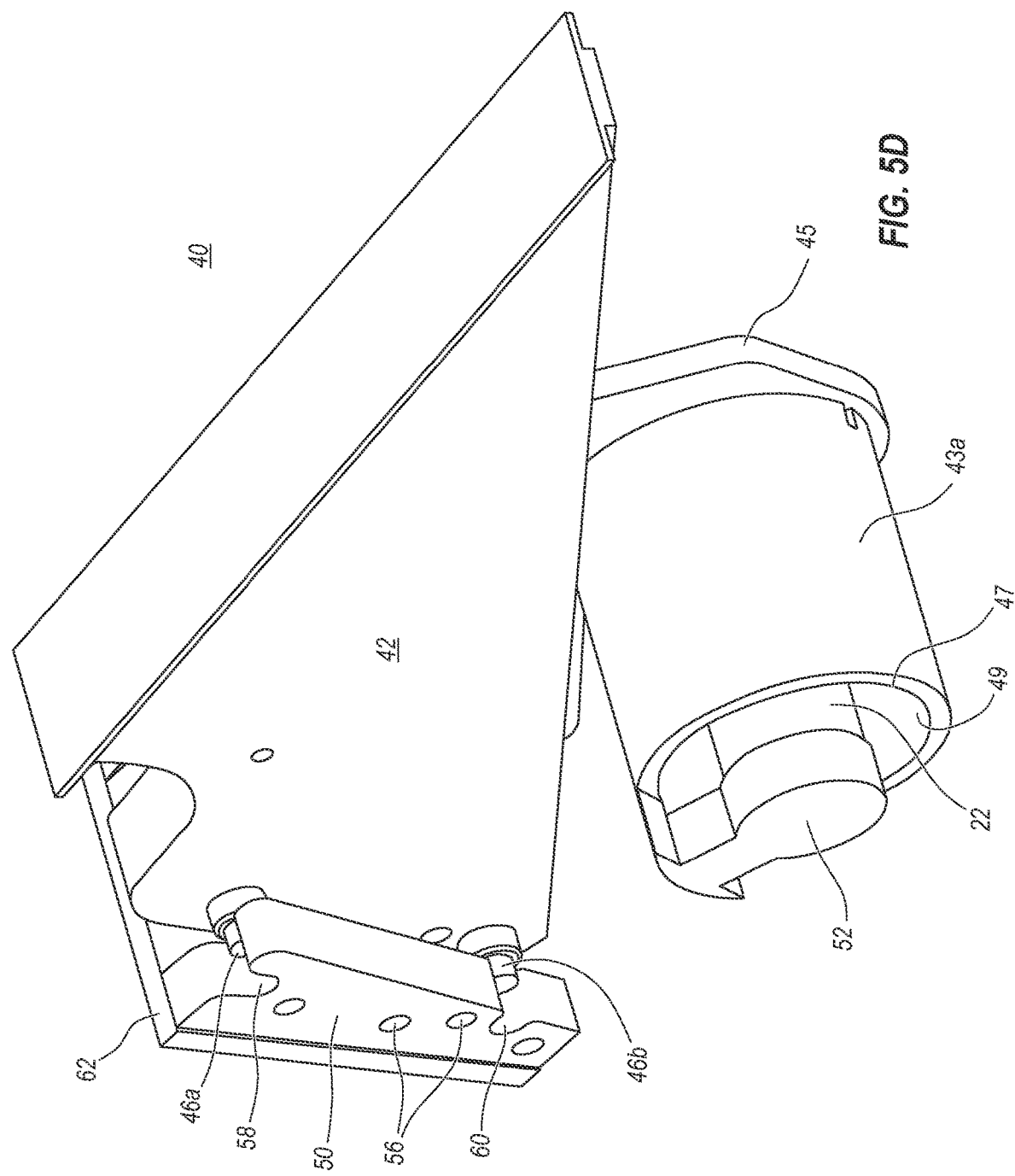

The mounting bracket 40 can comprise a backing plate 62 (see FIG. 5C), mountable on to the hull 26. The backing plate 62 can comprise two side mounts 50 (one of which is shown in FIG. 5D) positioned at opposing sides of the backing plate 62 to allow a swim deck 42 to be mounted therebetween. The side mounts 50 can comprise one or more grooves 58,60 for receiving connecting components 46a,46b on swim deck support bracket 42. The side mounts 50 can comprise an upper groove 58, configured in a U-shape having an upward opening, and a lower groove 60 comprising a U-shape with the opening facing opposite and outward from the backing plate 62. The backing plate 62 can have one or more wire bores 64 (see FIG. 5F) through which wires of the electrical control system, can be passed through to connect to the modular thruster motor system 27.

Connecting components 46a,46b of the swim deck support bracket 42, can comprise nubs, bolts or other projections configured to sit within the upper groove 58 and lower groove 60 and selectively secure the swim deck support bracket 42 to the mounting bracket 40.

The side mounts 50 of the backing plate 62 can have a plurality of mounting holes 56 (see FIG. 5F) which correspond to a plurality of mounting holes 48 (FIGS. 5A and 5B) on the side brackets 44a,b. An electric motor 22 can be assembled on the mounting bracket 40 and secured to the mounting bracket 40 between side brackets 44a,b when the side brackets 44a,b are secured to the side mounts 50. Fasteners, such as screws, pins, and the like can be inserted from the exterior-facing side of a side bracket 44a,b through the mounting holes 48 and into the mounting holes 56 on the side mounts 50. The interior of the plurality of mounting holes 56 may be counterbored in order to eliminate interference with the swim deck 42.

In one embodiment, a tube 43a (see FIGS. 5A and 5C) can be attached to side brackets 44a,b to provide a housing or receiving space for the electric motor 22. The tube 43a,b can be welded onto either side bracket 44a, or side bracket 44b. The electric motor 22 can be mounted inside of the tube 43a by being inserted into the tube 43a through the un-welded end of the tube 43a. The un-welded side bracket which can be either side bracket 44a or side bracket 44b depending on the configuration, can then contain the electric motor 22 within the mounting bracket 40 by inserting fasteners into mounting holes 48 therethrough to mounting holes 56, as described above.

The tube 43 can have a keyed slip-fit 66 (see FIG. 5G) to provide for secure attachment of the side bracket 44a,b to the tube 43. This can prevent the tube 43 from rotating or otherwise moving within the mounting bracket 40. In some embodiments, the electric motor 22 may include a spacer 68 (see FIG. 5G), which can maintain a distance between the propeller guard 45 (see FIG. 5D) and the propeller 29 to facilitate water flow through the tube 43 and prevent the propeller guard 45 from being mounted too close to the thruster propeller 29 which could cause interference with the operation of the thruster propeller 29.

The tube 43a,b can prevent water displacement from being reduced or impeded by the side brackets 44a,b. Furthermore, the tube 43a,b can advantageously improve the flow of water through the tube 43a,b by creating a Venturi effect. The tube 43a,b can be designed with a taper from one end of the tube 43a,b to the other end in order to facilitate the flow of water from an area of higher volume through a constricted or smaller area of the tube 43a,b, thereby causing the flow of water through the tube 43a,b to speed up to increase the efficiency and thrust of the propellers 29 driven by the motors 22.

The available space inside of the tube 43a,43b through which water can flow can have a high volume area around the motor 22 (e.g., more space between the motor 22 and the interior wall 49 of the tube 43a,43b) and a low volume area around the housing of the propeller 29 (e.g., less space between the housing of the propeller 29 and the interior wall 49 of the tube 43a,43b, relative to the space between the motor 22 and the interior wall 49). As the motor 22 causes the propeller 29 to rotate, water enters the tube 43a,43b from the circuit cap 52 side of the motor 22, and exits the tube 43a,43b around the propeller 29. The Venturi effect created by the tube 43a,b can increase the rate of flow and thereby improve the thrust delivered by the propellers 29 to the water, thereby decreasing the amount of power needed to operate the motor 22 to cause the necessary amount of thrust.

Figure 5E:
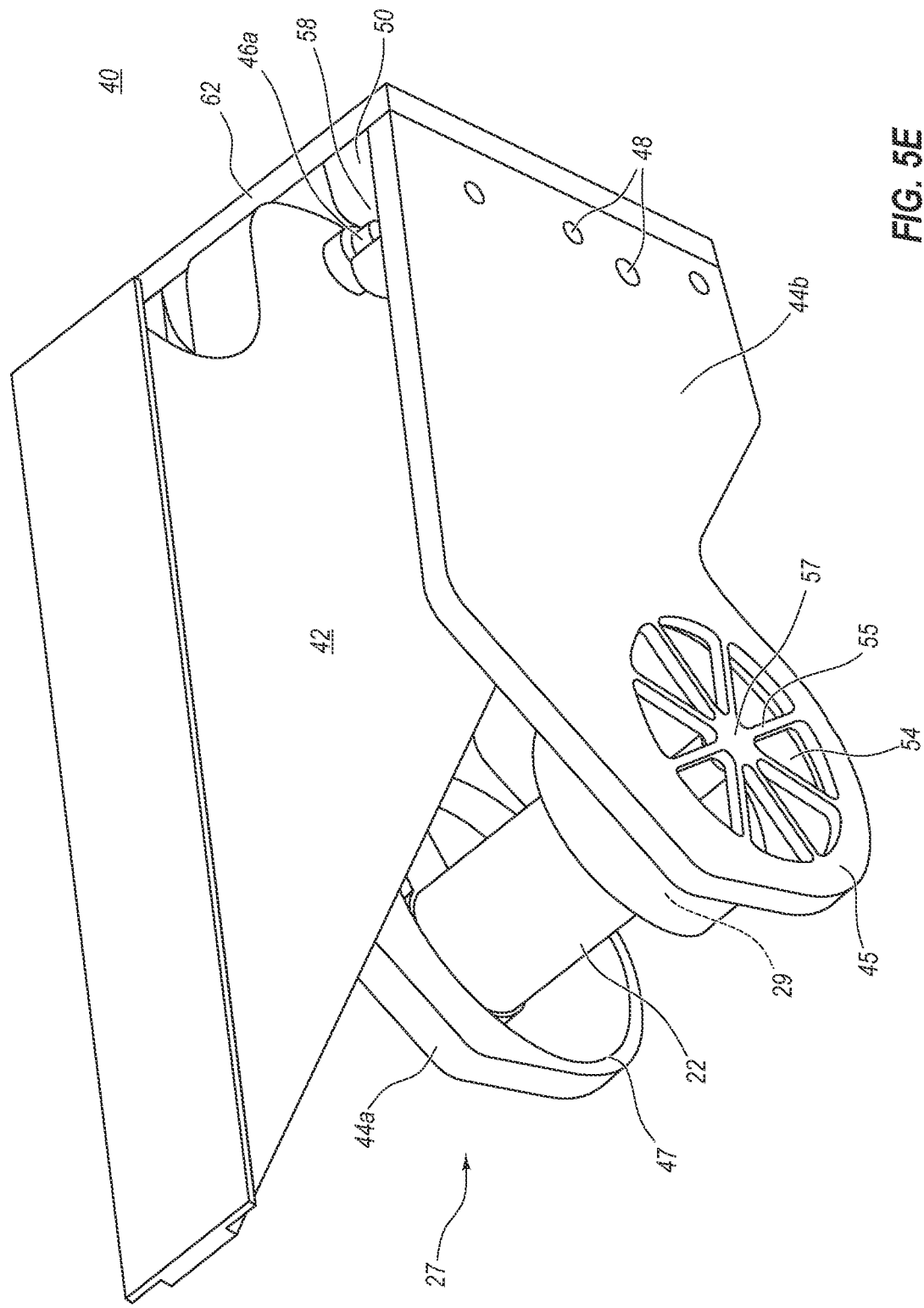
Figure 5G:
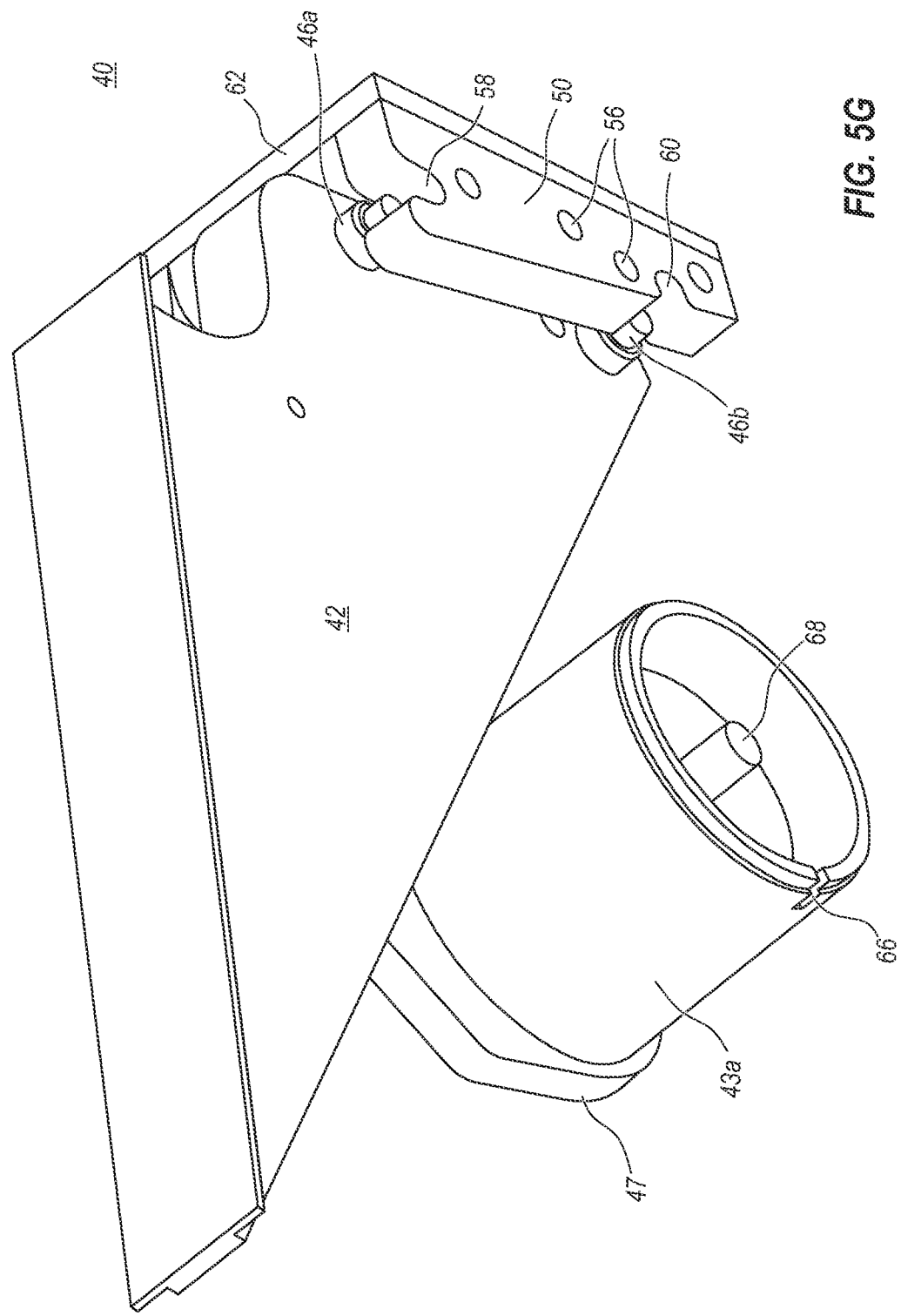
Figure 5I:
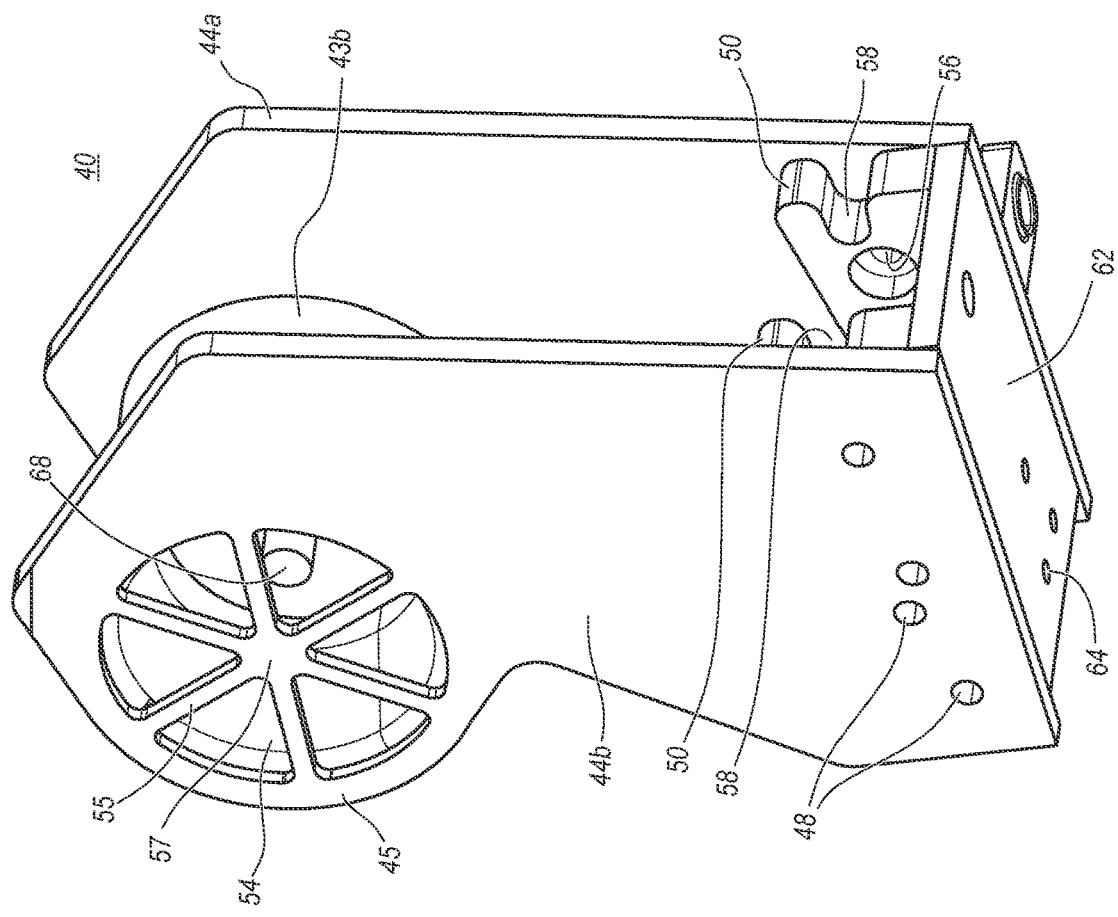
FIGS. 5H and 5I illustrate a close-up perspective view of the mounting bracket of FIGS. 5A-5G with a tube in a short configuration.
Figure 5H:
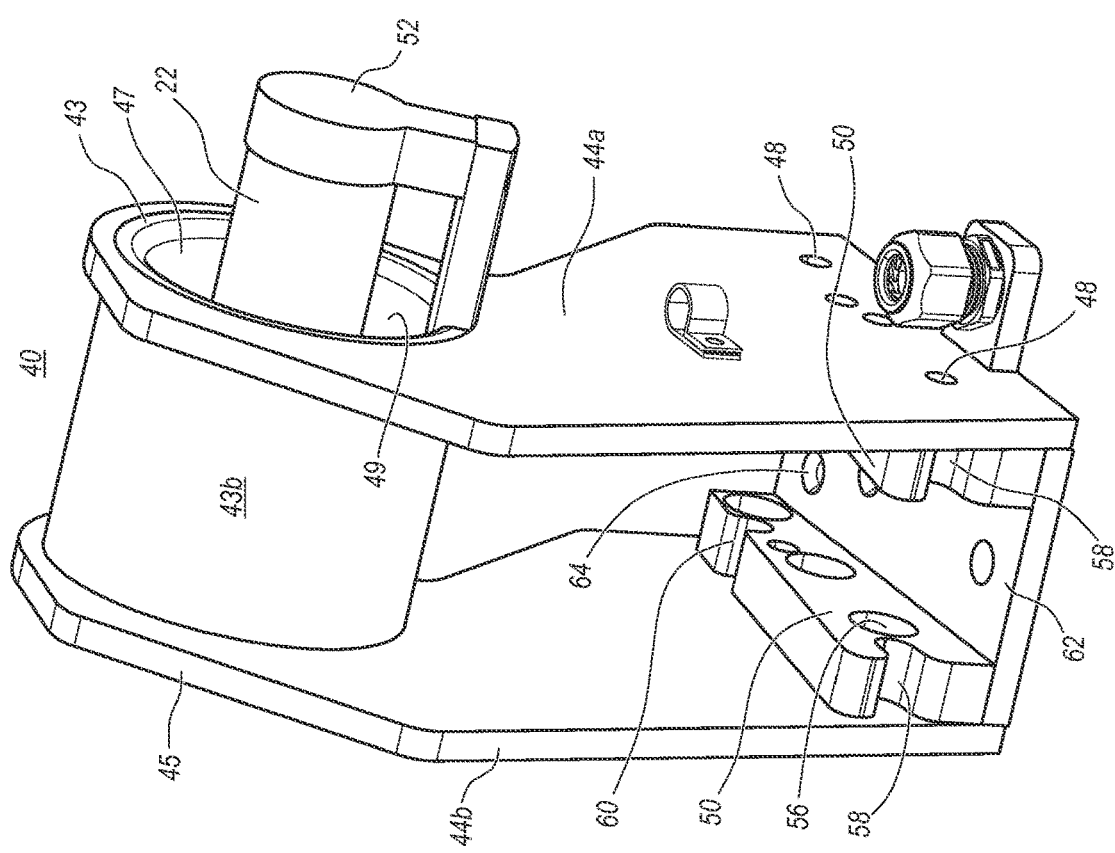

In the embodiment shown in FIGS. 5H-5I, the tube 43b is shorter in length allowing the motor 22 to protrude outward through the opening 47. The decrease in length of the tube 43b, relative to the length of tube 43a, can decrease the space inside of the tube 43b around the motor 22, thereby increasing the rate of the bottleneck effect, or Venturi effect. Additionally, in an alternative embodiment, the propellers 29 may be ducted propellers, which when combined with the tapered tube 43a,b can further increase the efficiency of the motor 22.

Side bracket 44b (see FIG. 5A) can have a propeller guard 45 to prevent contact with the propeller 29 during operation of the propeller 29. As shown in FIGS. 5A, 5B, and 5E, the propeller guard 45 can comprise a series of openings 54 segmented by a series of bars 55 (FIG. 5E) joined at a central point 57, though other patterns may be used which allow the through-flow of water while simultaneously preventing inadvertent contact with the propeller 29. Side bracket 44a (see FIG. 5C) can have an opening 47 to allow the electric motor 22 to extend therethrough. This configuration can allow the electric motor 22 to be mounted onto the mounting bracket 40 without having to extend the entire assembly to accommodate the length of the electric motor 22.

Figure 5J:
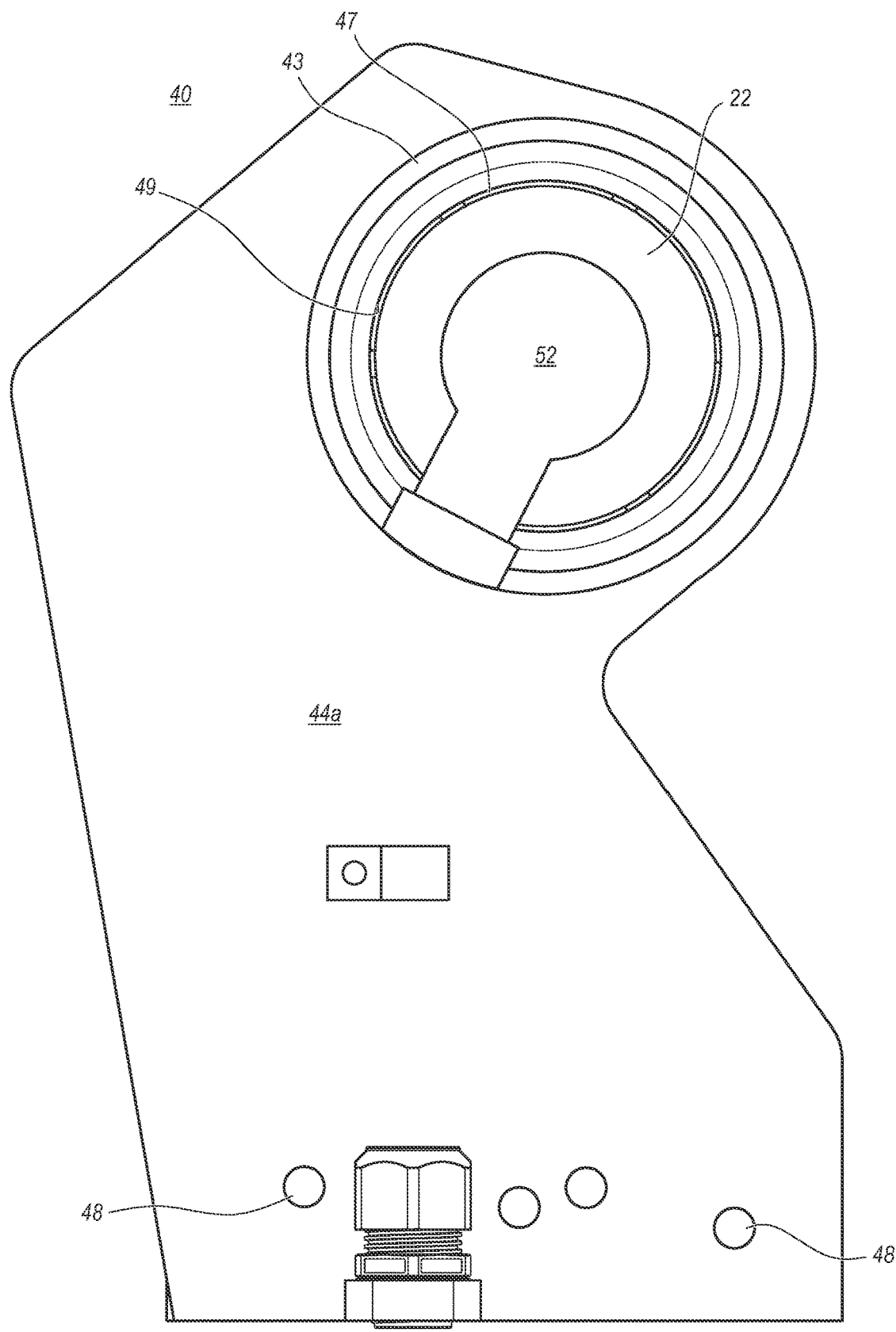
FIG. 5J illustrates a side view of the mounting bracket of FIGS. 5A-5I wherein the motor is mounted to the circuit cap and suspended within the tube.

A circuit cap 52 (see FIG. 5C) can secure the electric motor 22 within the tube 43 of the mounting bracket 40 and protect and contain the external electrical components of the modular thruster motor system 27, such as wires 35. The wires 35 can be routed along the interior wall of side bracket 44a and inserted through one or more wire bores 64 (see FIG. 5F) in the backing plate 62, through the hull 26, and into the interior of the marine vessel 30 where the wires 35 can connect with the electrical control system of the thruster system 20. The circuit cap 52 can provide a mount for the motor 22 in order to position the motor 22 inside of the tube 43a,43b so that the motor 22 is suspended and not in direct contact with the interior wall 49 of the tube 43a,43b. The suspended position of the motor 22 provides space for water to flow through the tube 43a,43b. The suspended position of the motor 22 is shown in FIG. 5J, where opening 47 surrounds the motor 22 and provides a space between the motor 22 and the interior wall 49 of the tube 43a,43b.

Figure 5L:
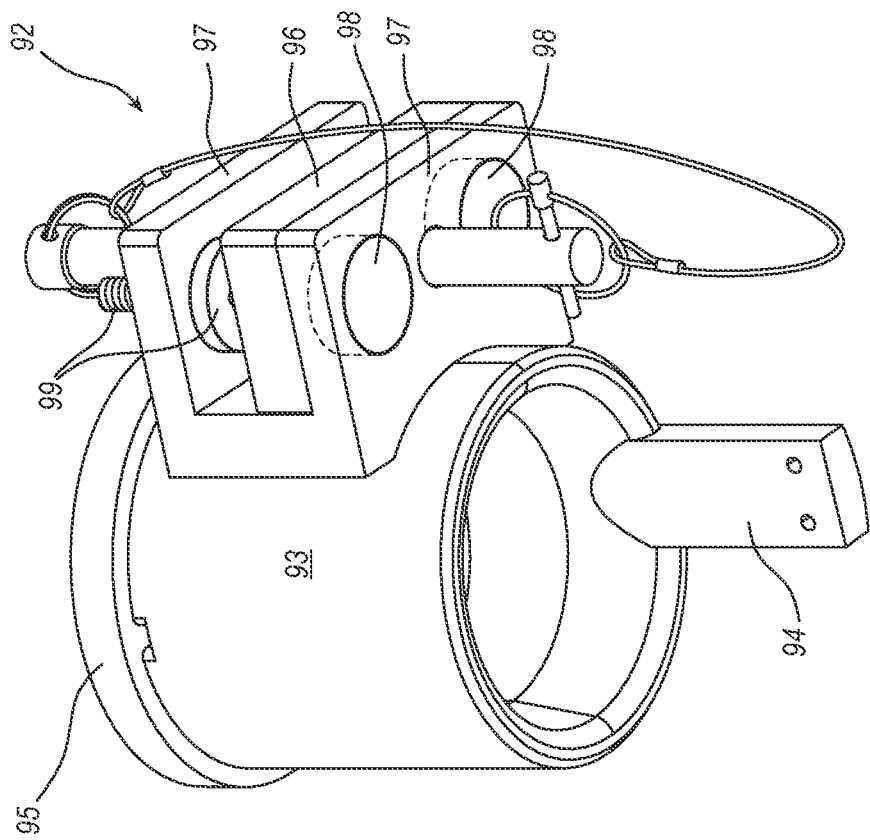
FIGS. 5K and 5L illustrate alternative embodiment of a mounting bracket of a modular thruster motor designed to increase the speed, and thus efficiency, of the motor's propeller by using a venturi effect produced by the bracket.
Figure 5K:
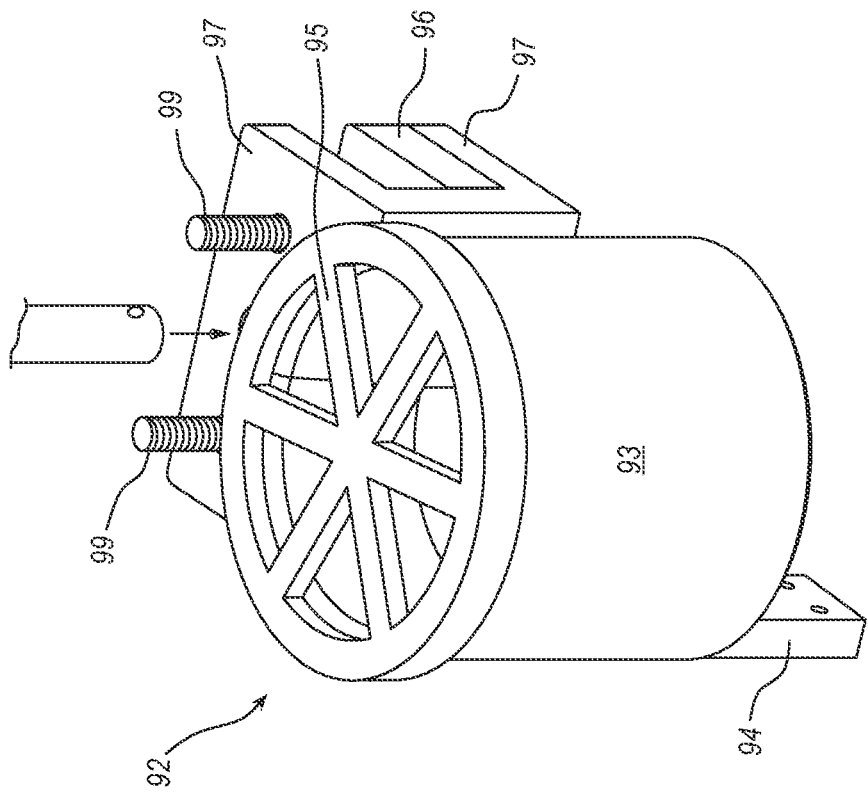

FIGS. 5L and 5K illustrate an alternative embodiment of mounting bracket 24,40. This mounting bracket 92 is configured to be mounted on a swim deck of a marine vessel. Mounting bracket 92, as shown in the drawings, comprises a bracket 97 which is welded or fused with a tube 93. The tube 93 is configured to provide the same effects as tube 43a,43b discussed above. The mounting bracket 92 further includes a post or extension arm 94 to which a motor 22 can be selectively attachable to and selectively removeable from. This can allow the motor 22 to be removed from the mounting bracket 92 and repaired or replaced without requiring removal of the mounting bracket 92 from a marine vessel. The mounting bracket 92 further includes a propeller guard 95 (45) which can be welded or fused to the tube 93 to prevent inadvertent contact with a motor propeller.

The bracket 97 of the mounting bracket 92 further includes a shim 96 which is selectively removeable from and selectively attachable to the bracket interior 89. The shim 96, as shown in the Figures, can have one or more protrusions 83 which can be aligned with and inserted into complementary-sized and shaped openings 98 in the bracket 97. The shim 96 can be used to shorten the distance between the swim deck and the mounting bracket 92, thereby providing for more secure attachment of the mounting bracket 92 to a swim deck.

The mounting bracket further includes screws 99 inserted through screw holes 81 in the side of bracket 97 opposite from the side configured to receive a shim 96. The screw holes 81 can accommodate clamping screws 99 which can be screwed into the holes 81 and tightened relative to the shim 96 in order to secure the mounting bracket 92 in place on a swim deck. In some embodiments, the screws 99 can be threaded hex head set screws with a "free floating" or "rotating" retention pad.

As shown in FIGS. 5K and 5L, the bracket 97 further includes pinholes 79 on opposing sides of the bracket 97 to accommodate the insertion of a safety pin or locking pin 87. The locking pin can engage with the swim deck to secure the mounting bracket 92 to the swim deck. The embodiment in FIGS. 5K and 5L can be integrated into a marine vessel thruster system, or the bracket can be added to a marine vessel as an after-market addition.

The various mounting brackets described above provide for the motors 22 of the modular thruster motor/propeller units 27 to be mounted off of the hull 26 and away from the marine vessel 30 so that the motors 22 themselves are not in direct contact with the hull 26. Rather, the mounting bracket 24 (FIG. 2-3), 40 (FIG. 5A-5G), 70 (FIG. 4A-4B) is mounted at a location on the hull 26 or on a support 34 extending from the hull 26, and then the motor 22 is mounted on the mounting bracket 24 (40, 70). Because the motors 22 are not mounted directly on the hull 26, and are instead mounted on a mounting bracket 24 (40, 70, 90), this can increase the leverage or torque of the motors 22, thereby providing for relatively small motors 22 to turn a marine vessel 30 while using less power or a lower level of thrust. The electric motor 22 of the present invention may be a brushless electric motor capable of generating about 1 kw to about 3 kw of power. 1 horsepower≅745.7 watts, and 1 kw=1000 watts, therefore the motor 22 may be capable of generating about 0.5 hp to about 4.5 hp. A small boat may have a primary trolling motor which typically generates about 10 hp to 15 hp to operate the boat. The primary propulsion system (motor and propeller) of a water ski boat must generate at least 200 hp in order to operate the boat, while a surf boat must generate at least 500 hp or more in order to operate correctly.

Each component of the modular thruster motor/propeller unit 27 can be independently removable from and separately replaceable apart from the other components of other modular thruster motor/propeller unit(s) 27. For example, if an electric motor 22 requires repair or replacement, the electric motor 22 can be removed from the mounting bracket 24 (or any other mounting brackets described herein) and repaired, or it may be replaced with a new electric motor 22. In similar fashion, if a mounting bracket 24 (40, 70, 92) were in need of repair or replacement, the mounting bracket can be removed for repair or replaced with a new mounting bracket 24,40,70, 92 without requiring replacement of the electric motor 22, or replacement or removal of other components of the thruster system 20, such as, for example, the electrical control system 100 or the control mechanism 112.

Figure 6A:
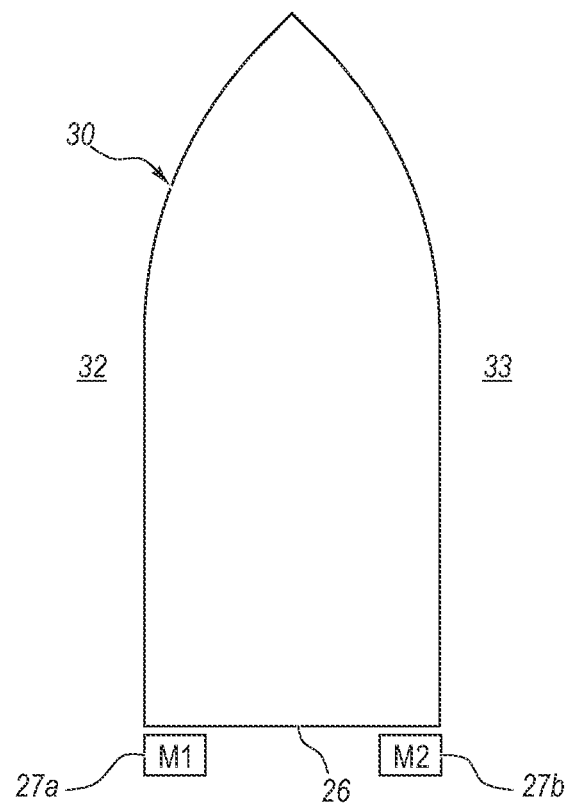
FIGS. 6A and 6B illustrate a schematic view of example locations for mounting modular thruster motor/propeller units at the stern of a marine vessel.
Figure 6B:
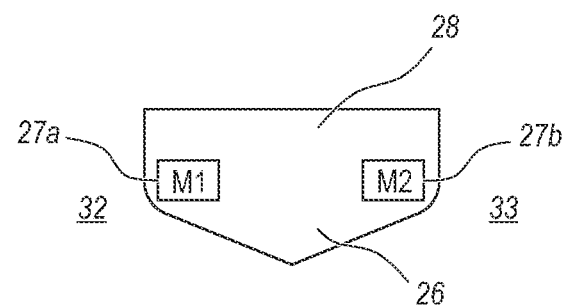
Figure 8A:
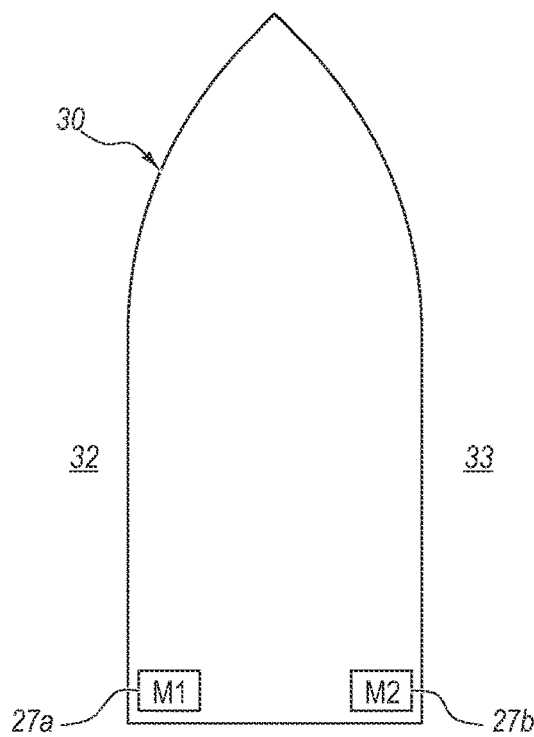
FIGS. 8A and 8B illustrate a schematic view of example mounting locations for the modular thruster motor/propeller units, and wherein the thruster units are deployable and retractable.

The modular thruster motor/propeller units 27 can be strategically mounted on the hull 26 of a marine vessel 30 to improve maneuverability. In one embodiment of a mounting configuration, as illustrated in FIGS. 6A and 6B, a first modular thruster motor/propeller unit 27a is mounted aft of the hull 26 on a port side 32 of a marine vessel 30, which can allow the first modular thruster motor/propeller unit 27a to provide directional thrust to the hull 26 at the hull's aft. A second modular thruster motor/propeller unit 27b is mounted aft of the hull 26 on a starboard side 33 of the marine vessel 30 to provide directional thrust to the starboard side 33 of the hull 26 at the hull's aft.

In some embodiments, such as the exemplary embodiment illustrated in FIGS. 7A-7C, a third modular thruster motor/propeller unit 27c can be mounted on the hull 26 of a marine vessel 30. The third modular thruster motor/propeller unit 27c can be mounted towards a fore portion 86 of the hull 26 relative to the aft mounting locations of the first and second modular thruster motor/propeller units 27a, 27b.

Figure 9A:
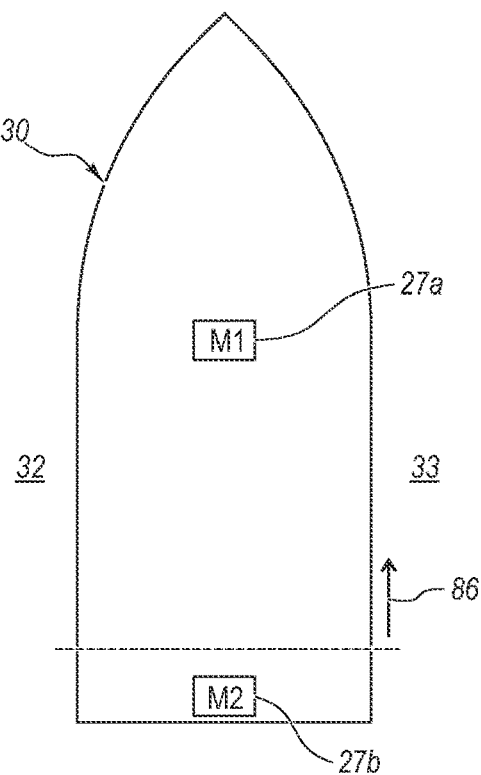
FIGS. 9A and 9B illustrate a schematic view of another example of mounting locations for the modular thruster motor/propeller units on a marine vessel wherein the modular thruster units are deployable and retractable.
Figure 8B:
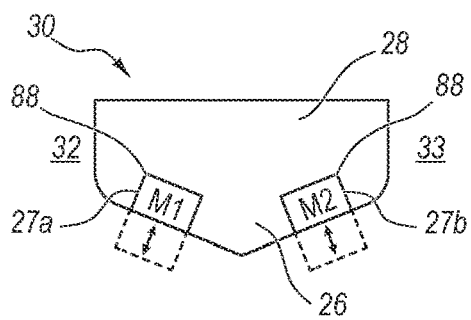
Figure 9B:
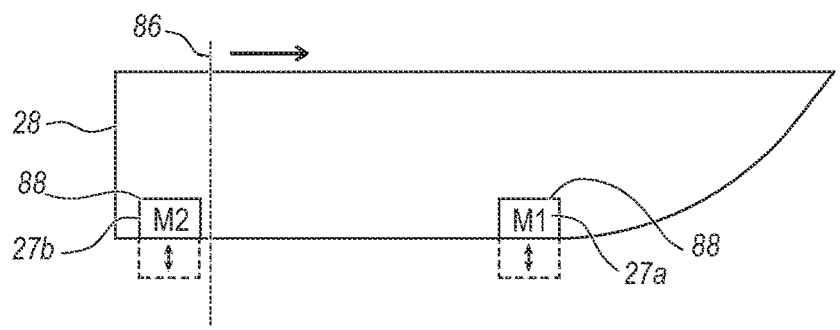
Figure 10:
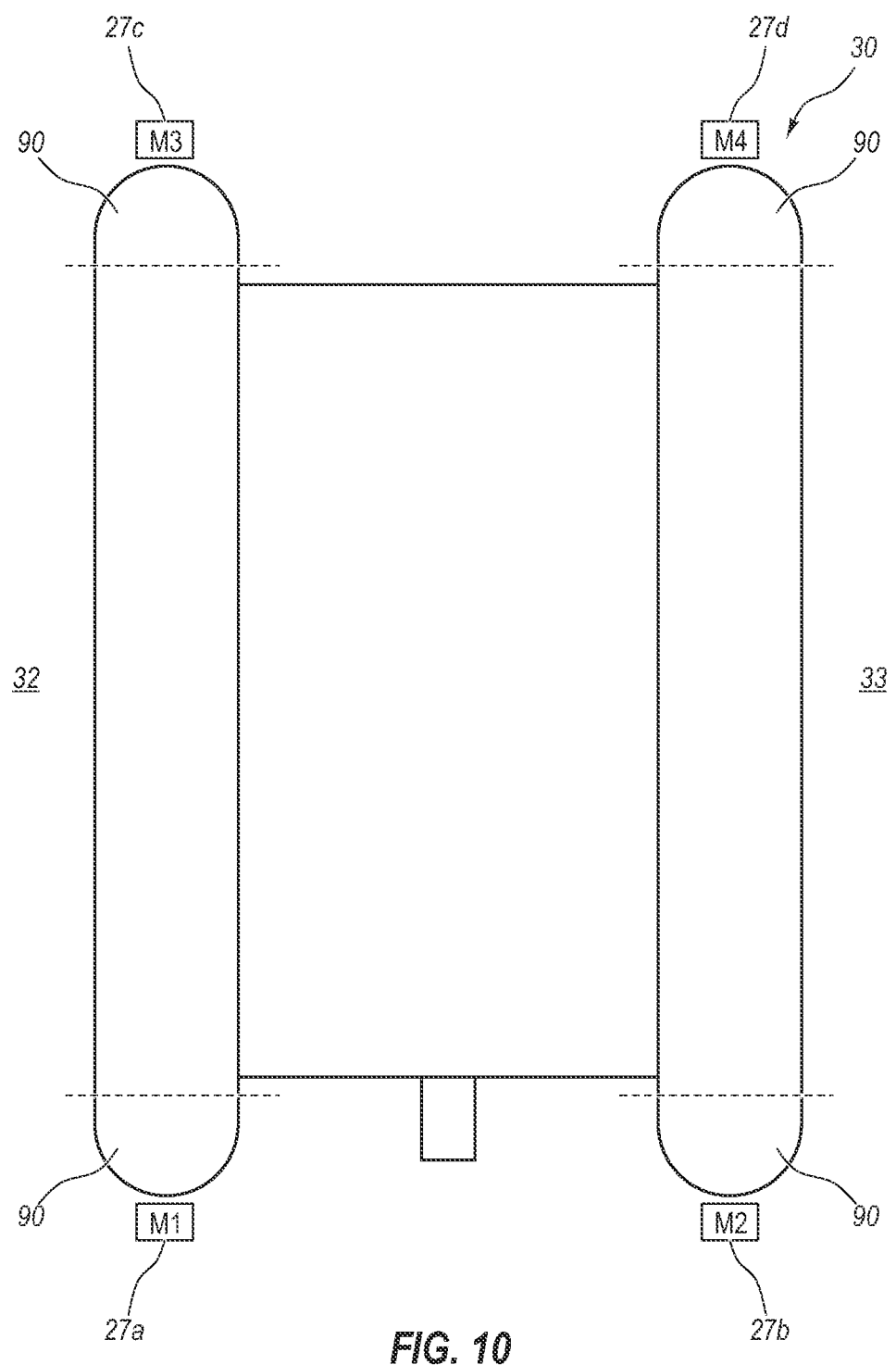
FIG. 10 illustrates a top plan view of example mounting locations for modular thruster motor/propeller units on a pontoon-style boat.

In another embodiment, shown in FIG. 9A, the first modular thruster motor/propeller unit 27a can be mounted towards a fore portion 86 of the hull 26 relative to the mounting position of the second modular thruster motor/propeller unit 27b, which is mounted aft of the hull 26 on the transom 28 of the marine vessel 30. On certain marine vessels, it may be advantageous to add a fourth modular thruster motor/propeller unit 27d, such as on a pontoon boat (FIG. 10), or marine vessels 30 with similar configurations. On a pontoon boat, the modular thruster motor/propeller units 27 can be mounted on respective end portions 90 of the marine vessel 30.

Each of the modular thruster motor/propeller units 27 can be independently mountable to and removable from their respective mounting location on the hull 26 of a marine vessel 30, with respect to other modular thruster motor/propeller unit(s) 27 and other components of the thruster system 20. Furthermore, each modular thruster motor/propeller unit 27 can be independently controlled and operated apart from other modular thruster units 27, as well as operated in tandem with other modular thruster units 27 of the thrust system 20. For example, a modular thruster motor/propeller unit 27 mounted aft of the hull 26 on the starboard side 33 can be activated while other modular thruster units 27 mounted to the hull 26 remain inactive. Conversely, in another example, a modular thruster motor/propeller unit 27 mounted aft of the hull 26 on the starboard side 33, and a modular thruster unit 27 mounted aft of the hull 26 on the port side 32 can be activated and operated in tandem or in concert with one another.

In some embodiments, the modular thruster motor/propeller unit(s) 27 can be in a retractable system as illustrated in FIGS. 8A, 8B, 9A and 9B. At least one of the modular thruster motor/propeller units 27 can be stored within a cavity 88 in the hull 26 of the marine vessel 30 when the modular thruster units 27 are not in use, or when the primary propulsion system of the marine vessel 30 is in operation. The modular thruster motor/propeller units 27 can be deployed from their respective cavities 88 upon a user activating a control mechanism coupled with the electrical control system to deploy the modular thruster units 27. In some embodiments, once deployed, the motor 22 and/or the entirety of the modular thruster motor/propeller unit 27 can oscillate or articulate so as to allow for independent thrust vectoring.

In some embodiments, the electrical control system 100 (FIGS. 11-15) can be configured to deploy or activate or engage the modular thruster motor/propeller units 27 automatically, without user input or activation of the system, when the electrical control system detects that the marine vessel 30 is operating in a manner which meets conditions for automatic deployment. The conditions for automatic deployment of the modular thruster motor/propeller units 27 may include operation of the marine vessel 30 below a designated speed threshold, operation of the marine vessel 30 in shallow water, sensing of obstacles within a certain range of the marine vessel 30, trailering, docking, etc.

Various sensors can be incorporated into the electrical control system to assist in maneuvering the boat, such as GPS, one or more proximity sensors, and sensors that permit triangulation relative to objects, such as a trailor, dock, slip, or other marine vessel.

Turning now to FIGS. 11-15, the thruster system 20 includes an electrical control system 100 for controlling each modular thruster motor/propeller unit 27. The electrical control system 100 comprises electrical circuit components configured to separately control the electric motor 22 of each thruster motor/propeller unit 27 to provide a directional thrust in order to apply force to the hull 26 of a marine vessel in a desired direction, in order to, for example, provide enhanced maneuverability at low speeds.

The electrical control system 100 can be mounted inside of a marine vessel, such that the electrical control system 100 can be accessible from a deck portion of the marine vessel (not shown). The deck portion of a marine vessel can be the interior of the marine vessel, which does not come into contact with the body of water in which the marine vessel operates during ordinary use. Ordinary use does not include accidents which would expose the interior of the marine vessel to water, such as, for example, capsizing.

The electrical control system 100 can be mounted inside of the marine vessel independent of other components of the thruster system 20, such as the modular thruster motor/propeller units 27 and control mechanism 112. The electrical control system 100 can also be removed from the marine vessel independent of the aforementioned thruster system components 20, thereby allowing the user to fix or replace electrical circuit components or the entire electrical control system 100 without requiring removal of the modular thruster units 27 or the control mechanism 112.

As shown in FIGS. 11-15, the electrical circuit components of the electrical control system 100 can comprise various combinations of the following components including: DC/DC converter 102, electronic speed control (ESC) unit 104, processor 106, on/off relay 114, modular battery pack 115, and charge controller 116. In some embodiments, electrical circuit components may be integrated into or housed within other components of the thruster system 20. For example, the electric motor 22 may be configured to house a modular battery pack 115 and an ESC unit 104 within the housing of the electric motor 22. In some embodiments, the processor 106 may be incorporated or integrated with a control mechanism such as a touchscreen or tablet computer.

As further illustrated by the embodiments in FIGS. 11-15, the electrical control system 100 can be comprised of a single module 101 comprising electrical circuit components, or in the alternative, the electrical control system 100 can comprise one or more modules 101, wherein each module 101 can comprise electrical circuit components.

Figure 11:
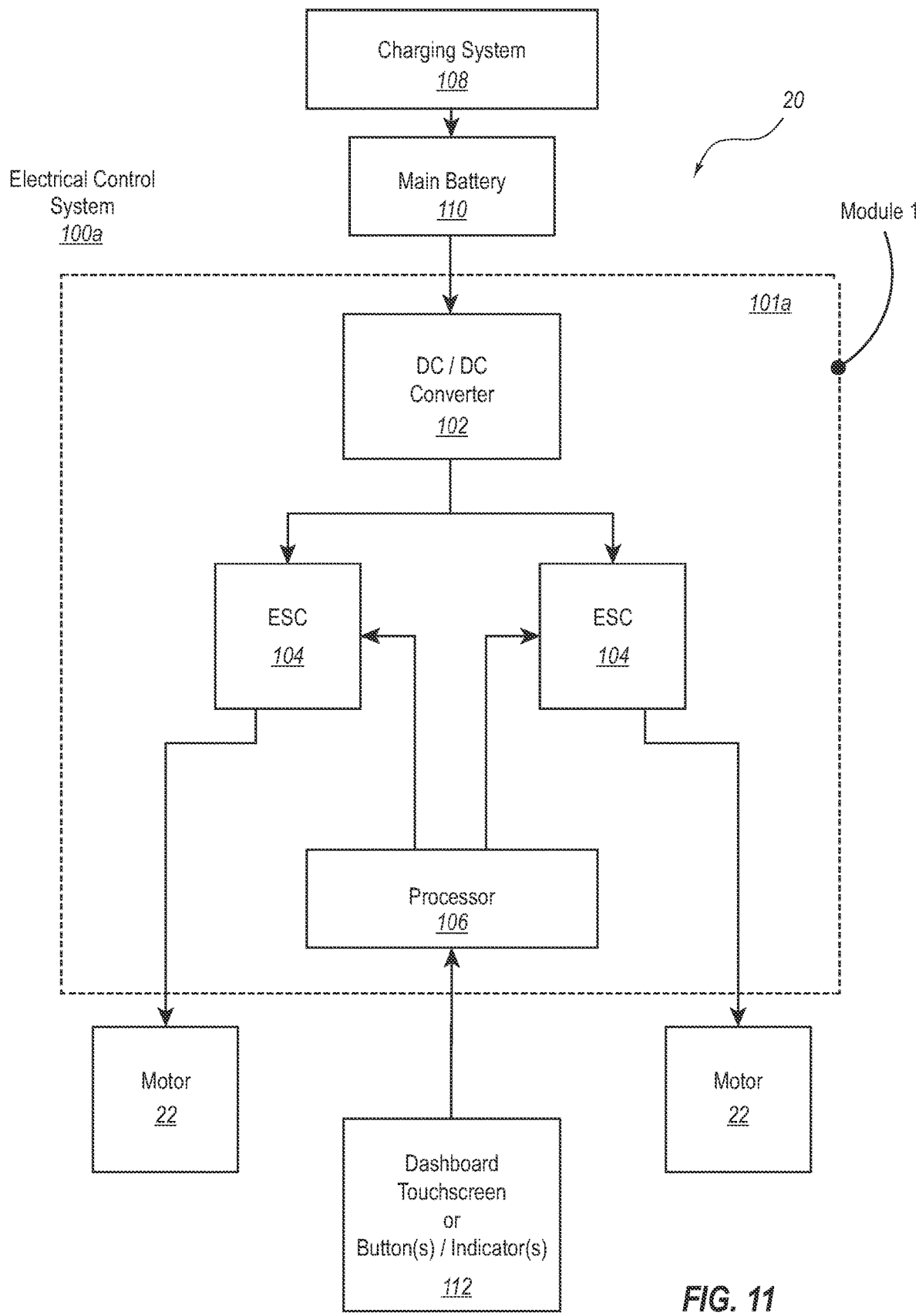
FIG. 11 illustrates a schematic view of an electrical control system used to control the individual thruster motors, wherein the electrical control system is a single module.

FIG. 11 illustrates a first example embodiment of a thruster system 20, comprising a plurality of motors 22, which are each part of a modular thruster unit 27 (see FIGS. 2-3) and electrical control system 100a, and a control mechanism 112. The electronic control system 100a comprises a single module 101a comprising a DC/DC converter 102 coupled to a plurality of Electronic Speed Control (ESC) units 104, and a processor 106 electrically coupled to each ESC unit 104. The ESC units 104 can be configured so that each ESC unit 104 separately controls one of the electric motors 22.

The thruster system 20 can further comprise a charging system 108, which may also be referred to as the central charging system, electrically coupled to a main battery 110. The charging system 108 can be an integrated charging system of the marine vessel 30, or it can be a separate component added to the marine vessel to charge the main battery 110. Charging can be done by drawing power from the alternator of a marine vessel 30, though charging may be supplemented by solar panels, wind turbines, or other renewable energy harvesters which can be mounted on a marine vessel 30.

The main battery 110 can be electrically coupled to a DC/DC converter 102, thereby supplying power to the electrical control system 100, which can in-turn supply power to each ESC unit 104, such as to control the motors 22. In embodiments where the electrical control system 100 comprises an on/off relay 114, the on/off relay 114 (FIG. 12) can be electrically coupled to the main battery 110, thereby enabling and disabling the power flow from the charging system 108 and main battery 110 to the electrical control system 100.

The thruster system 20 can further comprise a control mechanism 112 electrically coupled to the electrical control system 100. The control mechanism 112 can provide a operational commands used by the electrical control system 100 to control the electric motor 22 of each modular thruster unit 27 either independently, or in tandem, to provide the desired amount of directional thrust to the hull 26 of a marine vessel 30. In some embodiments, the control mechanism 112 can be configured as a separate module which can be independently removable from and separately replaceable apart from any module of the electrical control system 100. The control mechanism 112 can be configured to input commands to the processor 106. The processor 106, being electrically coupled to the ESC unit 104, communicates the input commands to the ESC unit 104 thereby controlling the directional thrust applied to the hull 26 of the marine vessel 30 by the one or more electric motors 22.

Figure 12:
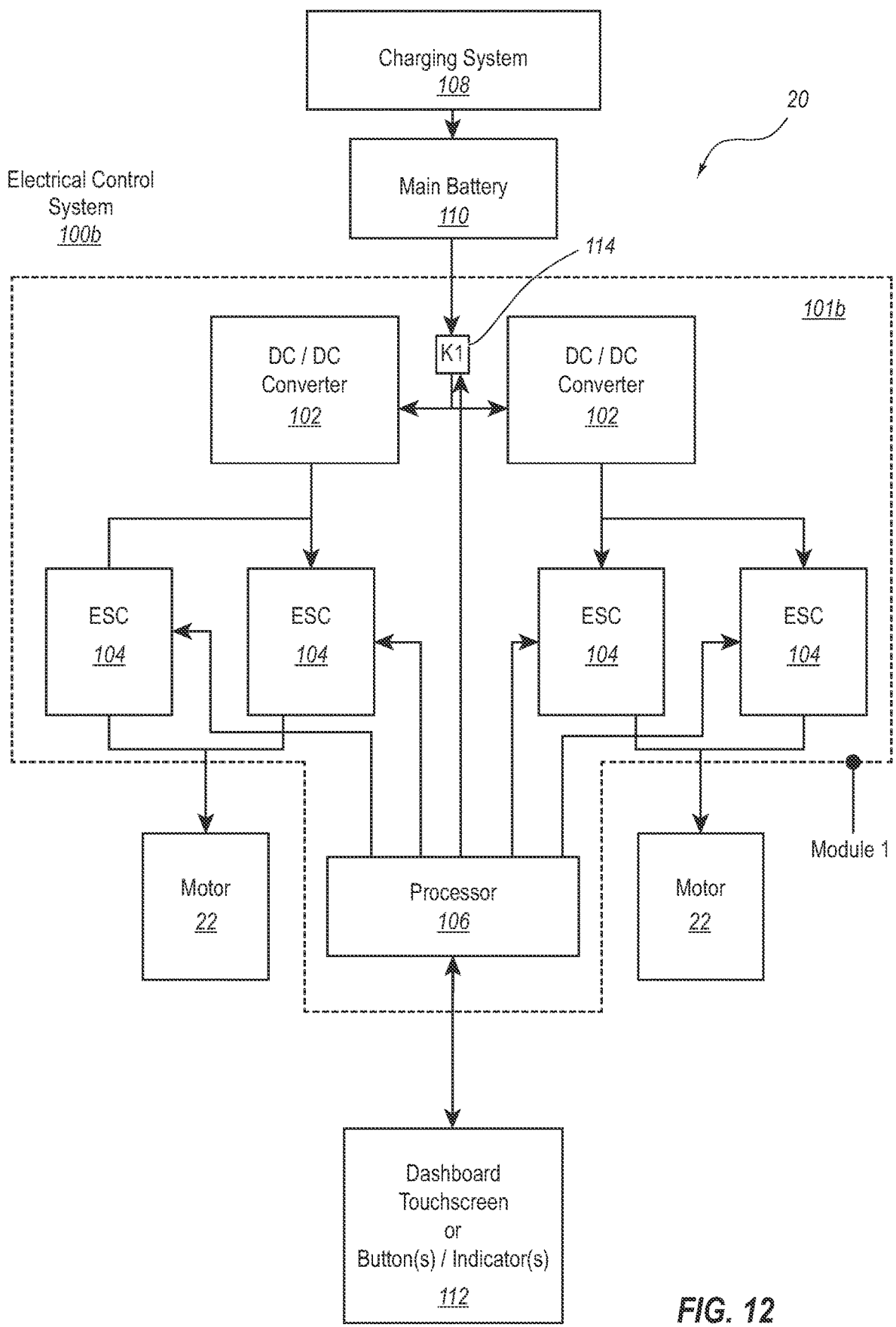
FIG. 12 illustrates a schematic view of another embodiment of an electrical control system used to control the individual thruster motors, wherein the electrical control system is configured as a single module.

FIG. 12 illustrates another embodiment of a thruster system 20, wherein the electrical control system 100b comprises one module 101b. The module 101b, as shown, comprises a plurality of ESC units 104 configured in pairs. Each pair of ESC units 104 can separately control each of the electric motors 22. In embodiments where a single ESC unit 104 is paired with a motor 22, the ESC unit 104 can be a bi-directional ESC unit, capable of causes the motor 22 to spin the propeller 29 in both a clockwise and a counter-clockwise direction. In some embodiments, the ESC units 104 may only be capable of spinning the motor 22 in one direction, therefore, two ESC Units 104 may be used, wherein one ESC unit 104 causes the motor 22 to spin only in a clockwise direction, and the other ESC unit 104 causes the motor 22 to spin only in a counterclockwise direction. By pairing these mono-directional ESC units 104, the motor 22 to which they are paired can cause the propeller 29 to spin in both a clockwise and a counterclockwise direction.

The electrical control system 100b can further comprise at least two DC/DC converters 102, wherein each DC/DC converter can be electrically coupled to a pair of ESC units 104. An on/off relay 114 can be electrically coupled to each of the DC/DC converters 102. The on/off relay 114 can regulate the power flow from the main battery 110 to the electrical control system 100b. A processor 106 can be electrically connected to each of the ESC units 104 and to the on/off relay 114.

Figure 13:
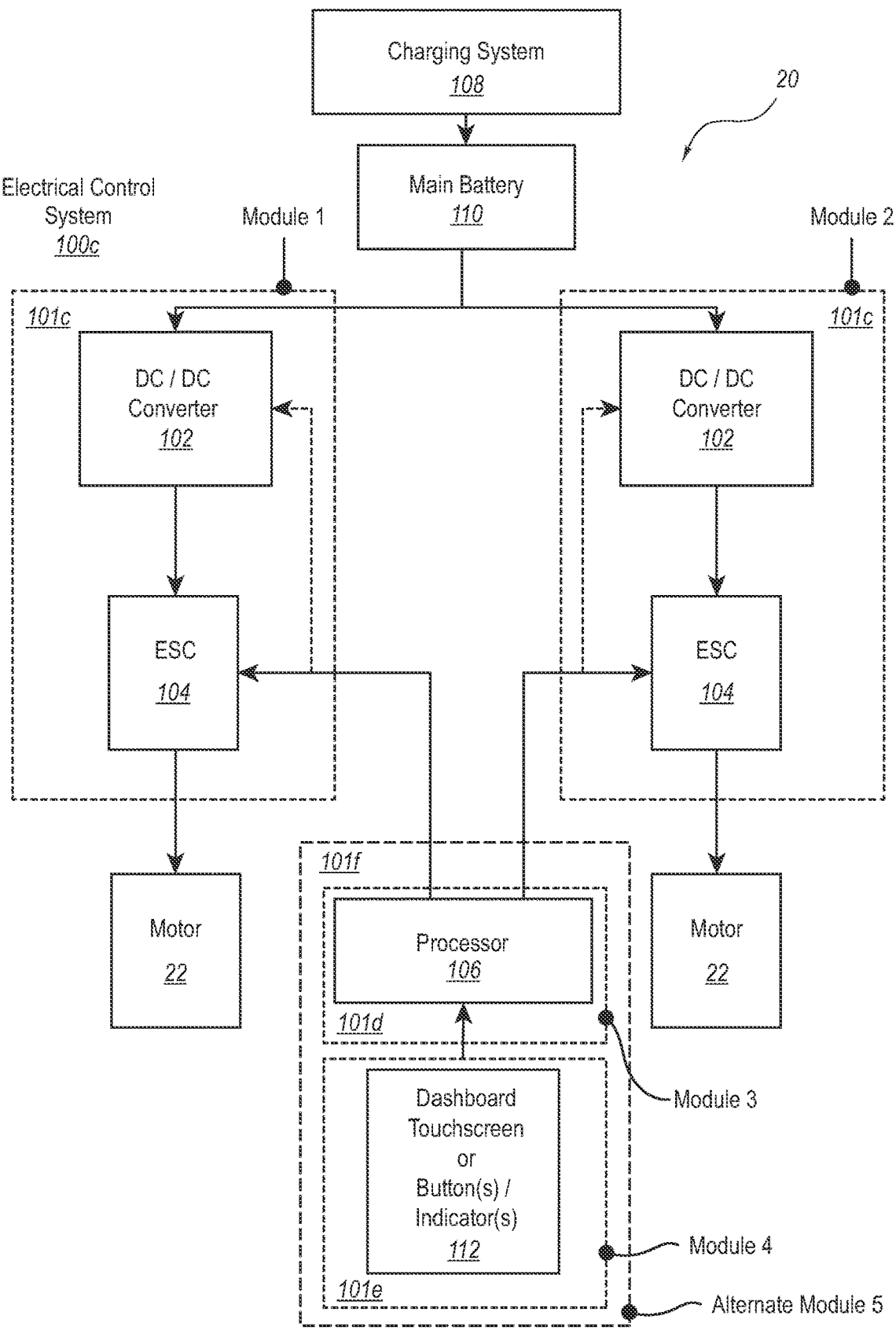
FIG. 13 illustrates a schematic view of another embodiment of an electrical control system used to control the individual thruster motors, wherein the electrical control system is configured with separate modules controlling the thrust applied by each thruster motor/propeller unit.

FIG. 13 illustrates another embodiment of the thruster system 20, comprising a plurality of thruster motors 22, a processor 106, and a charging system 108 coupled to a main battery 110, and a control mechanism 112. In the embodiment of FIG. 13, each modular thruster motor/propeller unit 27 is controlled by its own corresponding separate module 101c. Each module 101c comprises electrical circuit components configured to provide the directional thrust that is independently controllable for each electric motor 22.

The electrical control system 100c further comprises independent modules 101d and 101e, each configured to be removed from and separately replaceable in the electrical control system 100c apart from any other module of the electrical control system 100c.

A first module 101c can comprise at least one DC/DC converter 102 electrically coupled to an ESC unit 104. A second module 101c similarly comprises at least one DC/DC converter 102 electrically coupled to an ESC unit 104. Each of the ESC units 104 can be electrically coupled to a separate electric motor 22.

A third module 101d can comprise a processor 106, which can be electrically coupled to each ESC unit 104 of the first module and the second module 101c. As noted, because the processor 106 comprises a separate module 101d, it can be removed from and separately replaceable in the electrical control system 100c without requiring removal or replacement of other modules.

The thruster system 20, as illustrated in FIG. 13, can include a central charging system 108 electrically coupled to a main battery 110. The main battery 110 can be electrically coupled to first module 101c and second module 101c by coupling the main battery 110 to each DC/DC converter 102 of each respective module. The charging system 108 is discussed above in relation to FIGS. 11-12 and is discussed further below.

The thruster system 20 of FIG. 13 further includes a control mechanism 112, which can be configured as a fourth module 101e so as to be removable from and separately replaceable apart from any of modules 101c or module 101d of the electrical control system 100. The control mechanism 112 can be configured to input commands to the processor 106, and the commands can be used to control the directional thrust to be applied to the hull 26 of the marine vessel 30 using the ESC unit 104 for each electric motor 22. The control mechanism 112 can take the form of any of the control mechanisms discussed further below.

Figure 14:
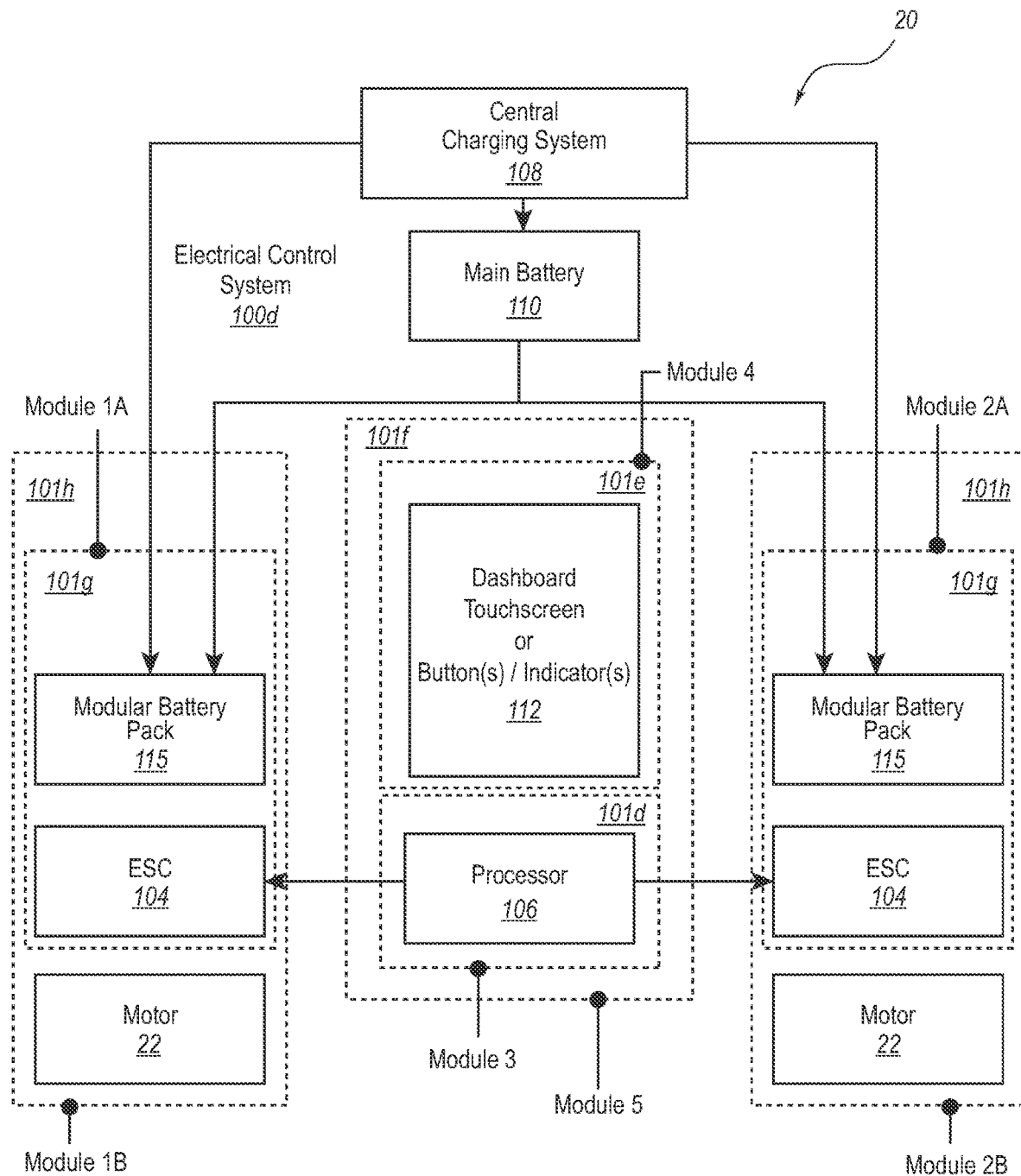
FIG. 14 illustrates a schematic view of another embodiment of an electrical control system used to control the individual thruster motors, wherein the separate modules of the of the electrical control system each include a battery pack.

In some embodiments, the processor 106 and control mechanism 112 may be combined to form an integrated module 101f (see also FIG. 14). When configured in this way, module 101f can take the form of, for example, a boat dashboard, a tablet computer having a touchscreen, a smart-phone, or similar electronic device comprising the function of both a processor 106 and a control mechanism 112. In this embodiment, the tablet computer may be used to download software programmed to control the operation of the thruster system 20. The downloadable software may comprise the program disclosed in Appendix A. This may allow a user to download software while traveling or while engaging in boating activities. Once the software is downloaded, the tablet computer or smartphone may be electrically coupled to the modules 101c of the electrical control system 100.

In another embodiment, when the processor 106 and control mechanism 112 are combined to form an integrated module 101f, the processor 106 may still be separately removeable or replaceable apart from the control mechanism 112.

Turning now to FIG. 14, which illustrates another embodiment of a thruster system 20, the electrical control system 100d can comprise a plurality of independent modules, each module configured to be removed from and separately replaceable in the electrical control system 100d apart from any other module of the electrical control system 100d. A first module 101g can comprise a modular battery pack 115 and an ESC unit 104. A second module 101g can also comprise a modular battery pack 115 and an ESC unit 104.

The modular battery pack 115 can receive power (i.e., be recharged) from the main battery 110 and/or the central charging system 108 and can serve as an independent power source for each ESC unit 104 once the modular battery pack 115 is charged. Each ESC unit 104 can be electrically coupled to a separate electric motor 22 and configured to control the speed of the electric motor 22.

A third module 101d can comprise a processor 106, which can be removable from and separately replaceable apart from any other module of the electrical control system 100d. In an alternative embodiment, as discussed above for FIG. 13, the control mechanism 112 can be integrated with the processor 106, forming an integrated module 101f, which is removable from and separately replaceable apart from the other modules of the electrical control system 100d.

In some embodiments, the modular battery pack 115 and ESC unit 104 can be combined with the electric motor 22 to form a separate module 101h. Modules 101g can, in some embodiments, be integrated with separate electric motors 22 to form the modules 101h of the electrical control system 100d. In this embodiment, the electric motor 22 of the modular thruster motor/propeller unit 27 can comprise a modular battery pack 115 and an ESC unit 104. In some configurations, the modular battery pack 115 and ESC unit 104 can be removable from and separately replaceable apart from the electric motor 22 in the case where the modular battery pack 115 or ESC unit 104 need to be repaired or replaced.

Figure 15:
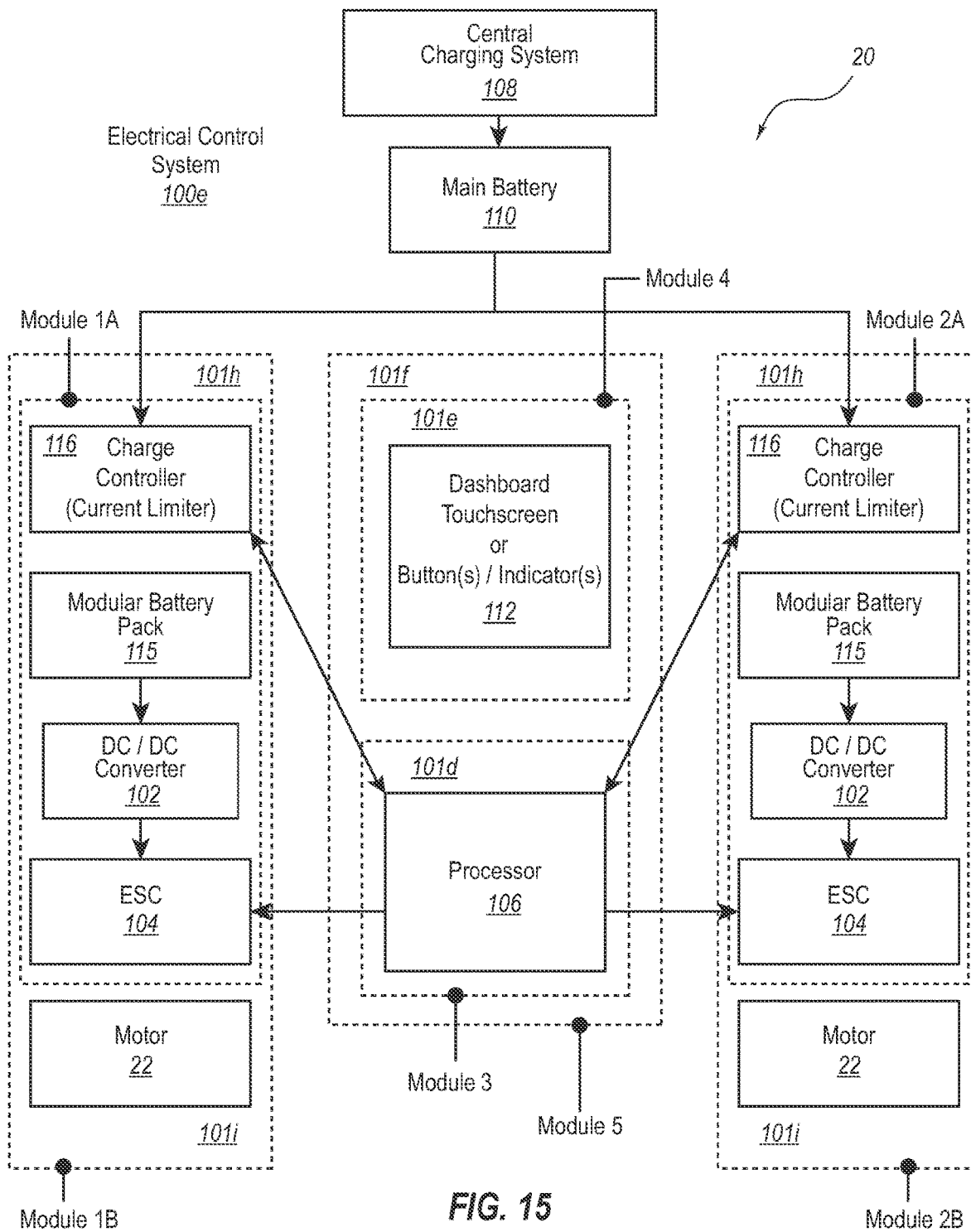
FIG. 15 illustrates a schematic view of another embodiment of an electrical control system used to control the individual thruster motors, wherein the separate modules of the electrical control system each include a charge controller used to limit current from the marine vessel's main battery.

In another embodiment of a thruster system 20, the electrical control system 100e can comprise three or more independent modules 101, wherein each module 101 of the electrical control system 100e can be removable from and separately replaceable in the electrical control system apart from any other modules 101 of the electrical control system 100. FIG. 15 illustrates an embodiment similar to the electrical control system 100d of FIG. 14 with the addition of charge controllers 116. The ability to remove or replace each module apart from other modules of the electrical control system 100 can be advantageous by allowing a user to repair or replace a module without disassembling or removing the entire electrical control system 100 or the entire thruster system 20.

The electrical control system 100e of FIG. 15 can comprise a first module 101h comprising an ESC unit 104 electrically coupled to a modular battery pack 115, which in turn is connected to a charge controller 116. A second module 101h can also comprise an ESC unit 104, a modular battery pack 115, and a charge controller 116. Modules 101h can be independently operable of each other and can be removable from and separately replaceable in the electrical control system 100e apart from any other modules of the electrical control system 100e.

In some embodiments, the electrical circuit components of modules 101h can be in electrical communication with or electrically coupled to separate motors 22 and configured to control each respective motor 22 independently of one another. The ESC unit 104 of each module 101h can be electrically coupled to the processor 106 and to a separate motor in order to execute commands communicated to the ESC unit 104 from the processor 106.

Figure 16:
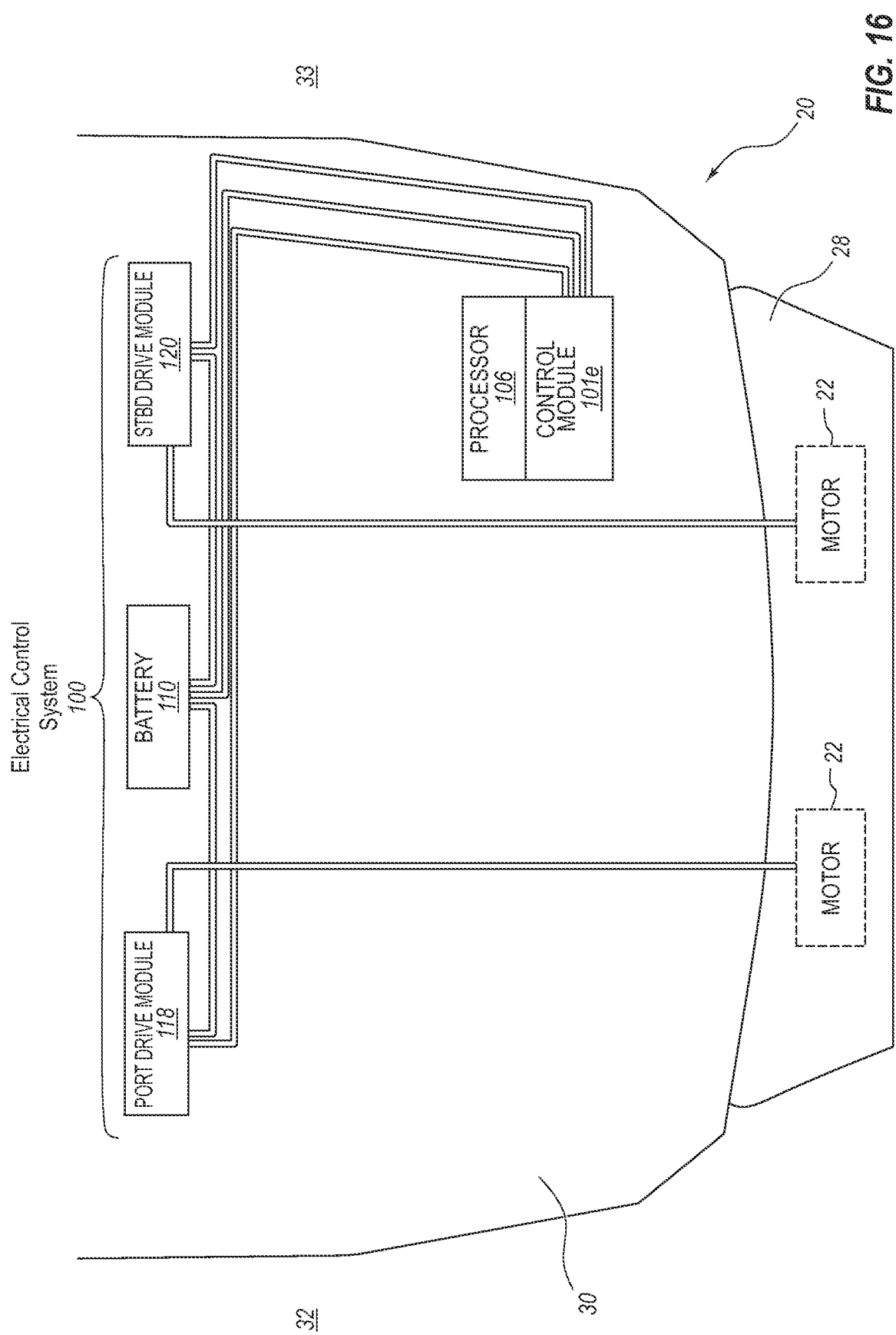
FIG. 16 illustrates a schematic view of an electrical control system for the thruster motors, showing one example way in which the components of the electrical control system can be placed in the marine vessel.

FIG. 16 illustrates a schematic view of an electrical control system 100 configured on a marine vessel 30. The starboard module 120 and port module 118 can comprise any of the modules 101 described above and which include an ESC unit 104 electrically coupled to a separate motor 22. The starboard module 120 can be a module 101 of the electrical control system 100 which can be mounted on the starboard side 33 of a marine vessel and/or configured to control a motor 22 mounted on the hull 26 towards the starboard side 120 of the marine vessel. The port module 118 can be a module 101 of the electrical control system 100 which can be mounted on the port side 32 of a marine vessel and/or configured to control a motor 22 mounted on the hull 26 towards the port side 32 of the marine vessel 30. The starboard module 120 and port module 118, as shown, are each electrically coupled to the battery 110 and a processor 106, all of which are mounted inside of the marine vessel 30, such as within a deck area of a marine vessel 30. The starboard module 120 and port module 118 are each electrically coupled to separate motors 22 mounted on the outside of the marine vessel 30 on the hull 26.

Generally, use of the thruster system 20 comprises a small amount of time relative to the amount of time the primary engine of a marine vessel is in use during operation. The main battery 110 of a marine vessel 30 is typically charged during operation of the primary engine. Due to this time/use ratio, the amount of time available for harvesting energy to charge the main battery 110, as well as the modular battery packs 115, is greater relative to the time required to operate the thruster system 20. This can provide for the use of modular battery packs 115 which are small relative to the primary battery 110 and can be discharged relatively quickly and charged relatively slowly. The charge controllers 116 described above can be used to moderate the charging progress of the modular battery packs 115, for example, by limiting current drawn from the main battery 110 as further described below, during operation of the primary engine of the marine vessel 30.

The charge controller 116 (FIG. 15) can charge the modular battery packs 115 at a time-dependent charge current and charge voltage, which is calculated based on the chemistry of the battery, resulting in the modular battery packs 115 becoming fully charged without overcharging and potentially damaging the modular battery packs 115. The charge controller 116 can also prevent the modular battery packs 115 from discharging power below a level that is suitable for the battery chemistry by imposing a minimum discharge level.

The charge current received by the modular battery pack 115 from the main battery 110 is typically substantially less than the amount of current required by the ESC unit 104 to operate the electric motor 22. For example, the charge current received by the ESC unit 104 may be about 1 amp to 3 amps, while the amount of current required by the ESC unit 104 to operate the electric motor 22 may be about 50 amps to about 100 amps. For example, a modular battery pack may charge and discharge energy as follows:

Charging a modular battery pack (trickle charging)
12V at 1 A for 4 hours
12V*1 A*14400 seconds=172800 Ws=172.8 kJ
Discharging a modular battery pack (motor operating)
12V at 80 A for 3 minutes
12V*80 A*180 seconds=172800 Ws=172.8 kJ Because the charge current is substantially lower than the operational current, the wire connecting the modular battery pack 115 and ESC unit 104 to the main battery 110 for charging can be a smaller diameter wire and charging can take place by trickle charging.

The power for operation of the ESC unit 104 and the motor 22 in such configurations (for example, FIGS. 14-15) can be drawn from the modular battery pack 115, rather than directly from the main battery 110, resulting in less strain on the wiring between the modular battery pack 115 and the main battery 110 and/or charging system 108. For example, in reference to the example calculations above, the wire between the modular battery pack 115 and the main battery 110 and/or charging system 108 needs to handle only 1 amp (~20 AWG) in order to trickle charge the modular battery pack 115, rather than to handle 80 amps needed to operate the motor 22. Trickle charging can allow for the modular battery packs 115 to charge at a low current, thereby reducing power strain on the main battery 110 of the marine vessel 30.

Trickle charging can be advantageous for a number of additional reasons, including reduction in overall cost of manufacturing by allowing for the use of smaller gauge or smaller diameter wires which are less expensive. Larger gauge or larger diameter wires typically comprise copper, which is an expensive material. Trickle charging can also result in a reduction in the overall weight of the thruster system 20 due to the use of smaller diameter wires, as well as a reduction in power dissipation (i.e. heat) in the wire, resulting in a safer and more efficient charging system.

The current required by the ESC unit 104 to operate the motor 22 typically requires between 50 amps to 100 amps. Minimizing the loss of power between the modular battery pack 115 and the motor 22 can result in more energy being delivered to the motor 22, which can in-turn produce more thrust. Loss can be minimized by reducing the resistance in the electrically conductive wires between the modular battery pack 115 and ESC unit 104 and the motor 22. Resistance can be reduced by reducing the length of the wires, which can require that the modular battery pack 115, the ESC unit 104 and the motor 22 be physically close to one another, or by increasing the cross-sectional areas of the wires which can add cost and weight.

In order to provide for the modular battery pack 115, ESC unit 104, and motor 22 to be close to one another to reduce resistance, the modular battery pack 115 and ESC unit 104 can be housed in a water-tight compartment within the housing of the motor 22. Module 101*g* and module 101*i* of the electrical control systems 100*d* and 100*e* of FIG. 14 and FIG. 15 respectively, illustrate the integration of a motor 22 with at least an ESC unit 104 and a modular battery pack 115. By submerging the water-tight compartment containing the modular battery pack 115 and ESC unit 104 in water with the motor 22, this can provide the added benefit of allowing for liquid cooling of the modular battery pack 115 and ESC unit 104, resulting in safer operation of the electrical control system and less strain and wear on electrical components.

Turning now to FIG. 17, the control mechanism 112 of the thruster system 20 allows a user to input commands to the processor 106, which then cause the electrical control system 100 to control the modular thruster motor/propeller units 27 to perform a variety of functions. The command inputs to the processor 106 from the control mechanism 112 may be a number of pre-programmed commands, while in other embodiments the commands may be entered manually, or the control mechanism 112 can be configured with both pre-programmed commands and a manual command entry function. The manual command entry function may comprise commands enabling a user to activate a specific directional thrust for each motor 22 independent of other motors 22, where the combination of directional thrust commands applied to each motor 22 can cause the marine vessel to maneuver in a specific direction or manner. For example, a user may enter a combination of commands to initiate a dock-hold sequence, wherein the motor/propeller units 27 can work individually and/or in combination to maintain the position of a boat against a dock so that the user can perform other tasks, such as tying off the boat to the dock, or picking up passengers.

When the commands are pre-programmed, a user may activate the control mechanism 112 by, for example, pressing a button 202 (FIGS. 20-23), which can activate a pre-programmed response. The pre-programmed thrust mode can comprise, for example, A) a starboard burst caused by simultaneous activation of a port side motor in forward, and a starboard motor in reverse. Additional thrust modes can include: B) a port burst caused by simultaneous activation of a port side motor in reverse and a starboard motor in forward, C) a starboard dock-hold caused by simultaneous activation of the port side motor in forward and the starboard motor in neutral, and D) a port side dock-hold caused by simultaneous activation of the port side motor in neutral and the starboard side motor in forward. The dock hold function can be set to operate for a desired time period, such as from 30 seconds to 5 minutes once the pre-programmed dock-feature is initiated.

In summary, the electrical control system and/or control mechanism can be adapted to cause the thruster units move or urge the marine vessel in a predetermined manner. The electrical control system may include executable instructions that, when executed by the electrical control system, cause the thruster units to move or urge the boat in the predetermined manner. In addition or alternatively, the control mechanism can be adapted so that, upon receipt of one or more user-initiated commands, the electrical control system causes the thruster units to move or urge the boat in the predetermined manner, such as a dock-hold sequence.

Figure 18A:
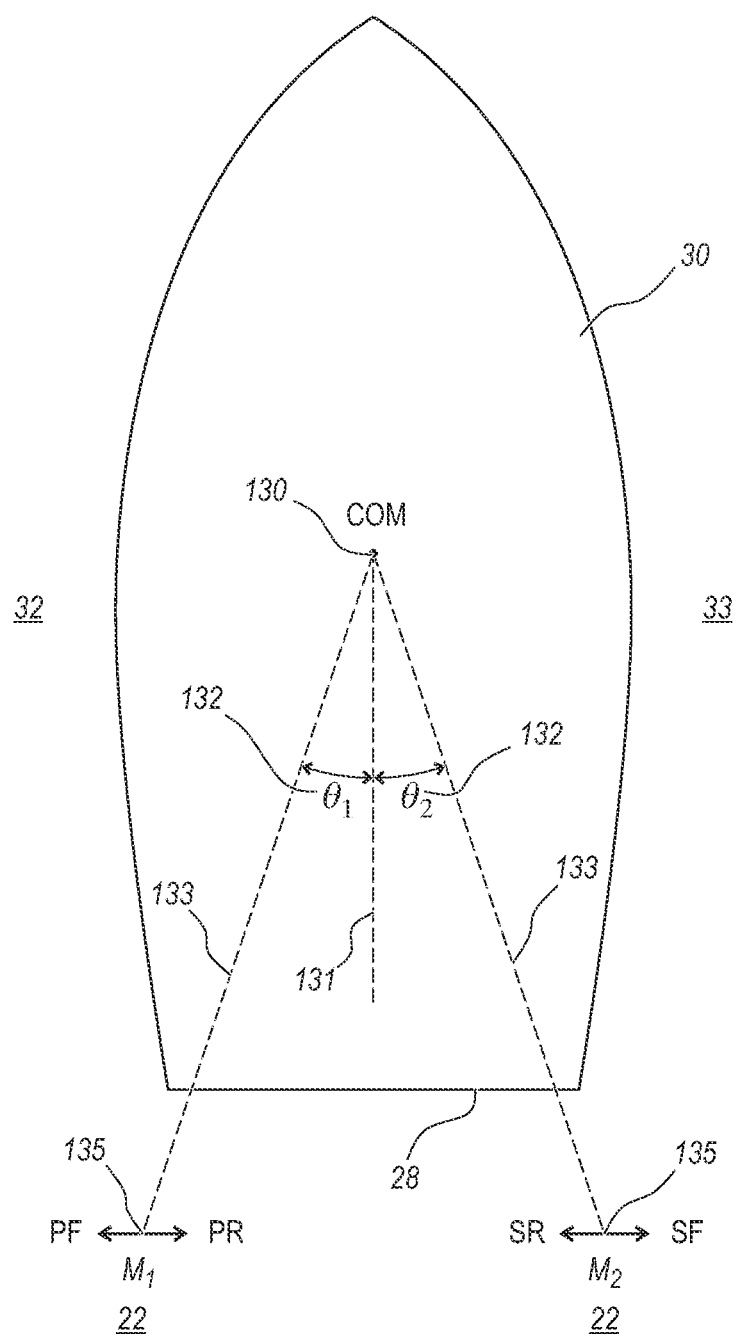
FIG. 18A illustrates an example of mounting positions of thruster motor/propeller units relative to the center of mass of a marine vessel.
Figure 18B:
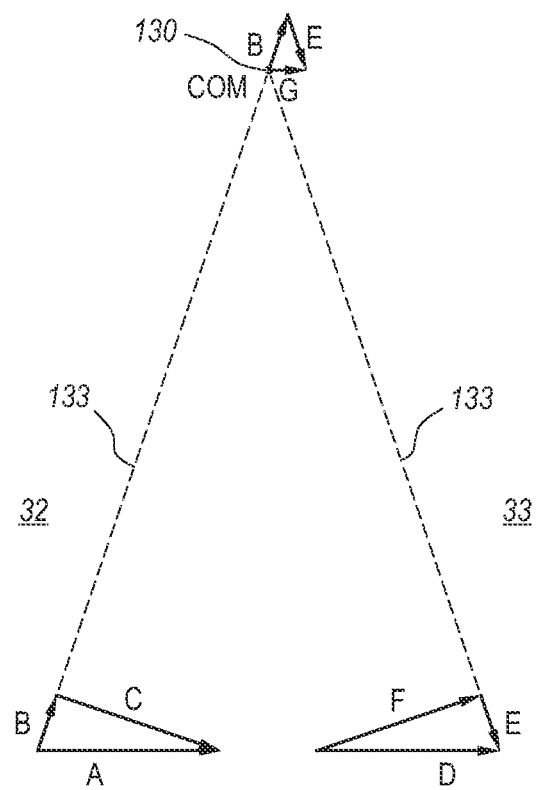
FIG. 18B illustrates an example of the maneuvering trajectory of the thruster motor/propeller units of FIG. 18A.

The mounting location of the modular thruster motor/propeller units 27 can affect the type of maneuverability available to a marine vessel 30 when performing rotational movements or lateral movements such as dock-holds. As shown in FIGS. 18A-18B, modular thruster motor/propeller units can be mounted at a variety of angles (01, 02) relative to a line 131 that runs from the center of mass 130 perpendicular to the transom 28 to produce a wide variety of maneuvering effects. FIG. 18A illustrates the mounting position of modular thruster motors 22 of thruster units 27 as shown in FIGS. 2 and 3, where the motors 22 of motor/propeller units 27 illustrated elsewhere are positioned to produce thrust along vector line 135 parallel to the transom 28. As shown in FIG. 18A by vector lines 135, motors 22 of thruster units 27 can be controlled to provide directional thrust as follows: Port Forward (PF), Port Reverse (PR), Starboard Forward (SF), Starboard Reverse (SR). Various combinations of these directional thrust functions can cause the hull 26 of the marine vessel to maneuver accordingly as explained further below.

In this configuration, as noted, the motors 22 of modular thruster motor/propeller units 27 are mounted so that the thrust vectors 135 are parallel with the transom 28 of the marine vessel 30. This mounting location can provide for the modular thruster units 27 on the port and starboard sides 32,33 of the vessel to apply directional thrust to the hull 26 to cause the marine vessel 30 to move in the respective direction of each or any combination of the thrust vector arrows A, B, C, D, E, F, and G along the constriction lines 133 as shown in FIG. 18B. This configuration in turn can force the marine vessel 30 to move laterally, and thus might be preferred when executing dock-hold functions, or other lateral maneuvers.

In FIG. 18B, for example, vector A can be decomposed into vector B and vector C. Vector C can cause the marine vessel to rotate about its center of mass 130 and vector B can move the boat forward. Vector F can work in concert with vector C to cause the marine vessel to rotate about its center of mass 130, while vector E can move the marine vessel in a reverse direction. Vector E and vector B can be added together to result in vector G. Vector G can cause the marine vessel to move to the side, while being rotated about its center of mass 130 by the combination of vector C and vector F. Vector C and vector F can cancel each other out if vector A and vector B are thrusting toward each other.

Figure 19:
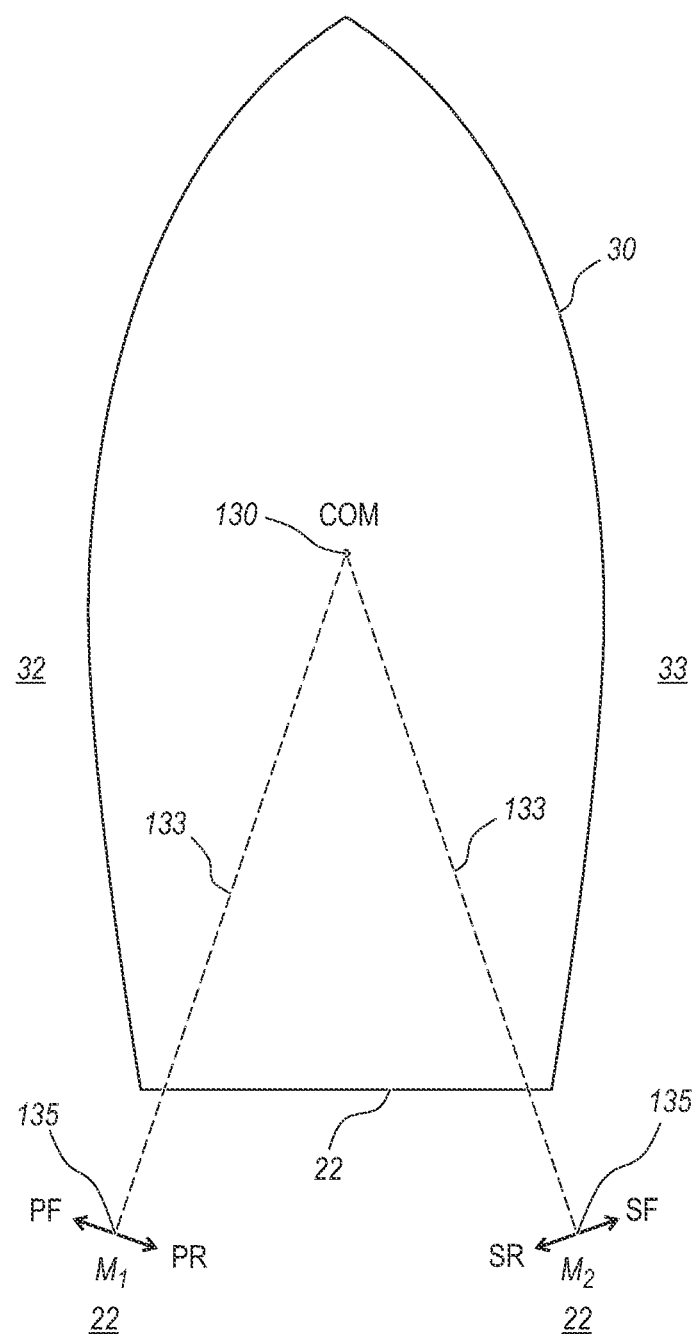
FIG. 19 illustrates an example of alternative mounting positions of the thruster motor/propeller units relative to the center of mass of the marine vessel.

FIG. 19 illustrates an alternative mounting position of motors 22 of the modular thruster motor/propeller units 27 shown elsewhere. The motors 22 are mounted such that the thrust vectors 135 of thruster units 27 are perpendicular to the line 133 from the center of mass 130 of the marine vessel 30. Because the thrust vectors 135 are perpendicular to the lines 133, they do not cause the marine vessel 30 to move laterally relative to the center of mass 130 as the marine vessel 30 does in FIGS. 18A and 18B. In other words, because the placement of the motors 22 of modular motor thruster systems 27 in FIG. 19 do not force the center of mass 130 of the marine vessel 30 to move laterally, the marine vessel 30 instead only rotates about its center of mass 130, with the net effect being that the center of mass 130 remains stationary as the marine vessel 30 rotates around its center of mass 130. This configuration may cause the center of mass 130 to travel in a circle as the marine vessel 30 rotates about its center of mass 130. Because this configuration rotates the marine vessel 30 about its center of mass 130 with minimal to no lateral movement, this configuration might be preferred for burst functions. In some embodiments, an actuator which adjusts the direction of the electric motor 22 or of the modular thruster unit 27 may be incorporated to provide for directional adjustment of the motor 22 to produce optimal maneuverability when executing lateral or rotational movements.

FIGS. 20A-31B illustrate various embodiments of control mechanisms 112, which provide user interfaces. The control mechanism (user interface) 112 is configured to input commands to the processor 106, wherein the input commands are used to control directional thrust to be applied to the hull 26 of a marine vessel 30 as discussed above (see FIGS. 11, 18-19). FIGS. 20A-23 provide various embodiments of touch pads 200. Touchpads 200 can comprise a plurality of buttons 202 which may be raised above or situated on top of a base 206. Each button of the plurality of buttons 202 may be defined by a border 204. In some embodiments the buttons 202 may not have a border 204, either in a configuration where the buttons 202 are edge to edge, or where the buttons 202 are displayed on a screen having a graphical user interface (GUI). FIG. 20C illustrates placement of touchpad 200a on or in a steering wheel of a marine vessel.

Figure 25C:
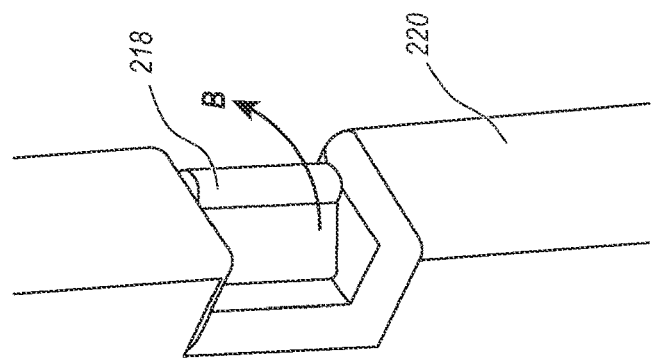
FIGS. 25A-25C illustrates an example of a user operable switch control mechanism incorporated into a main engine throttle.
Figure 25B:
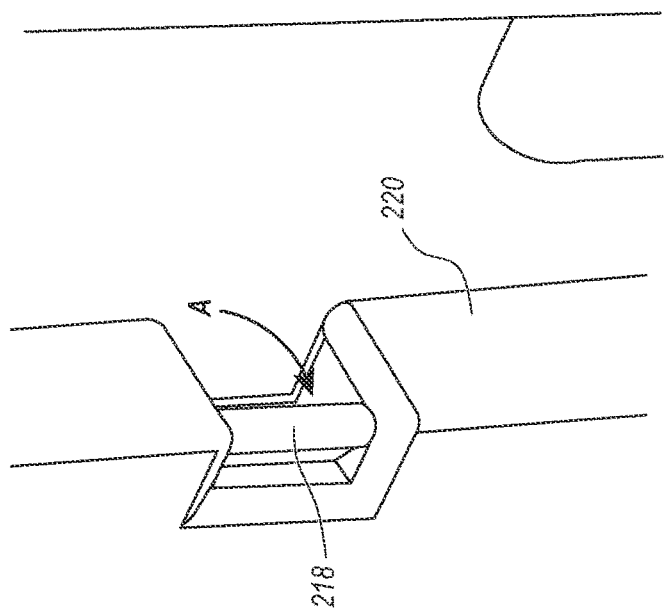
Figure 25A:
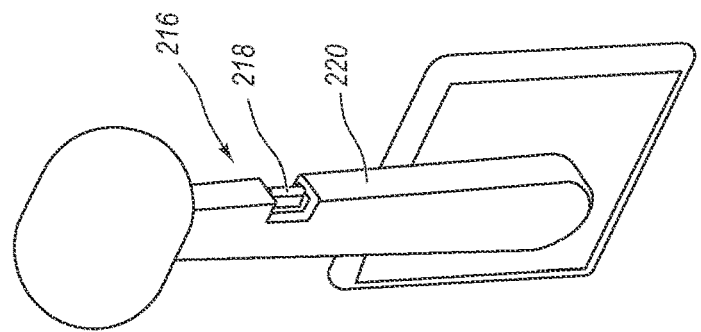

FIGS. 24, 25A-25C, and 30A-30C illustrate various embodiments of a switch user interface. In FIG. 24, a switch control 210 comprises a switch 212 configured within a base 214, which can be moved bi-directionally to activate the motors 22. FIG. 25A-25C illustrate a switch 216 on or embedding with a throttle arm 220, wherein a toggle switch 218 is embedded in the arm 220 of a throttle used to control the main engine speed.

Figure 26A:
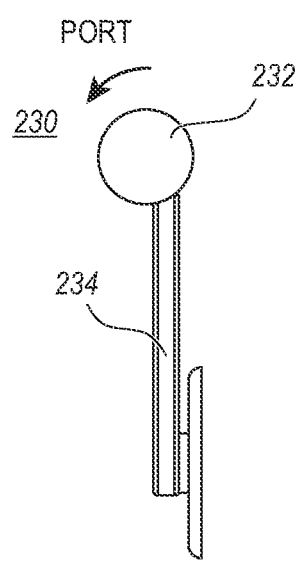
FIGS. 26A-26C illustrate an example of a user operable control mechanism incorporated into a handle of a main engine throttle, wherein movement of the handle is used to control at least some aspects of the thruster system.
Figure 26B:
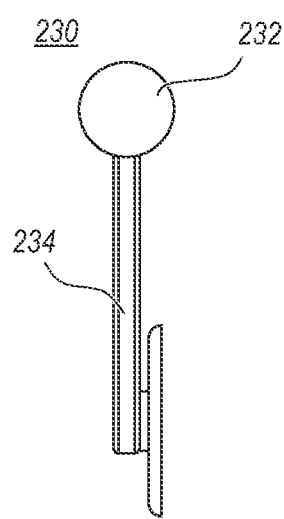
Figure 26C:
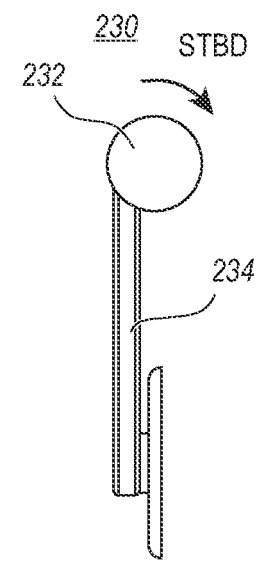

FIGS. 26A-26C illustrates an embodiment of a control mechanism in the form of a joystick 230, wherein a throttle having a throttle arm 234 is configured with a handle 232, which can be swiveled towards port and starboard side to cause the motors 22 to apply directional thrust to the hull 26.

Figure 27A:
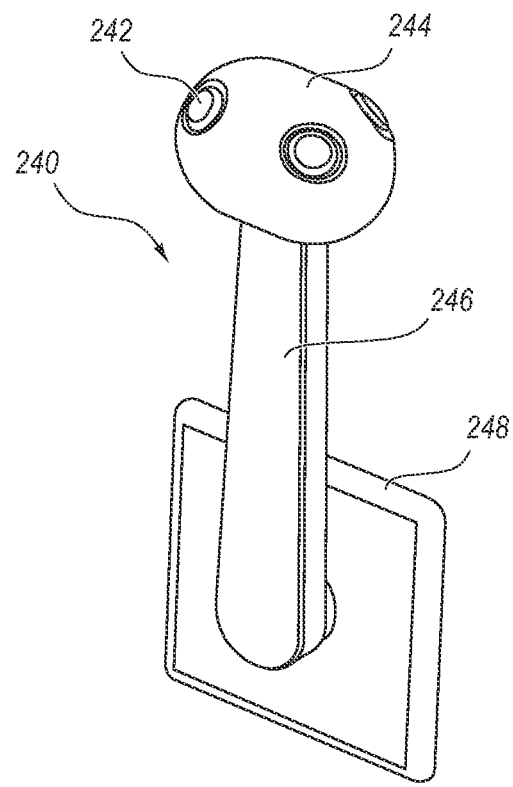
FIGS. 27A-27B illustrate another example of a user operable control mechanism incorporated into a handle of a main engine throttle, wherein buttons on the handle are used to control at least some aspects of the thruster system.
Figure 27B:
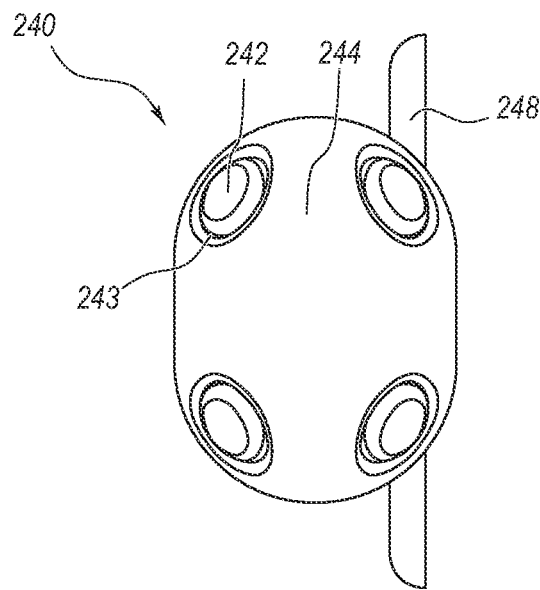

FIGS. 27A and 27B illustrate a control mechanism in the form of a multifunctional throttle 240. A base 248 supports a throttle arm 246 to which is attached a throttle handle 244 comprising a plurality of buttons 242. The buttons 242 can be pre-programmed with specific commands, or the buttons 242 can be used to manually activate the thrusters to provide directional thrust to the hull 26 of a marine vessel 30.

FIGS. 28A-28E illustrate a control mechanism in the form of joystick throttle 250 having a base 256 and a throttle arm 254 extending upward from the base 256. A throttle handle 252 is attached to the throttle arm 254 and can be configured to be selectively rotated relative to the throttle arm 254 in a clockwise or counterclockwise direction in order to activate and apply directional thrust to the hull 26 of the marine vessel. FIGS. 28A-28D illustrate an embodiment in which the rotatable throttle handle 252 covers the end of the throttle arm 254. FIG. 28E shows an embodiment that is functionally equivalent to the embodiment in FIGS. 28A-28D but in which the end throttle arm 254 merely extends through the center of rotatable handle 252, and the handle 254 is optionally scalloped for enhanced frictional control by the driver's hand.

Figure 29:
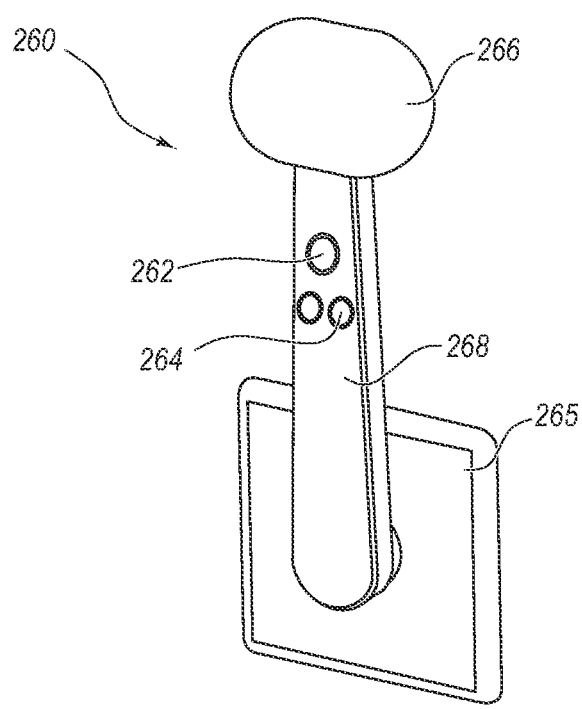
FIG. 29 illustrates an example of a user operable control mechanism incorporated into a main engine throttle, wherein buttons on the throttle arm are used to control at least some aspects of the thruster system.

FIG. 29 illustrates an alternative embodiment of a control mechanism in the form of a throttle 260, comprising a base 265, a throttle arm 268, and a throttle handle 266, wherein the throttle arm 268 comprises a plurality of buttons 262,264 which can be configured to activate and steer the thruster system 20.

Figure 30A:
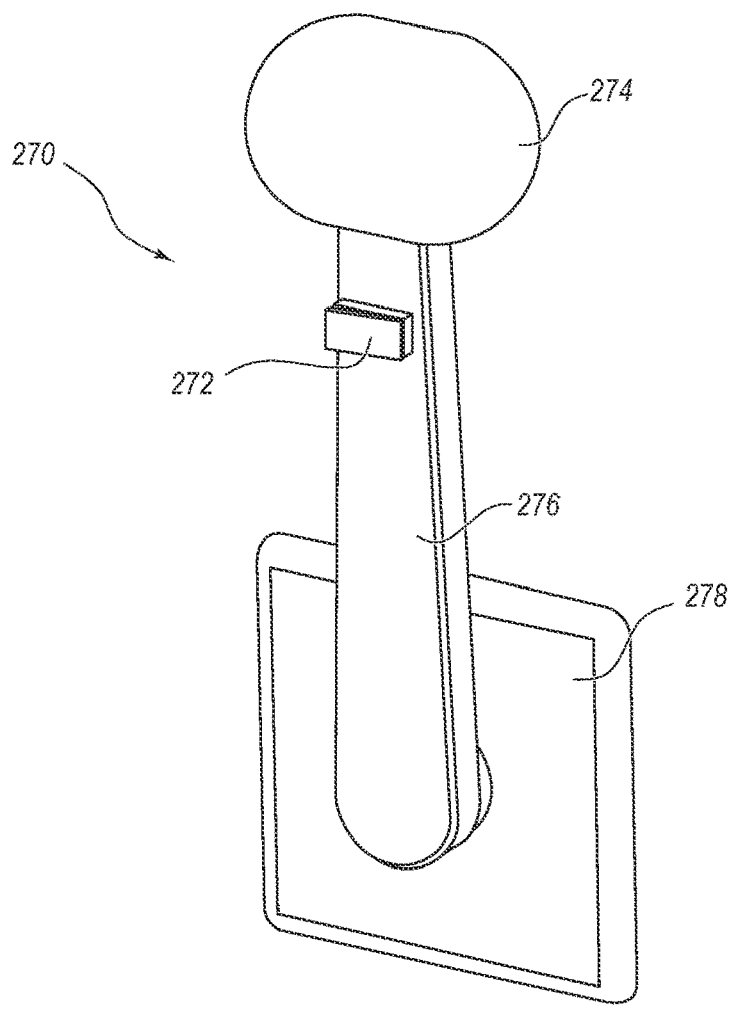
FIG. 30A illustrates another example of a user operable control mechanism incorporated into a main engine throttle, wherein a paddle switch on the throttle arm is used to control at least some aspects of the thruster system.
Figure 30B:
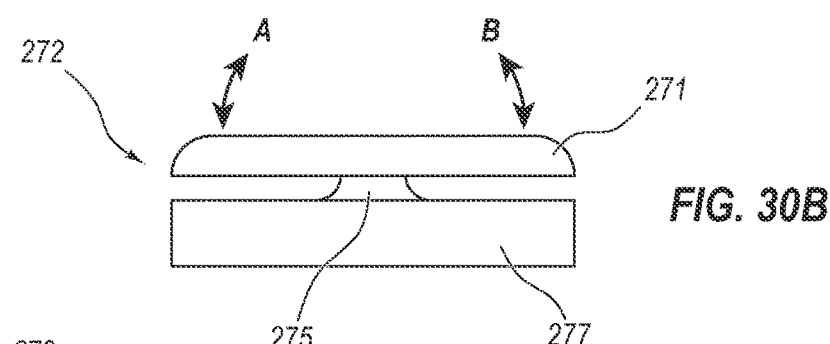
FIGS. 30B and 30C illustrate a detailed view of the control mechanism incorporated into the throttle arm of FIG. 30A.
Figure 30C:
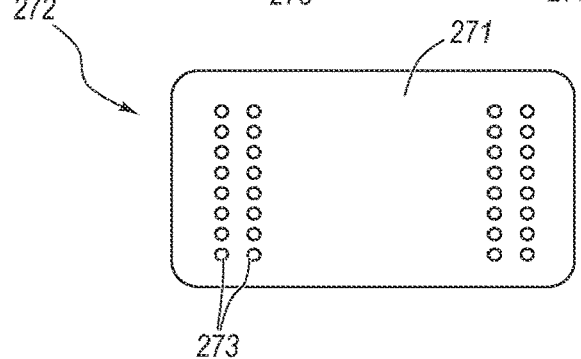

FIGS. 30A and 30B illustrate an embodiment of a control mechanism in the form of a throttle 270 having a paddle switch 272 configured to activate and control the thruster system 20. The paddle switch 272 can be oriented at a location on the throttle arm 276 below the throttle handle 274. The paddle switch 272 can comprise a base 277 connected to a paddle 271 by a joint 275. The paddle 271 can include a plurality of textured features, such as raised dots 273 for added grip or tactical feel. The paddle switch 272 may be depressed in a direction A or a direction B to control the thruster system 20.

Figure 31B:
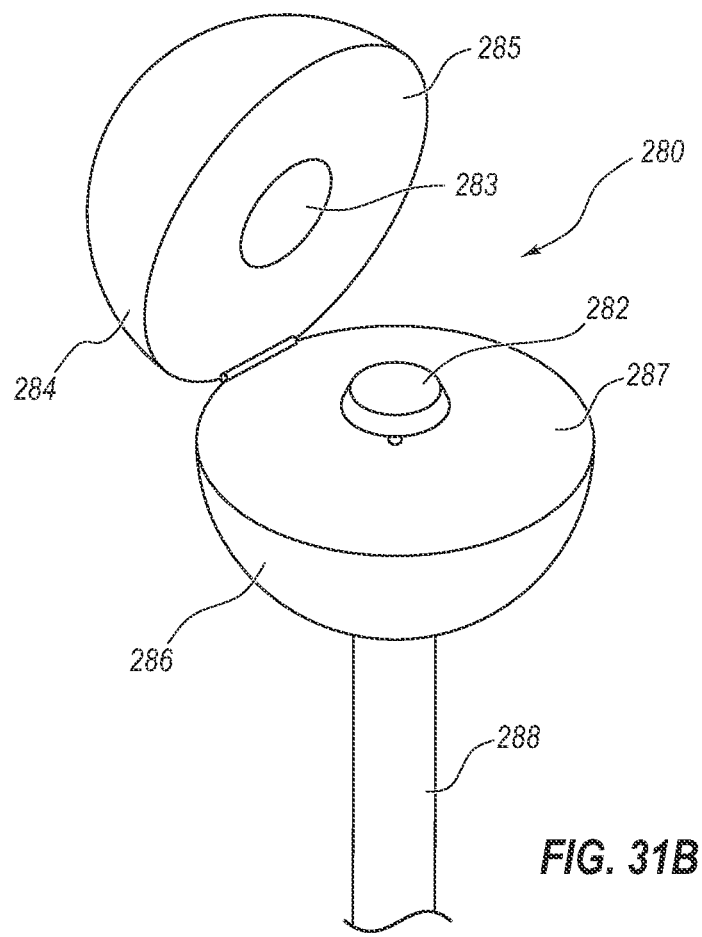
FIGS. 31A and 31B illustrate another example of a user operable control mechanism incorporated into a handle of a main engine throttle.
Figure 31A:
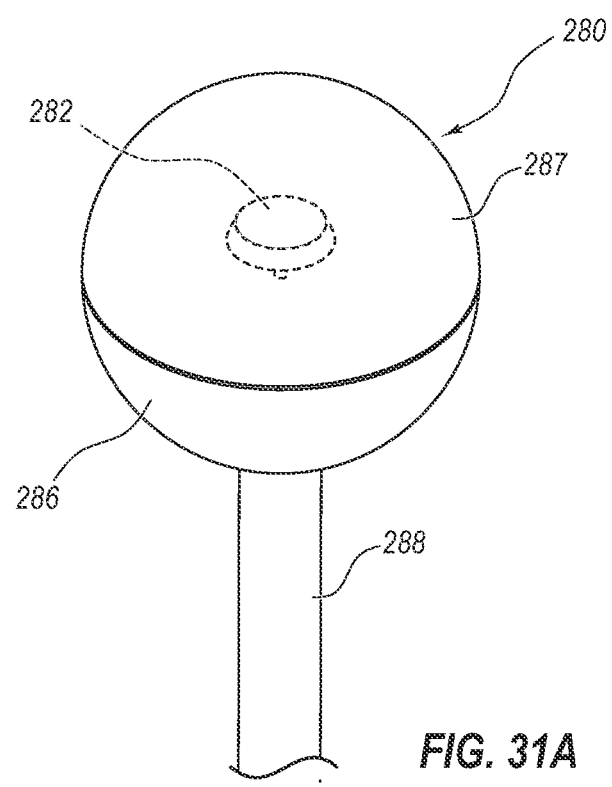
Figure 32B:
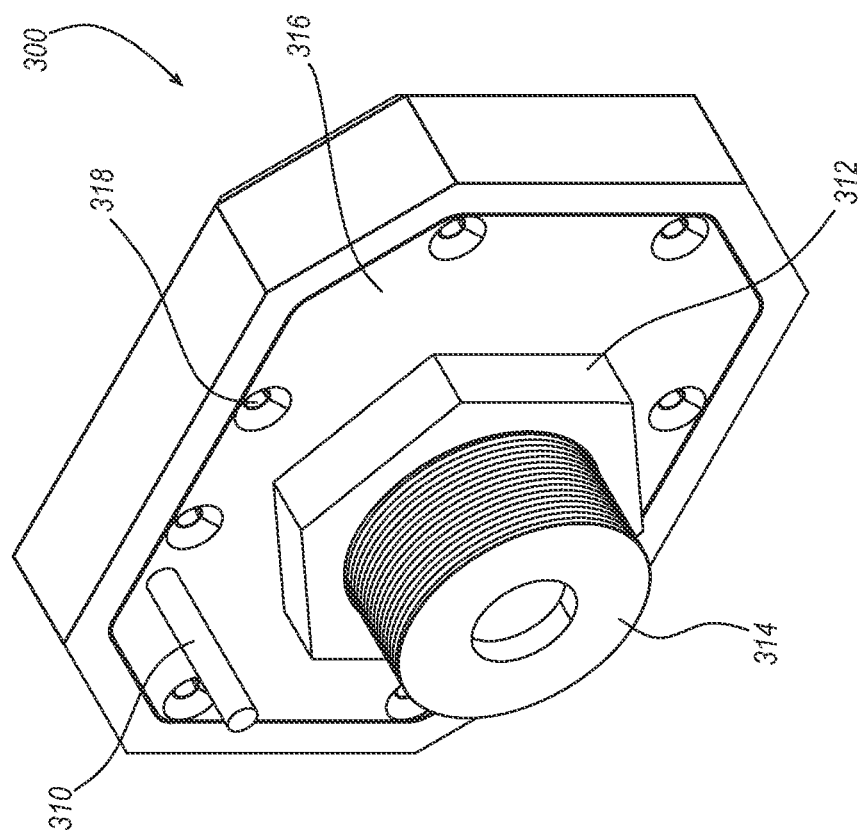
Figure 32A:
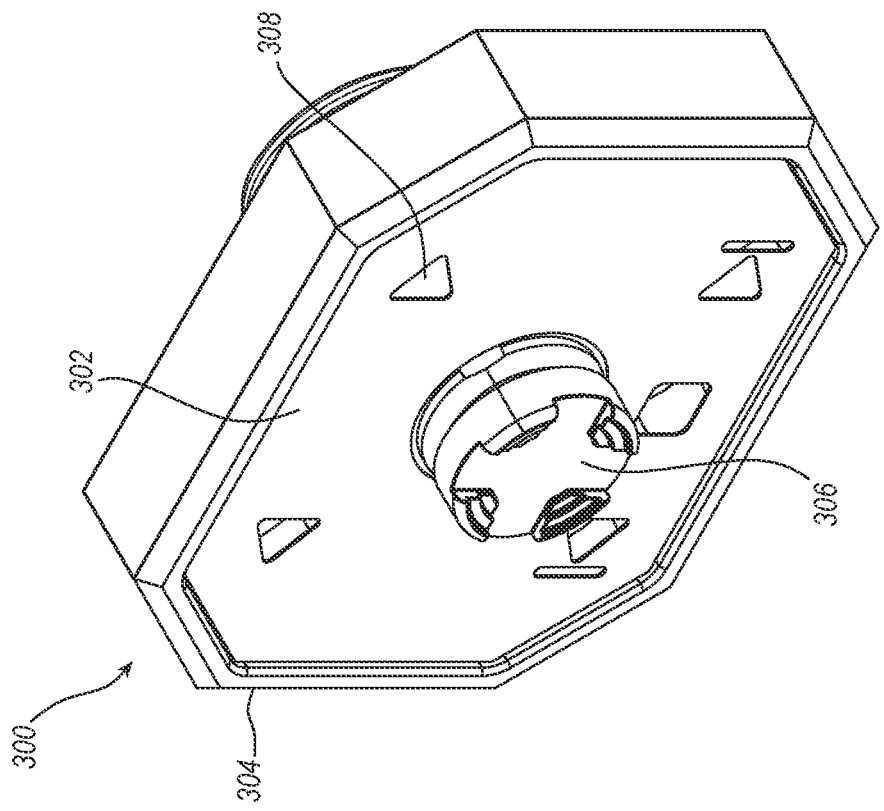
Figure 33B:
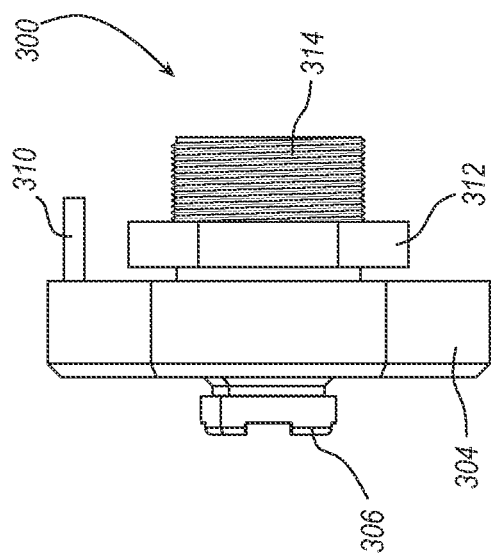
Figure 33A:
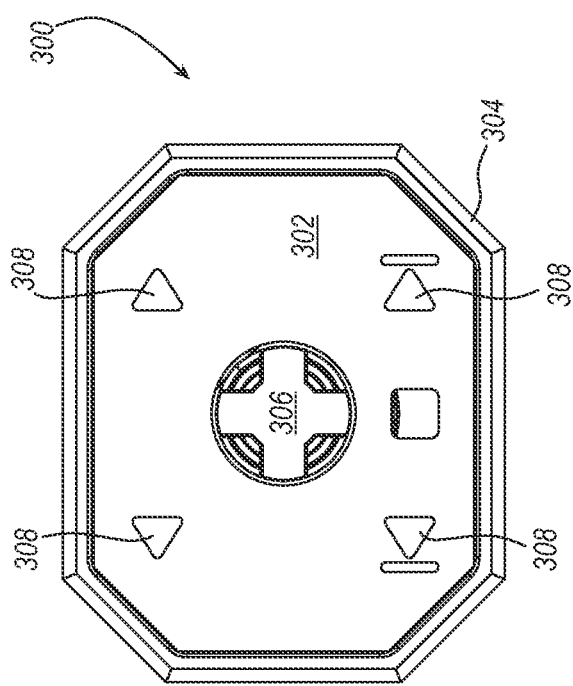
Figure 33C:
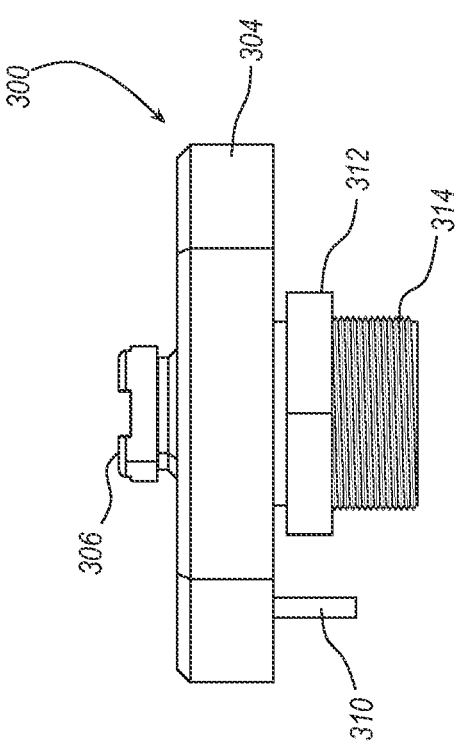

FIGS. 31A and 31B illustrate an embodiment of a control mechanism 112 in the form of a throttle 280 having a throttle arm 288 supporting a handle base 286 and a handle cover 284 connected to the handle base 286. The handle cover 284 can be hingedly connected to the handle base 286. An actuating switch 282 can be situated on a top surface 287 of the handle base 286. The actuating switch 282 can be a multi-direction, multi-function lever and function similarly to a joystick. The actuating switch 282 can be used to control the thruster system 20. This configuration can allow a user to steer the thruster system 20 without removing their hand from the throttle 280. The bottom surface 285 of the handle cover 284 can include a recess 283 to receive the actuating switch 282 when the handle cover 284 is closed on top of the handle base 286, as shown in FIG. 31A. The handle cover 284 prevents inadvertent activation of the thruster system 20 when the system is not in use.

FIGS. 32A to 33C illustrate another embodiment of a control mechanism 112 in the form of a joystick assembly 300. The joystick assembly 300 can be mounted on a throttle, a steering wheel, an after-market assembly, or other marine vessel control device. The joystick assembly 300 can be integrated into the electrical system of a thruster system 20 and used to control the thruster motors 22. The joystick assembly 300 can comprise a metal bezel or housing 304 containing a top surface 302 and a bottom surface 316. The bottom surface can comprise a metal backplate. The top surface 302 includes a joystick 306. The top surface 302 includes one or more LED indicators 308 which can signal to a user if the control mechanism 112 is on standby or engaged, and if engaged, it can indicate the functions being carried out.

The joystick assembly 300 can include a backplate assembly 312. The backplate assembly 312 includes a threaded section 314 which can be used for integrating the joystick assembly 300 into the electrical control system 100 of a thruster system 20. The backplate assembly 312 can also include a secondary post 310, which can provide stability and maintain the position of the joystick assembly 300 once installed. The joystick assembly 300 can be added as an after-market addition to a thruster system 20, or it can be integrated into a marine vessel during manufacturing.

As noted above, the present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

The invention claimed is:

1. A modular thruster system independently operable from a main propulsion system of a marine vessel for providing improved maneuverability of the marine vessel, comprising:
a plurality of modular thruster units, each independently mountable at a location on a hull of the marine vessel apart from other modular thruster units mounted to the hull, wherein at least one modular thruster unit is mounted at the stern on a port side of the marine vessel to provide directional thrust at the port side of the stern, and at least one other modular thruster unit is mounted at the stern on a starboard side of the marine vessel to provide directional thrust at the starboard side of the stern, each modular thruster unit comprising:
at least one mounting bracket adapted for direct or indirect attachment to the hull;
an electric motor attached to the at least one mounting bracket; and
a propeller attached to and driven by the electric motor;
an electrical control system adapted to independently control each of the modular thruster units, the electrical control system comprising electrical circuit components configured to independently control the electric motor of each thruster unit to apply a desired directional thrust to the hull of the marine vessel by each thruster unit, wherein the electrical control system comprises a modular battery pack electrically coupled to each modular thruster unit, wherein the modular battery pack is smaller relative to a primary battery of the marine vessel and outputs a higher discharge current relative to the modular battery pack's input charging current; and
a control mechanism electrically coupled to the electrical control system, the control mechanism providing operational commands used by the electrical control system to control the electric motor of each modular thruster unit.

2. The modular thruster system of claim 1, wherein the at least one mounting bracket includes a curved bracket feature, wherein the mounting location of the electric motor is adjustable along a length of the curved bracket feature.

3. The modular thruster system of claim 1, wherein a third modular thruster unit is mounted towards a fore portion of the hull relative to mounting locations of the first and second modular thruster units.

4. The modular thruster system of claim 1, wherein one or more electric motors of the modular thruster units are retractable.

5. The modular thruster system of claim 1, wherein the operational commands used to control the electric motor of each modular thruster unit provide either independent control in terms of directional thrust to be applied to the hull of the marine vessel by the electric motor of one or more of the modular thruster units, or control which coordinates the directional thrust applied to the hull of the marine vessel by each modular thruster unit working together.

6. The modular thruster system of claim 1, wherein the control mechanism comprises a module configured to be removed from and separately replaceable apart from a module of the electrical control system.

7. The modular thruster system of claim 1, wherein the electrical control system is a single module comprising:
at least one DC/DC converter electrically coupled to a plurality of electronic speed control units, each electronic speed control unit separately controlling one of the electric motors;
a processor electrically coupled to each electronic speed control unit; and
a central charging system electrically coupled to a main battery, and wherein the main battery is electrically coupled to the at least one DC/DC converter.

8. The modular thruster system of claim 1, wherein the electrical control system is a single module comprising:
a plurality of electronic speed control units configured in pairs, each pair of electronic speed control units separately controlling one of the electric motors;
at least two DC/DC converters, each DC converter electrically coupled to a pair of electronic speed control units;
an on/off relay electrically connected to each of the at least two DC/DC converters;
a processor electrically connected to each pair of electronic speed control units; and
a central charging system electrically coupled to a main battery, and wherein the main battery is electrically coupled to the on/off relay.

9. The modular thruster system of claim 1, wherein the electrical control system comprises three independent modules, each configured to be removed from and separately replaceable in the electrical control system apart from any other module of the electrical control system, and wherein:
a first module comprises at least one DC/DC converter electrically coupled to a first electronic speed control unit;
a second module comprising at least one DC/DC converter electrically coupled to a second electronic speed control unit;
wherein each electronic speed control unit is electrically coupled to a separate motor;
a third module comprising a processor electrically coupled to the first module and to the second module; and
a central charging system electrically coupled to a main battery, and wherein the main battery is electrically coupled to each DC/DC converter.

10. The modular thruster system of claim 1, wherein at least a portion of the control mechanism is positioned at a throttle of the marine vessel.

11. The modular thruster system of claim 10, wherein the control mechanism comprises a moveable knob positioned at an end of a throttle arm of the throttle.

12. The modular thruster system of claim 11, wherein the control mechanism is adapted so that movement of the moveable knob in a first direction causes the modular thruster units to propel the marine vessel in a first direction and movement of the moveable knob in a second direction causes the modular thruster units to propel the marine vessel in a second direction.

13. The modular thruster system of claim 11, wherein the moveable knob is rotatable relative to the throttle arm and wherein rotation of the moveable knob in a first direction causes the modular thruster units to propel the marine vessel in a first direction and rotation of the moveable knob in a second direction causes the modular thruster units to propel the marine vessel in a second direction.

14. The modular thruster system of claim 10, wherein the control mechanism comprises a plurality of independently operable buttons positioned at a throttle arm or knob of the throttle.

15. The modular thruster system of claim 10, wherein the control mechanism comprises a paddle switch positioned at a throttle arm or an actuating switch at or in a knob on the throttle arm.

16. The modular thruster system of claim 1, wherein the control mechanism comprises a joystick that is positioned on a steering wheel or throttle of the marine vessel.

17. The modular thruster system of claim 1, wherein at least a portion of the control mechanism is positioned at a steering wheel of the marine vessel and includes at least one switch, touchpad, or button that operates independent of turning the steering wheel.

18. The modular thruster system of claim 1, wherein the at least one mounting bracket is adapted for attachment to or integration with a swim deck bracket attached to the hull.

19. The modular thruster system of claim 18, wherein a first one of the modular thruster units is positioned below the swim deck on the port side of the marine vessel and a second one of the modular thruster units is positioned below the swim deck on the starboard side of the marine vessel.

20. A modular thruster system independently operable from a main propulsion system of a marine vessel for providing improved maneuverability of the marine vessel, comprising:
a plurality of modular thruster units, each independently mountable at a location on a hull of the marine vessel apart from other thruster units mounted to the hull, each thruster unit comprising:
at least one mounting bracket adapted for direct or indirect attachment to the hull;
an electric motor attached to the at least one mounting bracket; and
a propeller attached to and driven by the electric motor;
an electrical control system adapted to independently control each of the modular thruster units, the electrical control system comprising electrical circuit components configured to independently control the electric motor of each thruster unit to apply a desired directional thrust to the hull of the marine vessel by each thruster unit, wherein the electrical control system comprises three independent modules each configured to be removed from and separately replaceable in the electrical control system apart from any other module of the electrical control system, and wherein:
a first module comprises a modular battery pack electrically coupled to a first electronic speed control unit;
a second module comprising a modular battery pack electrically coupled to a second electronic speed control unit;
wherein each electronic speed control unit is electrically coupled to a separate motor;
wherein the modular battery pack is smaller relative to a primary battery, and wherein the modular battery pack outputs a higher discharge current relative to the modular battery pack's input charging current; and
a third module comprising a processor electrically coupled to the first module and the second module; and
a control mechanism electrically coupled to the electrical control system, the control mechanism providing operational commands used by the electrical control system to control the electric motor of each modular thruster unit.

21. The modular thruster system of claim 20, further comprising a central charging system electrically coupled to a main battery, and wherein the main battery is electrically coupled to each modular battery pack.

22. The modular thruster system of claim 20, wherein each first and second module further comprises a charge controller electrically coupled the modular battery pack of the corresponding first and second module.

23. The modular thruster system of claim 22, further comprising a central charging system electrically coupled to a main battery, and wherein the main battery is electrically coupled to each charge controller.

24. The modular thruster system of claim 22, wherein the charge controller charges the modular battery pack at a time-dependent charge current and charge voltage calculated based on the chemistry of the modular battery pack, resulting in the modular battery pack becoming fully charged without overcharging and damaging the modular battery pack.

25. The modular thruster system of claim 20, wherein the modular battery pack is smaller relative to a primary battery, and wherein the modular battery pack outputs a higher discharge current relative to the modular battery pack's input charging current.

26. A thruster system independently operable from a main propulsion and steering system of a marine vessel for providing improved maneuverability of the marine vessel, comprising:
a plurality of thruster units, each independently mountable at a location on a hull of the marine vessel apart from other thruster units mounted to the hull, each thruster unit comprising:
at least one mounting bracket adapted for direct or indirect attachment to the hull;
an electric motor attached to the at least one mounting bracket; and
a propeller attached to and driven by the electric motor;
an electrical control system adapted to independently control each of the thruster units, the electrical control system comprising electrical circuit components configured to independently control the electric motor of each thruster unit to apply a desired directional thrust to the hull of the marine vessel by each thruster unit; and
a control mechanism electrically coupled to the electrical control system, the control mechanism providing operational commands used by the electrical control system to control the electric motor of each thruster unit, wherein the electrical control system comprises a modular battery pack electrically coupled to each modular thruster unit, wherein the modular battery pack is smaller than a primary batter of the marine vessel and outputs a higher discharge current relative to the modular battery pack's input charging current; and
a proximity sensing system comprised of GPS and one or more proximity sensors,
wherein the electrical control system, proximity sensing system, and/or control mechanism are adapted to cause the thruster units to move or urge the marine vessel in a predetermined manner.

27. The thruster system of claim 26, wherein the control mechanism, upon receipt of one or more user-initiated commands, results in the electrical control system causing the thruster units to move or urge the boat in the predetermined manner.

28. The thruster system of claim 27, wherein the predetermined manner is a dock-hold sequence that moves or urges the marine vessel toward and/or against a dock.

29. A thruster system independently operable from a main propulsion and steering system of a marine vessel for providing improved maneuverability of the marine vessel, comprising:
    a plurality of thruster units, each independently mountable at a location on a hull of the marine vessel apart from other thruster units mounted to the hull, each thruster unit comprising:
        at least one mounting bracket adapted for direct or indirect attachment to the hull;
        an electric motor attached to the at least one mounting bracket; and
        a propeller attached to and driven by the electric motor;
    an electrical control system adapted to independently control each of the thruster units, the electrical control system comprising electrical circuit components configured to independently control the electric motor of each thruster unit to apply a desired directional thrust to the hull of the marine vessel by each thruster unit, wherein the electrical control system comprises a modular battery pack electrically coupled to each modular thruster unit, wherein the modular battery pack is smaller than a primary batter of the marine vessel outputs a higher discharge current relative to the modular battery pack's input charging current;
    a main propulsion and steering system comprised of a main engine, a propeller, a steering wheel, and a throttle for controlling the main engine; and
    a control mechanism electrically coupled to the electrical control system, the control mechanism providing operational commands used by the electrical control system to control the electric motor of each thruster unit,
    wherein the control mechanism is positioned at an end of a throttle arm of the throttle and operates independently of the main propulsion and steering system of the marine vessel in order to permit a driver to control the main engine and the electrical control system with one hand.

30. The thruster system of claim 29, wherein the control mechanism comprises a moveable knob positioned at the end of the throttle arm of the throttle, wherein the control mechanism is adapted so that movement of the moveable knob in a first direction causes the thruster units to propel the marine vessel in a first direction and movement of the moveable knob in a second direction causes the thruster units to propel the marine vessel in a second direction.

* * * * *